United States Patent
Mishima et al.

(10) Patent No.: US 8,115,421 B2
(45) Date of Patent: Feb. 14, 2012

(54) DISCHARGE LAMP LIGHTING DEVICE, ILLUMINATION DEVICE, AND LIQUID CRYSTAL DISPLAY DEVICE

(75) Inventors: Masanori Mishima, Sourakugun Seikacho (JP); Masahiro Naruo, Hirakata (JP)

(73) Assignee: Panasonic Electronic Works Co., Ltd., Osaka (JP)

( * ) Notice: Subject to any disclaimer, the term of this patent is extended or adjusted under 35 U.S.C. 154(b) by 396 days.

(21) Appl. No.: 12/523,618

(22) PCT Filed: Feb. 15, 2008

(86) PCT No.: PCT/JP2008/052538
§ 371 (c)(1),
(2), (4) Date: Jul. 17, 2009

(87) PCT Pub. No.: WO2008/102703
PCT Pub. Date: Aug. 28, 2008

(65) Prior Publication Data
US 2010/0039581 A1 Feb. 18, 2010

(30) Foreign Application Priority Data

Feb. 19, 2007 (JP) ................. 2007-038154
Feb. 19, 2007 (JP) ................. 2007-038157
Feb. 19, 2007 (JP) ................. 2007-038158

(51) Int. Cl.
*H05B 37/02* (2006.01)
(52) U.S. Cl. ............... 315/307; 315/209 R; 315/308
(58) Field of Classification Search ............ 315/177, 315/209 R, 224, 276, 291, 297, 299, 300, 315/301, 307, 308, 326
See application file for complete search history.

(56) References Cited

U.S. PATENT DOCUMENTS

| | | | |
|---|---|---|---|
| 4,998,046 A | 3/1991 | Lester | |
| 5,920,155 A * | 7/1999 | Kanda et al. | 315/307 |
| 2004/0183472 A1* | 9/2004 | Kamoi et al. | 315/291 |
| 2005/0023990 A1 | 2/2005 | Suzuki | |
| 2006/0055341 A1 | 3/2006 | Watanabe et al. | |
| 2008/0030143 A1 | 2/2008 | Goriki et al. | |
| 2008/0143270 A1 | 6/2008 | Sun et al. | |

(Continued)

FOREIGN PATENT DOCUMENTS

JP 64-72497 3/1989
(Continued)

OTHER PUBLICATIONS

Japanese Office Action (including English language Abstract), issued Sep. 20, 2011, for the corresponding Japanese Patent Application No. 2009-500162.

(Continued)

*Primary Examiner* — Douglas W Owens
*Assistant Examiner* — Jianzi Chen
(74) *Attorney, Agent, or Firm* — Greenblum & Bernstein, P.L.C.

(57) ABSTRACT

A burst dimming signal to determine a ratio between an ON period and an OFF period is inputted. In the OFF period of the burst dimming signal, a lamp current Ila is stopped from flowing to a discharge lamp FL, while a lamp voltage Vla is applied to both ends of the discharge lamp FL, and preheating currents If1 and If2 are supplied to hot cathodes of the discharge lamp FL. In the ON period of the burst dimming signal, the discharge lamp FL is electrically broken down and is supplied with the lamp current Ila.

24 Claims, 40 Drawing Sheets

U.S. PATENT DOCUMENTS

2009/0146579 A1 6/2009 Goriki et al.
2009/0236999 A1 9/2009 Yufuku et al.

FOREIGN PATENT DOCUMENTS

| JP | 3-246897 | 11/1991 |
|---|---|---|
| JP | 3-246899 | 11/1991 |
| JP | 7-240286 | 9/1995 |
| JP | 8-106987 | 4/1996 |
| JP | 2005-38683 | 2/2005 |
| JP | 2005-235619 | 9/2005 |
| JP | 2006-53520 | 2/2006 |
| JP | 2006-196437 | 7/2006 |

OTHER PUBLICATIONS

English language Abstract of JP 64-72497, Mar. 17, 1989.
English language Abstract of JP 3-246897, Nov. 5, 1991.
English language Abstract of JP 3-246899, Nov. 5, 1991.
English language Abstract of JP 2005-235619, Sep. 2, 2005.
English language Abstract of JP 7-240286, Sep. 12, 1995.
English language Abstract of JP 2005-38683, Feb. 10, 2005.
English language Abstract of JP 2006-196437, Jul. 27, 2006.
English language Abstract of JP 2006-53520, Feb. 23, 2006.
English language Abstract of JP 8-106987, Apr. 23, 1996.

* cited by examiner (a) BURST DIMMING SIGNAL (b) PREHEATING CURRENT (c) LAMP CURRENT (d) LAMP VOLTAGE (a) BALLAST V-I CHARACTERISTIC (b)

(c) LAMP V-I CHARACTERISTIC

LAMP VOLTAGE Vla

LAMP CURRENT Ila

DISCHARGE LAMP LIGHTING DEVICE, ILLUMINATION DEVICE, AND LIQUID CRYSTAL DISPLAY DEVICE

TECHNICAL FIELD

The present invention relates to a discharge lamp lighting device configured to perform dimming by changing a time ratio between a light-on period and a light-off period of a discharge lamp that serves as a light source, and to an illumination device and a liquid crystal display device using the same.

BACKGROUND ART

A liquid crystal display device includes a liquid crystal panel 22 and a backlight unit 21 located behind the panel and provided with a light source FL (see FIG. 42). In each of pixels of the liquid crystal panel 22, liquid crystal is driven by video signals, light emitted from the backlight unit 21 is transmitted therethrough, and images are displayed on the liquid crystal panel 22. In general, a cold cathode fluorescent lamp (CCFL) is often used as the light source FL of the backlight unit 21, and a discharge lamp lighting device for lighting control of the lamp is required. An example of a method of dimming the CCFL in the discharge lamp lighting device is a burst dimming (PWM dimming) method.

The burst dimming method is a so-called intermittent lighting operation in which dimming is performed by causing the light source to blink in cycles while changing a time ratio between a light-on period and a light-off period thereof. Therefore, an appropriate selection of the blinking cycle makes it possible to set a dimming ratio to 100 to 1. For this reason, the burst dimming method has been employed for backlight control in many liquid crystal display devices. As disclosed in Patent Document 1, this burst dimming method is also applied to means for improving a liquid crystal display device to fix moving image display with indistinct outlines (called blurred moving images or edge blurs), which is incurred due to its own poorer moving image display performance than that of a CRT.

In recent years, particularly in the field of liquid crystal display devices, demands for a size increase, higher luminance, and uniformity of a screen have brought about tendencies to increase the number of lamps employed in one set of device, and to make higher tube voltages of discharge lamps used in the screen. Even a CCFL used for backlight in a 32-inch size has a tube voltage of about 1 kV (rms). For this reason, effects of a high-impedance load and parasitic capacitance between the CCFL and a casing is not negligible, which leads to a problem that a current leakage to the casing causes a deviation in the luminance distribution, thereby making luminance of the lamp nonuniform.

Accordingly, it is conceivable to use a hot cathode fluorescent lamp (HCFL) having a higher output and lower tube voltage than the CCFL does. The use of the HCFL has advantages to drastically reduce the number of lamps and to reduce the number of lighting circuits as compared to the use of the CCFL. Moreover, since the tube voltage is low, the effect of the parasitic capacitance between the HCFL and the casing is small and a deviation in luminance is also reduced. Further, due to low noise, an effect on peripheral circuits such as a liquid crystal panel is also small.

FIG. 43 shows a discharge lamp lighting device disclosed in Patent Document 2, which switches light-on periods and light-off periods by opening and short-circuiting a switch SW2 between filaments of a hot cathode discharge lamp FL.

Under control of a converter control circuit 45, the voltage of an output from a DC power source 41 is converted by a DC-DC converter 44, and the output at the converted voltage is again converted into high-frequency power by a high-frequency inverter 47, and supplied to the hot cathode discharge lamp FL. The switch SW2 of a dimming circuit 49 is connected between the filaments of the hot cathode discharge lamp FL so as to be in parallel with the hot cathode discharge lamp FL.

Short-circuiting and opening operations of the switch SW2 are controlled by a dimming control circuit 46. A preheating current flows to the filaments of the hot cathode discharge lamp FL by an output from the high-frequency inverter 47 when the switch SW2 is short-circuited, while a lamp current flows between the filaments of the hot cathode discharge lamp FL by the output from the high-frequency inverter 47 when the switch SW2 is opened. For this reason, the hot cathode discharge lamp FL is lighted off when the switch SW2 is short-circuited, while the hot cathode discharge lamp FL is lighted on when the switch SW2 is opened. Accordingly, a light output can be controlled by adjusting a time ratio between a light-off period and a light-on period.

An output from the hot cathode discharge lamp FL is monitored by an optical sensor S and is subjected to feedback control by a CPU 43 so as to maintain a dimming state set by an operating unit 42. In addition, an output voltage from the DC-DC converter 44 during the light-off period is variable by the converter control circuit 45 in accordance with the dimming state detected by a dimming state detection circuit 48, whereby a filament voltage during the light-off period is variable in accordance with the dimming state.

In this lighting device, waveforms of the filament preheating current flowing in the light-off period and of the lamp current flowing in the light-on period each vary in accordance with the dimming state as shown in FIGS. 44(a) to (c). Amplitude of the filament current is variably controlled in accordance with the dimming state so as to make the filament temperature appropriate according to time ratios between light-off periods Ta, Tb and Tc in which the filament preheating current flows, and, light-on periods ta, tb and tc in which the lamp current flows.

On the other hand, Patent Document 3 discloses a discharge lamp lighting device in which a semiconductor switch 54 cuts off a signal from variable pulse width modulator means 84 to turn a lamp current on and off, thereby expanding a dimming range (see FIG. 1). In this discharge lamp lighting device, constant filament voltage means 12 supplies preheating voltages ranging from 0 to 10 V to electrodes 26 and 28 of a lamp 10 via a transformer 16.

The technique according to Patent Document 2 can control the optical output by adjusting the time ratio between the light-off period and the light-on period. However, the technique imposes large stresses on the switch SW2 due to an inrush current at the time of disconnecting a high-frequency current or at a moment when the switch SW2 is turned on, a starting voltage applied to the lamp at a moment when the switch SW2 is turned off, and the like. Moreover, since a voltage applied to and a current flowing to the filaments are large when the switch SW2 is turned on, the lamp life is deteriorated. Further, it is not possible to supply the preheating current to the filaments during lighting.

In the case of a liquid crystal display backlight device, a burst dimming frequency has a repetitive waveform around several hundred hertz. Accordingly, an electrode temperature is influenced by an average value of the preheating current supplied to the filaments. For this reason, if there is a period when no preheating current is supplied, it is necessary to supply the preheating current at a larger peak value than in the case of constantly supplying the preheating current, in order to ensure the electrode temperature, thereby causing circuit stresses. In addition, a starting voltage also has to be high enough for the discharge lamp to transition from the light-off state to the light-on state, thereby causing circuit stresses as well. Particularly in the technique according to Patent Document 2, the preheating current is completely cut off at the time of continuous lighting, and thus the electrode is locally heated. The entire electrode needs to be heated at the transition from the light-off state to the light-on state in response to switching from continuous lighting to burst dimming. This causes a problem that the peak value of the starting voltage becomes high.

Furthermore, if an inverter circuit for lighting and an inverter circuit for preheating are separately provided for supplying the lamp current and the preheating current independently, the configuration is so complicated that control thereof is also complicated. In the case of an integrated type (a type supplying the preheating current from a secondary coil of a ballasting inductor) that can simultaneously provide the lamp current and the preheating current by oscillation of an inverter circuit, oscillation of the inverter circuit is turned on and off in order to turn the lamp current on and off. In this case, when the oscillation is turned off, the preheating current is also stopped. The preheating current can be continuously supplied by keeping the oscillation of the inverter circuit, i.e., for example, by alternately repeating a full light-on state and a dimmed state. However, in this case, a lower dimming limit cannot be lowered enough.

On the other hand, in the technique according to Patent Document 3, it is possible to turn the lamp current on and off by using burst signal from variable pulse width modulator means 84 while continuously supplying the preheating current. Nevertheless, the circuit is complicated as the semiconductor switch 54 for turning off the lamp current is necessary. Moreover, it is necessary to provide a transformer 40 and semiconductor switches 42 and 44 for supplying the lamp current in addition to the transformer 16 and semiconductor switches 18 and 20 for supplying the preheating current, which makes the circuit further complicated and leads to an increase in circuit costs.

The present invention has been made in view of the above-mentioned problems and an object thereof is to provide a discharge lamp lighting device, an illumination device, and a liquid crystal display device, which are capable of dimming to a low level, maintaining a necessary electrode temperature, reducing circuit stresses, and increasing a lamp life.

Patent Document 1: JP-A 2006-53520
Patent Document 2: JP-A 8-106987
Patent Document 3: U.S. Pat. No. 4,998,046

DISCLOSURE OF INVENTION

A discharge lamp lighting device according to the present invention is a discharge lamp lighting device including an inverter circuit which supplies electric power to a discharge lamp provided with a hot cathode, and a preheating circuit which supplies a preheating current to the hot cathode of the discharge lamp by a switching operation of the inverter circuit, which is characterized in that a burst dimming signal to determine a ratio between an ON period and an OFF period is inputted, a lamp current for the discharge lamp is stopped from flowing in the OFF period of the burst dimming signal while a voltage is applied to both ends of the discharge lamp, the lamp current is supplied in the ON period of the burst dimming signal by causing a dielectric breakdown of the discharge lamp, the preheating current is supplied constantly to the hot cathode of the discharge lamp in the ON period and the OFF period of the burst dimming signal, the inverter circuit is an inverter circuit of a frequency variable type in which power supply to the discharge lamp is reduced as a drive frequency increases, and the lamp current to the discharge lamp is stopped from flowing while the hot cathode is continuously preheated in the OFF period of the burst dimming signal by increasing the drive frequency of the inverter circuit up to such a level that a voltage-current characteristic of the inverter circuit have no intersecting point with a voltage-current characteristic of the discharge lamp. An illumination device according to the present invention is characterized by including the discharge lamp lighting device according to the present invention. A liquid crystal display device according to the present invention is characterized by including the discharge lamp lighting device according to the present invention.

BEST MODES FOR CARRYING OUT THE INVENTION

First Embodiment

Figure 1:
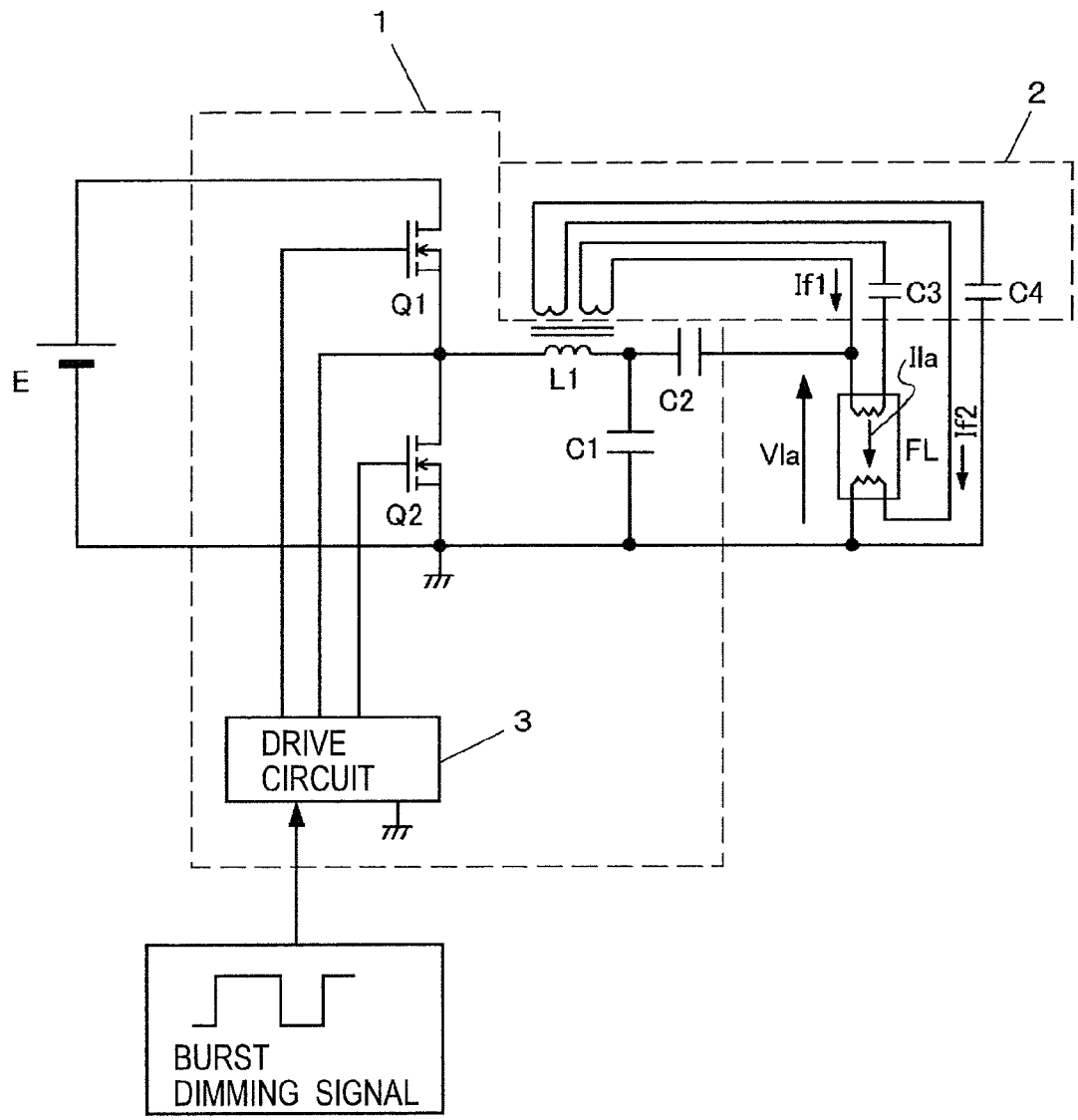
FIG. 1 is a circuit diagram showing a configuration of a discharge lamp lighting device according to a first embodiment of the present invention.

FIG. 1 is a circuit diagram showing a configuration of a discharge lamp lighting device of a first embodiment of the present invention. A DC power source E is a power source that outputs a predetermined DC voltage, which can be made of a circuit configured to rectify the whole of the waveform of a commercial AC power source, to smooth and output the voltage by using a publicly-known boost chopper circuit, for example. A series circuit including switching elements Q1 and Q2 is connected to the DC power source E. The switching elements Q1 and Q2 are made of power MOSFETs, for example, which are subjected to on-off drive alternately at a high frequency by an output from a drive circuit 3.

A series circuit including an inductor L1 and a capacitor C1 is connected between a junction of the switching elements Q1 and Q2 and a ground. A hot cathode discharge lamp FL is connected to both ends of the capacitor C1 via a DC cut capacitor C2. Together with impedance at the time of lighting the hot cathode discharge lamp FL, the inductor L1 and the capacitors C1 and C2 constitute a resonance circuit.

The DC cut capacitor C2 contributes little to resonance by setting a capacity sufficiently larger than that of the resonance capacitor C1. Moreover, it is also possible to obtain a broad current dimming characteristic by appropriately setting a value of the capacitor C2. Drive frequency applicable to the switching elements Q1 and Q2 is set higher than a resonance frequency at the time of loading of the resonance circuit. Therefore, a lamp current is controlled to be reduced as the drive frequency becomes higher. The lamp current flowing to the hot cathode discharge lamp FL is formed into a high-frequency current in an almost sinusoidal shape by the resonance circuit that includes the inductor L1 and the capacitors C1 and C2, whereby radiated noises are reduced.

The resonance inductor L1 is provided with a pair of secondary coils. The secondary coils are respectively connected to filaments of the hot cathode discharge lamp FL via preheating capacitors C3 and C4. Even when the hot cathode discharge lamp FL is turned off, high-frequency voltages are induced at the secondary coils of the inductor L1 because a resonance current flows to the resonance circuit including the inductor L1 and the capacitor C1. Accordingly, preheating currents If1 and If2 are supplied to the respective filaments of the hot cathode discharge lamp FL via the preheating capacitors C3 and C4. Meanwhile, since the resonance current flows to the resonance circuit including the inductor L1 and the capacitor C1 even when the hot cathode discharge lamp FL is turned on, the preheating currents If1 and If2 keeps flowing constantly.

The drive frequency fsw applicable to the switching elements Q1 and Q2 is switched between high and low levels according to a burst dimming signal that is supplied to the drive circuit 3. The burst dimming signal is a PWM signal (a rectangular wave signal) that repeats ON periods and OFF periods around several hundred hertz. In the ON period (an H level period) thereof, an oscillation output from an inverter circuit 1 is increased by reducing the drive frequency fsw in order to turn on the hot cathode discharge lamp FL. In the OFF period (an L level period) thereof, the oscillation output from the inverter circuit 1 is decreased by raising the drive frequency fsw in order to turn off the hot cathode discharge lamp FL. Then, dimming is performed by adjusting a time ratio between the ON period and the OFF period. A dimming ratio is set based on a proportion of the ON period relative to one cycle (the ON period+the OFF period) of the burst dimming signal.

Figure 2:
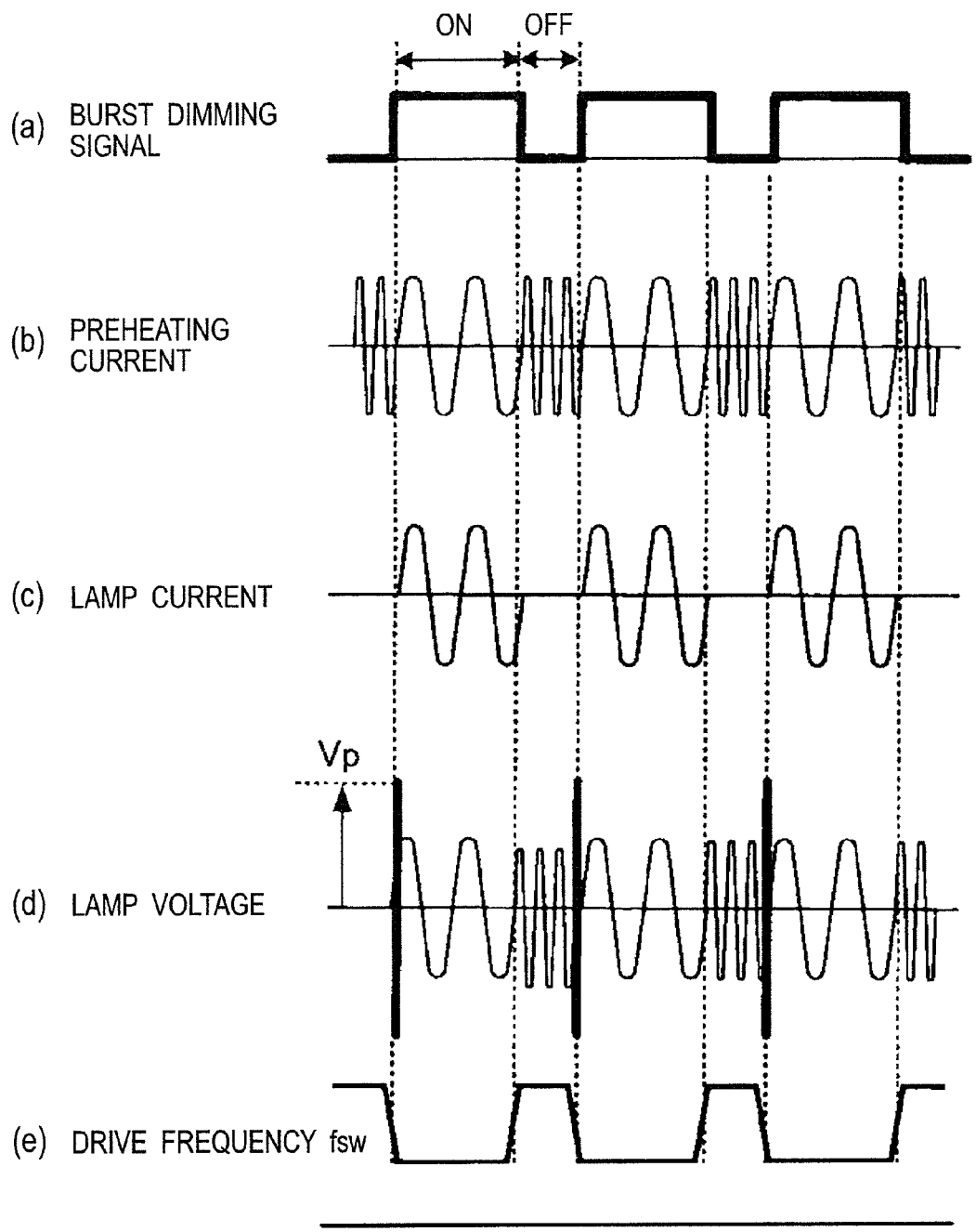
FIG. 2 is a waveform chart showing an operation of the discharge lamp lighting device shown in FIG. 1.
Figure 3:
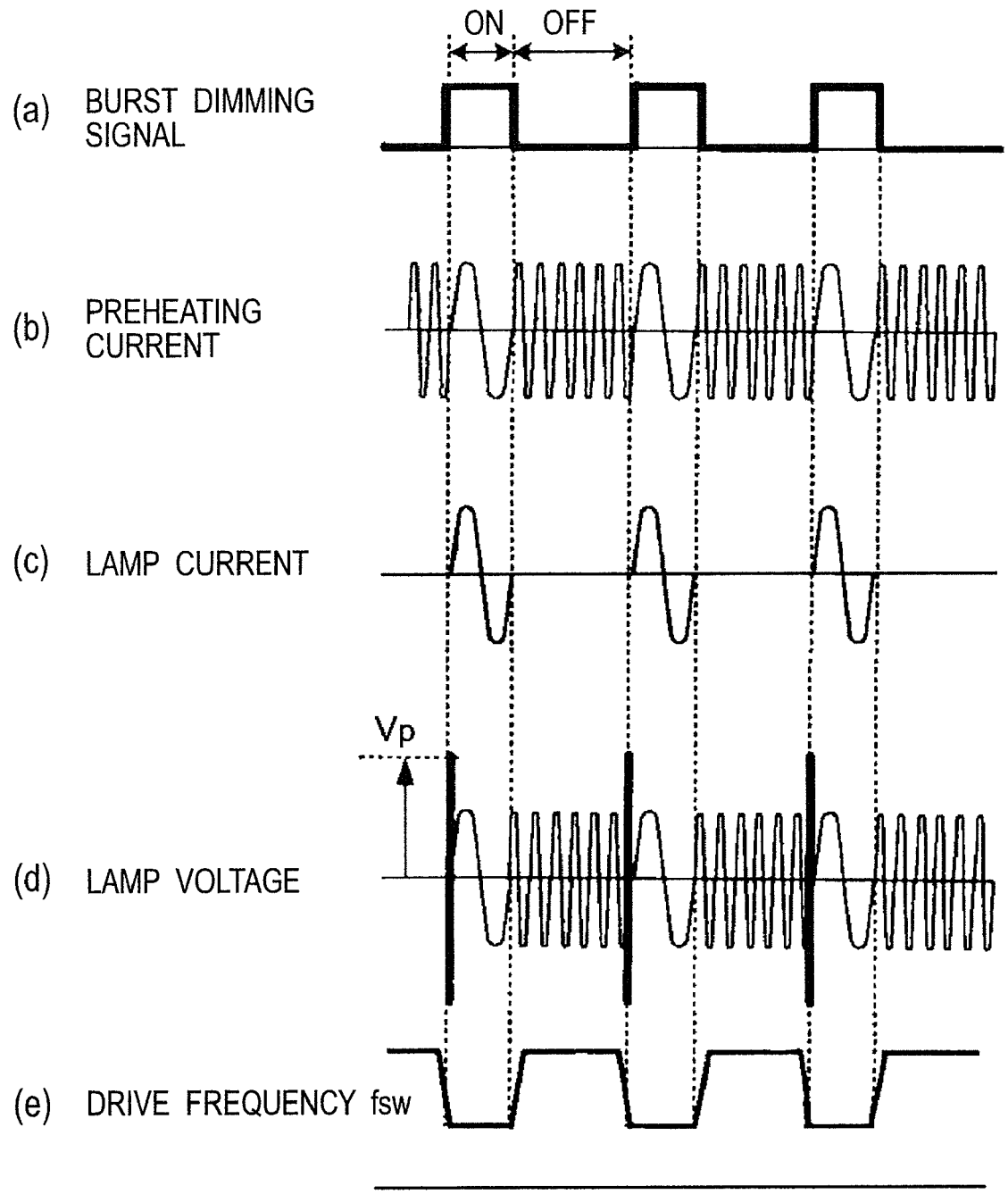
FIG. 3 is a waveform chart showing an operation of the discharge lamp lighting device shown in FIG. 1.
Figure 4:
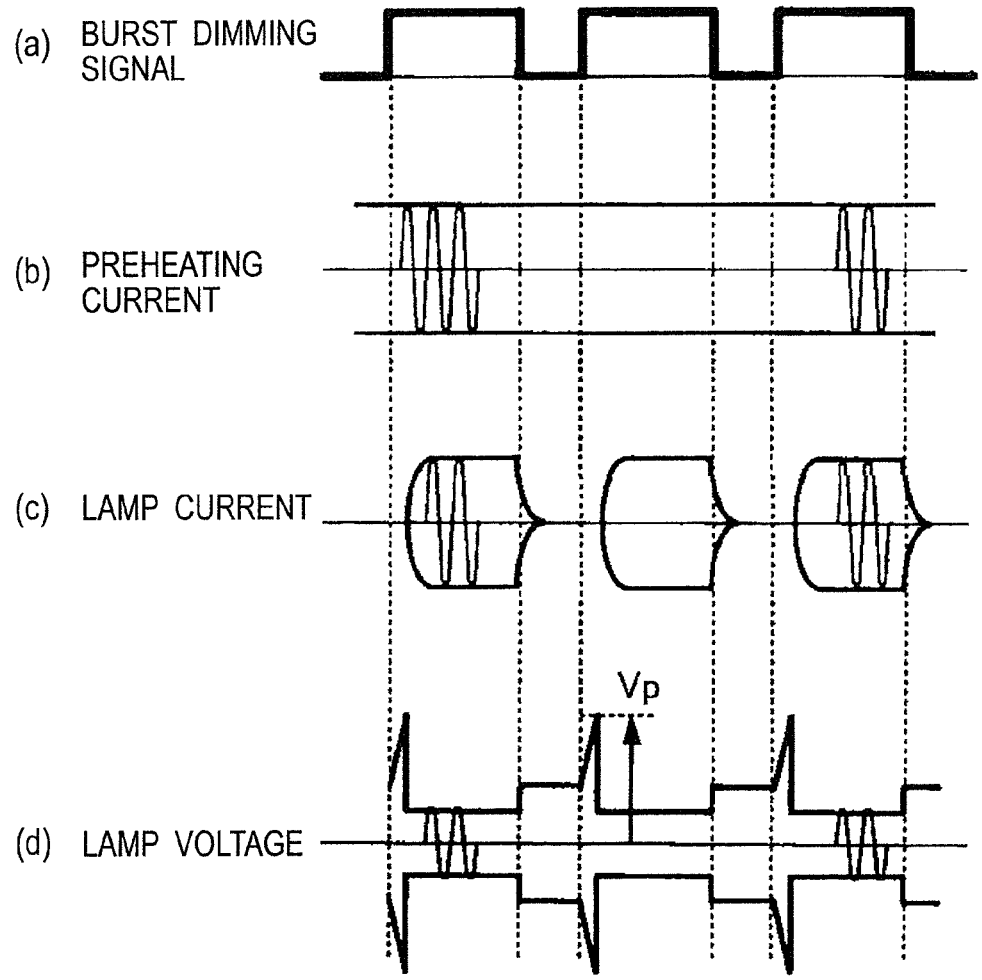
FIG. 4 is a waveform chart showing an operation of the discharge lamp lighting device shown in FIG. 1.

Operation waveforms of the discharge lamp lighting device of this embodiment are shown in FIG. 2 to FIG. 4. The operations of the discharge lamp lighting device of this embodiment are characterized in that a lamp current is securely stopped while a lamp voltage is applied to both ends of the discharge lamp FL even in the OFF period of the burst dimming signal, and that a preheating current continuously flows to the filaments irrespective of whether the lamp current is turned on or off.

FIG. 2 shows (a) the burst dimming signal, (b) the preheating current to the filaments, (c) the lamp current, (d) the lamp voltage, and (e) the drive frequency fsw, which are in a case where an on-duty ratio of the burst dimming signal is around 70%. FIG. 3 shows (a) the burst dimming signal, (b) the preheating current to the filaments, (c) the lamp current, (d) the lamp voltage, and (e) the drive frequency fsw when the on-duty ratio of the burst dimming signal is around 30%.

Note that waveforms of the preheating current, the lamp current, and the lamp voltages are schematically illustrated. Actually, these waveforms respectively oscillate at frequencies ranging from several kilohertz to several tens of kilohertz. Outlines of envelopes can be shown in FIG. 4. FIG. 4 shows the envelopes of (b) the preheating current, (c) the lamp current, and (d) the lamp voltage, when the on-duty ratio of the (a) burst dimming signal is around 70% (corresponding to FIG. 2). Although the envelope of the preheating current is drawn as a constant amplitude, the amplitude of the preheating current may vary between the ON period and the OFF period of the burst dimming signal. Here, the ON period of the burst dimming signal means a light-on period and the OFF period of the burst dimming signal means a light-off period.

When the hot cathode discharge lamp FL transitions from a light-off state to a light-on state, a high voltage Vp is generated in a lamp voltage Vla as the drive frequency fsw passes near a no-load resonance frequency of the inductor L1 and the capacitor C1, whereby the hot cathode discharge lamp FL is subjected to breakdown and initiated and thus a lamp current Ila starts flowing. When the lamp current Ila starts flowing, Q factor of the resonance circuit declines due to a lamp impedance of the hot cathode discharge lamp FL. Therefore, the high voltage Vp is not generated.

In FIG. 2 and FIG. 3, the preheating currents If1 and If2 are continuously supplied regardless of being the ON periods or the OFF periods of the burst dimming signal, and the lamp current Ila is surely turned on and off in conformity to the ON periods and the OFF periods of the burst dimming signal. A description will be given hereinafter of a principle that makes it possible to turn on and off the lamp current Ila while continuously supplying the preheating currents If1 and If2.

Figure 5:
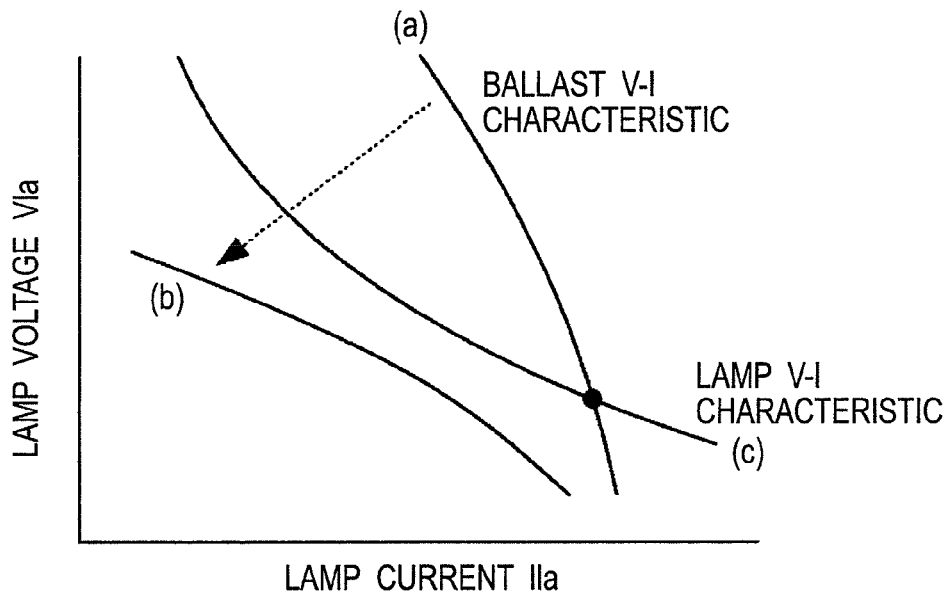
FIG. 5 is an operation explanatory diagram for explaining a principle of how the discharge lamp lighting device according to the first embodiment of the present invention controls turn-off of a lamp.

FIG. 5 shows a ballast V-I characteristic representing an output-voltage-to-output-current characteristic of the inverter circuit 1, and a lamp V-I characteristic representing a voltage-to-current characteristic of the discharge lamp FL, by defining the lateral axis as the lamp current Ila and the longitudinal axis as the lamp voltage Vla. The lamp V-I characteristic (c) is a negative characteristic so that the lamp voltage Vla is reduced when the lamp current Ila is increased. In the ballast V-I characteristic, a high-output characteristic (a) or a low-output characteristic (b) can be arbitrarily selected by changing the drive frequency fsw of the inverter circuit 1. In general, in a lag region (the region where the drive frequency fsw is higher than the on-load resonance frequency) where the inverter circuit 1 is operated, a drive frequency fa equivalent to the high-output characteristic (a) and a drive frequency fb equivalent to the low-output characteristic (b) satisfy a relation of fa<fb. An intersecting point of the ballast V-I characteristic and the lamp V-I characteristic is a point where a ballast and the lamp operate. Accordingly, the lamp is lighted at the lamp voltage Vla and the lamp current Ila at the black dot in the drawing when the ballast V-I characteristic has the characteristic (a) in FIG. 5. This state represents the ON period of the burst dimming signal.

Next, to obtain the OFF period of the burst dimming signal, the drive frequency fsw of the inverter circuit 1 is raised until obtaining the characteristic (b) in which the ballast V-I characteristic does not have an intersecting point with the lamp V-I characteristic. Accordingly, the hot cathode discharge lamp FL can be turned off securely while keeping the switching elements Q1 and Q2 of the inverter circuit 1 turned on or off. Therefore, the inverter circuit 1 performs an oscillating operation while the lamp FL is turned off, whereby the preheating currents If1 and If2 continue to flow. Accordingly, it is possible to preheat the filaments even in the light-off period of the hot cathode discharge lamp FL.

As apparent from the foregoing explanation, the discharge lamp lighting device of this embodiment makes the lamp current Ila stop flowing in the OFF period of the burst dimming signal by turning off the discharge lamp FL by an output control of the inverter circuit 1 while applying the lamp voltage Vla to both ends of the discharge lamp FL. Therefore, the device can significantly reduce stresses on the circuit elements in comparison with the discharge lamp lighting device according to Patent Document 2 that performs the on-off control of the lamp current by short-circuiting and opening both ends of the discharge lamp by using the switching elements.

Moreover, the discharge lamp lighting device of this embodiment makes the lamp current Ila on the discharge lamp FL stop flowing in the OFF period of the burst dimming signal by raising the drive frequency fsw of the inverter circuit 1 until the voltage-current characteristic (b) of the inverter circuit 1 have no intersecting point with the voltage-current characteristic (c) of the discharge lamp. Therefore, the device can perform on-off control of the lamp current Ila only with the simple configuration in which the drive frequency fsw of the inverter circuit 1 is alternately switched between a turning-off frequency and a starting/lighting frequency. Accordingly, the device can reduce stresses on the circuit elements significantly and achieve cost reduction more than the technique of Patent Document 2 which performs the on-off control of the lamp current by short-circuiting and opening both ends of the discharge lamp by using the switching elements, for example.

Moreover, the discharge lamp lighting device of this embodiment can apply the lamp voltage Vla to both ends of the discharge lamp FL while the lamp current Ila stops flowing. Accordingly, the device can continue preheating the filaments while the discharge lamp FL is turned off by utilizing the circuit configured to preheat the filaments while the discharge lamp FL is turned on, and thus can supply the preheating current evenly regardless of the ON periods and the OFF periods of the burst dimming signal. Therefore, the device can heat the hot cathode of the discharge lamp efficiently and lower a peak value of the preheating current, in comparison with the configuration of the discharge lamp lighting device disclosed in Patent Document 2, in which both ends of the discharge lamp are short-circuited or opened by using the switching elements to control application and stopping of the preheating current. Hence the device can reduce stresses on the hot cathode and increase life of the discharge lamp.

Moreover, the discharge lamp lighting device of this embodiment surely stops the lamp current IIa on the discharge lamp FL from flowing in the OFF period of the burst dimming signal. Accordingly, the device has an advantage that the device can dim to a lower level than the technique, for example, in which a full light-on state and a dimmed state are alternately repeated according to the burst dimming signals while the preheating current is supplied. Further, the discharge lamp lighting device of this embodiment can supply the lamp current and the preheating current by turning the common Q1 and Q2 on and off. Therefore, a preheating circuit does not have to be established independently so that the circuit becomes simpler.

Moreover, in the discharge lamp lighting device of this embodiment, the circuit configuration becomes simpler than that in the discharge lamp lighting device disclosed in Patent Document 3 because means (which corresponds to switching means 54 in Patent Document 3) for cutting the lamp voltage (a lamp end voltage=0) off is not required. Furthermore, the voltage is always applied to lamp ends in a period while the lamp is turned off. Accordingly, it is possible to transition to a lamp preheating mode promptly. In addition, the device can make one and the same inverter circuit to supply power to the lamp and currents to the filaments. Accordingly, the circuit is even more simplified and the circuit can be downsized, and costs for manufacturing the circuit can also be reduced.

Second Embodiment

Figure 6:
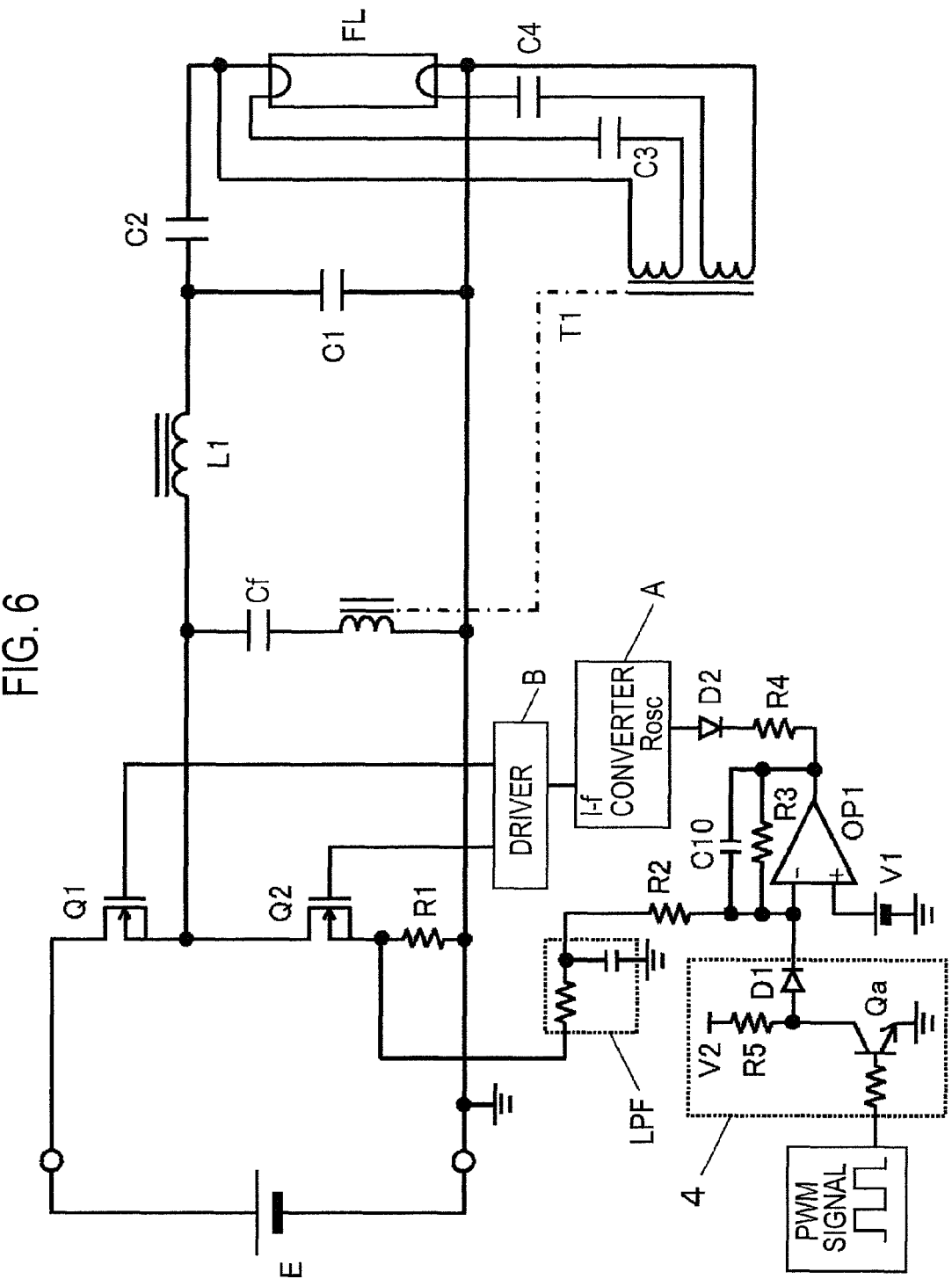
FIG. 6 is a circuit diagram showing a configuration of a discharge lamp lighting device according to a second embodiment of the present invention.

FIG. 6 is a circuit diagram showing a configuration of a discharge lamp lighting device according to a second embodiment of the present invention. The discharge lamp lighting device of this embodiment has a resistor R1 provided in series with the switching element Q2 added to the discharge lamp lighting device of the first embodiment shown in FIG. 1. A source current flowing to the switching element Q2 is detected by the resistor R1, then smoothed by a low-pass filter LPF, and outputted as a detection voltage. This detection voltage is then inputted to an inverting input terminal (a negative side input terminal) of an operational amplifier OP1 to be described later via a resistor R2 and is used for feedback control.

Moreover, the discharge lamp lighting device of this embodiment has a modified configuration of a preheating circuit 2 in the discharge lamp lighting device of the first embodiment, and is provided with a preheating transformer T1 independently of the resonance inductor L1 and a series circuit, that includes a primary coil thereof and a capacitor Cf, connected in parallel to both ends of the switching element Q2. The preheating transformer T1 includes a pair of secondary coils, which are respectively connected to the filaments (the hot cathodes) of the hot cathode fluorescent lamp FL via the preheating capacitors C3 and C4. When a switching frequency on the switching elements Q1 and Q2 is increased, an impedance of the preheating capacitors C3 and C4 is reduced. Accordingly, the preheating current to the filaments is increased.

This circuit similarly supplies the preheating current to the filament by using the inverter circuit configured to supply the lamp current to the hot cathode fluorescent lamp FL. Accordingly, no additional inverter is required for preheating the filaments, and therefore the circuit can contribute to reduction in the size and weight of the lighting device and to cost reduction thereof. Moreover, unlike the preheating circuit 2 of the first embodiment, the preheating circuit in FIG. 6 is provided independently of the resonance circuit that includes the inductor L1 and the capacitors C1 and C2. Therefore, a serial resonance characteristic of the preheating transformer T1 and the capacitor Cf can be used to supply the preheating current from the secondary coils of the preheating transformer T1 to the respective filaments via the preheating capacitor C3 and C4. Accordingly, the preheating current can be set relatively freely and life of the lamp can be longer.

Next, a control circuit will be described. An operating frequency of the switching elements Q1 and Q2 is determined by a high-frequency signal which is outputted from an I-f converter A. The I-f converter A is an oscillation control IC that has a high-frequency oscillator therein and an oscillation frequency thereof is variably controlled in accordance with a current value flowing out of a terminal Rosc. This terminal Rosc is an external resistor connection terminal for setting up the oscillation frequency of the oscillation control IC. When an external resistor is connected between the terminal Rosc and a reference potential (such as the ground potential or an output potential of the operational amplifier) located outside, the oscillation frequency is variably controlled in accordance with the current value flowing out of a reference voltage source inside the IC via the external resistor.

In the circuit of FIG. 6, an end of a resistor R4 is connected to an output terminal of the operational amplifier OP1 and the other end of the resistor R4 is connected to the external resistor connection terminal Rosc for setting up the oscillation frequency of the I-f converter A via a diode D2. Therefore, the oscillation frequency of the I-f converter A is determined by a resistance value of the resistor R4 and the output potential of the operational amplifier OP1.

A reference voltage V1 is applied to a non-inverting input terminal (a positive side input terminal) of the operation amplifier OP1. Since the operational amplifier OP1 is a differential amplifier having an extremely high amplification factor, the output potential thereof is controlled such that the inverting input terminal (the negative side input terminal) and the non-inverting input terminal (the positive side terminal) have substantially the same potential. Between the output terminal and the inverting input terminal of the operational amplifier OP1, a parallel circuit including a capacitor C10 and a resistor R3 and serving as a feedback impedance is connected.

The operational amplifier OP1 serves both as an error amplifier for feedback control and as an adder for burst dimming control. Connected to the inverting input terminal of the operational amplifier OP1 are: an output of the low-pass filter LPF via a resistor R2, the output serving as a first input; and an output of a burst dimming control unit 4 the output serving as a second input.

The burst dimming control unit 4 inputs the PWM signal for determining the time ratio between the light-on period and the light-off period, and turns on and off a switching element Qa by using this PWM signal. Here, a bipolar transistor is used as the switching element Qa but an FET is also applicable. The switching element Qa is turned on in the light-on period and a decline in a collector potential thereof inversely biases a diode D1, whereby the output of the burst dimming control unit 4 is set to a high impedance state. In other words, during the light-period, the circuit is in the same state as that in which the burst dimming control unit 4 is not connected, and the operational amplifier OP1 acts as the error amplifier for the feedback control.

Specifically, the operation amplifier OP1 compares a first reference voltage V1 as a target value with an output voltage from a current detection circuit as a detected value, and controls the output to reduce the error. To be more precise, when a circuit current exceeds the target value, the operation amplifier OP1 makes a control to increase the operating frequency of the switching elements Q1 and Q2 so as to suppress the increase in the circuit current. When the circuit current falls below the target value, the operation amplifier OP1 makes a control for lowering the operating frequency of the switching elements Q1 and Q2 so as to suppress the decrease in the circuit current.

Meanwhile, the switching element Qa is turned off in the light-off period and a collector thereof is in the high impedance state. Accordingly, a second reference voltage V2 is connected to the inverting input terminal of the operational amplifier OP1 via a resistor R5 and the diode D1. At this time, the operational amplifier OP1 also serves as the adder for the burst dimming control, and thus the second reference voltage V2 is added to the detected voltage by the current detection circuit at a proportion between the input resistors R2 and R5.

Specifically, for the operational amplifier OP1, the circuit is in a state just like the one where the detected voltage of the circuit current to be outputted from the low-pass filter LPF is boosted. Therefore, the operational amplifier OP1 changes an output potential so as to reduce the circuit current. At this time, the operation amplifier OP1 only has to set the frequency in the light-off period so as to turn the hot cathode fluorescent lamp FL off, and thus can define the frequency in the light-off period by using the second reference voltage V2.

In this embodiment, the circuit current including a load current (the lamp current plus the filament current) and the resonance current is detected by the source resistor R1 of the switching element Q2. The low-pass filter LPF is inserted for cutting high-frequency components, but the low-pass filter LPF is not necessarily for an operation without providing as far as the feedback impedance of the operational amplifier OP1 and the like are appropriately set. Therefore the low-pass filter LPF should only be inserted as appropriate.

Figure 7:
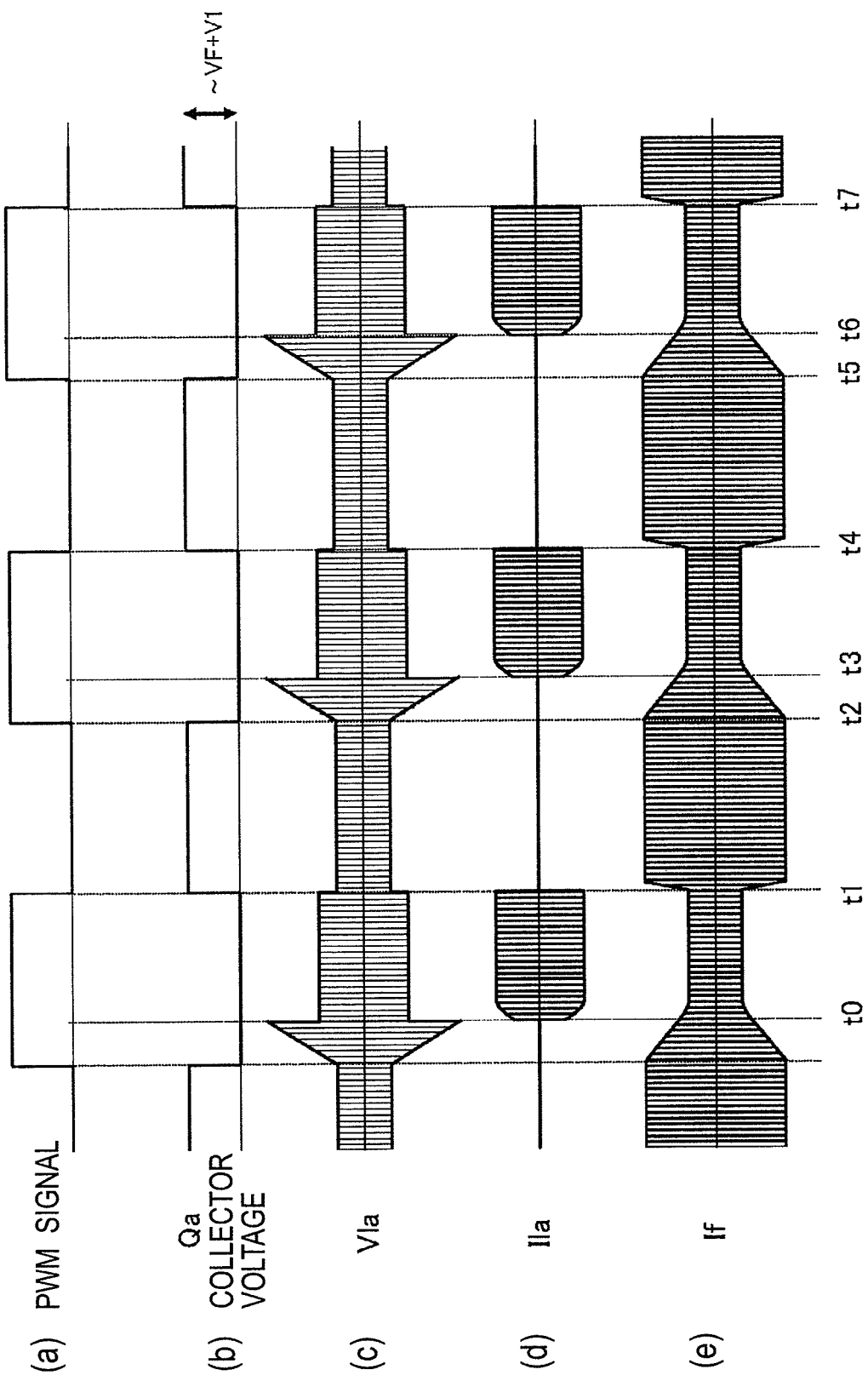
FIG. 7 is a waveform chart showing an operation of the discharge lamp lighting device shown in FIG. 6.

FIG. 7 is a waveform chart for explaining an operation of the discharge lamp lighting device of this embodiment. In the drawing, (c) Vla denotes the lamp voltage, (d) Ila denotes the lamp current, and (e) If denotes the filament current. When the PWM signal inputted to the burst dimming control unit 4 is in an H level, a collector voltage of the transistor Qa is in a ground level. When the PWM signal is in an L level, the collector voltage of the transistor Qa is substantially VF+V1. Here, VF denotes a forward voltage drop of the diode D1 and V1 denotes the first reference voltage being applied to the non-inverting input terminal (the positive side input terminal) of the operational amplifier OP1. As described previously, the inverting input terminal (the negative side input terminal) and the non-inverting input terminal (the positive side input terminal) of the operational amplifier OP1 have substantially the same potential and establish a so-called imaginary short-circuit state. Accordingly, the potential of the inverting input terminal (the negative side input terminal) of the operational amplifier OP1 also becomes the first reference voltage V1.

Figure 8:
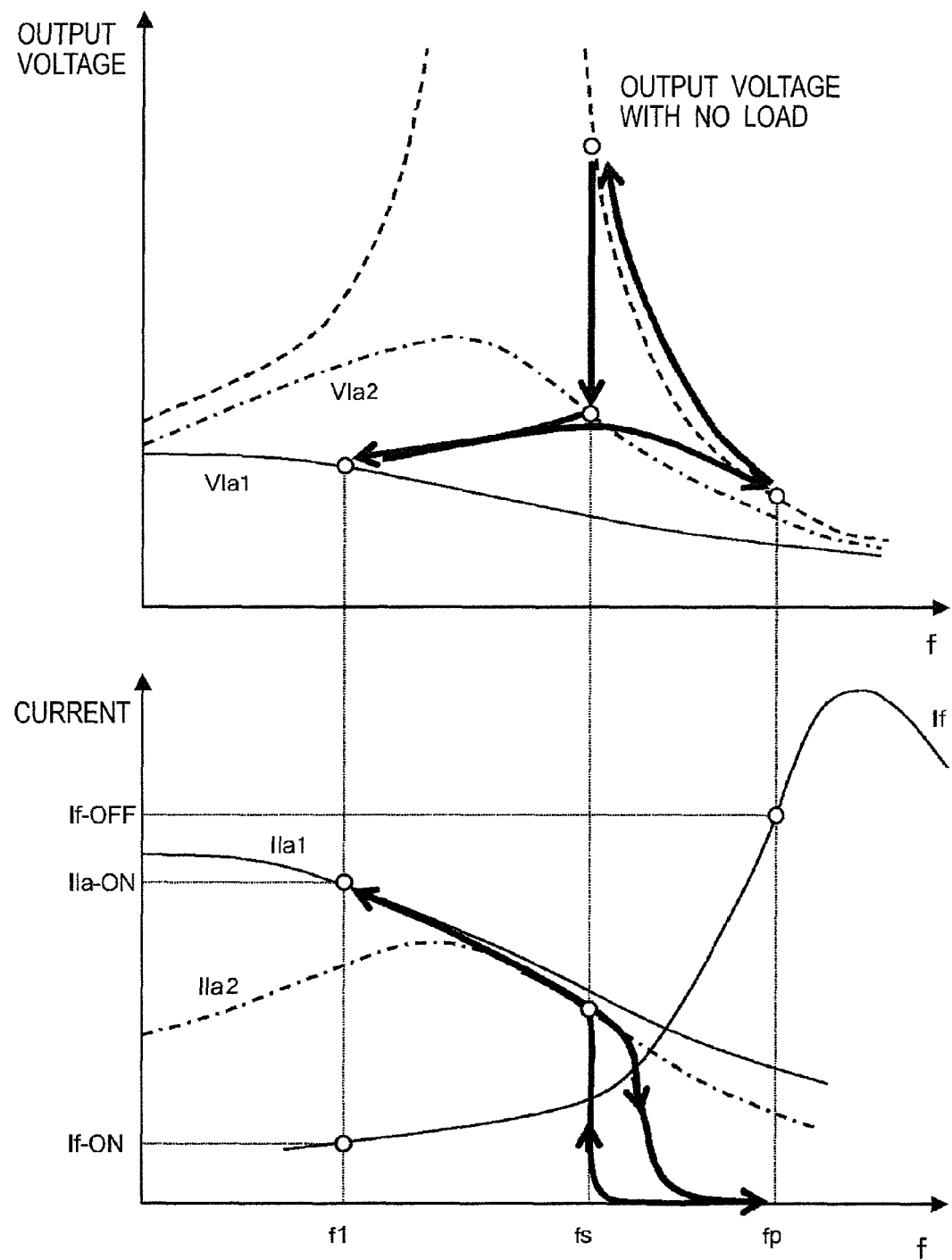
FIG. 8 is a frequency characteristic chart for explaining an operation of the discharge lamp lighting device shown in FIG. 6.

FIG. 8 is a frequency characteristic chart for explaining the operation of the discharge lamp lighting device of this embodiment. In FIG. 8, Vla1 and Ila1 indicated with solid lines show frequency characteristics of the resonance circuit in which the lamp impedance during lighting based on the output equivalent to the first reference voltage V1 is applied as a load. Meanwhile, Vla2 and Ila2 indicated with dashed lines show frequency characteristics of the resonance circuit in which the lamp impedance immediately after lighting at a frequency fs is applied as a load.

Now with reference to the frequency characteristics of FIG. 8, the operation of this embodiment will be described for periods of t0 to t1, t1 to t2, and t2 to t3 in the waveform chart of FIG. 7.

[Concerning Period t0 to t1]

The PWM signal is in the H level in this period. Accordingly, the switching element Qa is turned on and the diode D1 is turned off, so that the light is turned on at an output equivalent to the first reference voltage V1. A frequency at this time is defined as f1. The magnitude of the lamp current is equal to Ila-ON in FIG. 8. The magnitude of the lamp current Ila-ON in light-on period can be regulated by adjusting the first reference voltage V1. This operation is the same as a conventional current feedback dimming method.

Meanwhile, the preheating current in this period is equal to If-On in FIG. 8. As the frequency f1 is low in the light-on period, the impedance of the preheating capacitors C3 and C4 becomes high and the preheating current If-ON is therefore suppressed in the light-on period. The preheating current may be low in the light-on period because spots (luminescent spots) of the filaments are heated by the lamp current. The low preheating current is rather favorable because extra power consumption is suppressed. Moreover, there is also an effect to prevent an excessive rise in temperature of thermal electron emitting materials (emitters) in the filaments and thus to increase life of the lamp.

[Concerning Period t1 to t2]

When the switching element Qa is turned off at a time point t1, an additional current flows from the second reference voltage V2 toward the inverting input terminal (the negative side input terminal) of the operational amplifier OP1 via the resistor R5 and the diode D1, and thus the operational amplifier performs the feedback operation to reduce the output. That is, the output voltage of the operational amplifier OP1 is reduced and the current to be taken out of the terminal Rosc of the I-f converter A via the resistor R4 is increased. Accordingly, for the oscillation control IC that constitutes the I-f converter A, this is just like a decrease in size of an external resistor. As an apparent oscillation time constant is reduced, the oscillation frequency becomes higher. Here, if the current flowing to the resistor R5 is sufficiently large, the output voltage drops to a lower limit of an output-enable range of the operational amplifier OP1. In the case of the operational amplifier having a single power source, the output voltage of the operational amplifier OP1 becomes substantially 0 V, while the oscillation frequency of the I-f converter A becomes an oscillation frequency that is determined by the resistor R4. In this way, a preheating frequency fp in the light-off period is set.

This preheating frequency fp is set lower than a serial resonance frequency of the preheating transformer T1 and the DC cut capacitor Cf (see FIG. 8). Meanwhile, since the preheating frequency fp in the light-off period is higher than the frequency f1 in the light-on period, the impedance of the preheating capacitors C3 and C4 is also reduced. Accordingly, the preheating current in the light-off period is significantly increased as compared to If-ON during lighting as shown in If-OFF in FIG. 8, whereby the filaments (the hot cathodes) are sufficiently preheated. This has an effect to reduce a reignition voltage in a subsequent lighting session.

[Concerning Period t2 to t3]

When the switching element Qa is turned on at a time point t2, the current which has been added by the second reference voltage V2 is cut off as the diode D1 is turned off, thereby reducing an input of a feedback circuit. Accordingly, the frequency drops from the preheating frequency fp to increase the output, and the lamp voltage is gradually increased along a no-load output voltage curve indicated by a broken line in FIG. 8. When the voltage exceeds a level necessary for starting, the lamp is turned on at the frequency fs in FIG. 8 (a time point t3). As described previously, the curves Vla2 and Ila2 indicated with the dashed lines in FIG. 8 represent the frequency characteristics of the resonance circuit in which the lamp impedance immediately after lighting at the frequency fs is applied as a load, and the curves Vla1 and Ila1 indicated with the solid lines represent the frequency characteristics of the resonance circuit in which the lamp impedance during lighting with the output equivalent to the first reference voltage V1 is applied as a load. The frequency is eventually changed to the frequency f1 equivalent to the first reference voltage V1, and the same operation as in the period t0 to t1 will be repeated thereafter.

Here, a frequency variation at the time of on-off switching of the switching element Qa is determined by responsiveness of the feedback circuit, or namely, by an integration time constant. In other words, a capacitor C10 included in the feedback impedance of the operational amplifier OP1 functions like an integrating capacitor of a mirror integrator. Accordingly, the increase in capacity of this capacitor C10 makes it possible to achieve gentle variation from the preheating frequency fp to the lighting frequency f1 and to reduce stresses on the circuit elements or the lamp. Moreover, there is also an effect in suppressing noise generation.

Operations from the time point 3 on are the same as the operations in the time period t0 to t3. Thereafter, lighting on and off are repeated by similar operations as described above, and thereby an optical output in accordance with the time ratio between the H level and the L level of the PWM signal can be obtained. Here, the frequency of the PWM signal is a frequency (around several hundred hertz) too small for human eyes to recognize blinking, and therefore the frequency may be synchronized with pixel updating timing of a liquid crystal display device. Meanwhile, when the PWM signal is always set to the H level, the switching element Qa is always turned on and the burst dimming control unit 4 is not operated, thereby constituting a continuously lighted state.

As described above, in the discharge lamp lighting device of this embodiment, the discharge lamp lighting device is provided with a V-f converter that compares the circuit current with the first reference voltage V1 and changes the operating frequency of the inverter circuit according to the error signal. In the device, the second reference voltage V2 is added to the output voltage from the current detection circuit in the light-off period upon receipt of the burst dimming signal. Accordingly, in the light-off period determined by the burst dimming signal, the device is operated as if the circuit current is increased, and the frequency is variably controlled so as to reduce the output from the inverter circuit. Therefore, the device can control the circuit current in the light-on period by using the first reference voltage V1, control the circuit current in the light-off period by using the second reference voltage V2, and make a control so as to reduce stresses on the discharge lamp and the circuit elements which are the loads.

Moreover, the discharge lamp lighting device of this embodiment is configured to control the light-off period and the light-on period by control of turning the first switching element Qa off and on whether or not to add the second reference voltage V2 to the inverting input terminal of the operational amplifier OP1. Accordingly, the device can significantly reduce stresses on the switching elements for the burst dimming control in comparison with the discharge lamp lighting device disclosed in Patent Document 2 which is configured to control the light-off period and the light-on period by short-circuiting and opening both ends of the discharge lamp by using the switching elements. Further, the discharge lamp lighting device of this embodiment can implement the burst dimming method merely by adding a small number of components to the inverter circuit of a frequency variable control type that has the current feedback function.

Meanwhile, in the discharge lamp lighting device of this embodiment, the V-f converter includes a V-I converter and the I-f converter. The V-I converter is configured to connect the third resistor R4 between a third reference voltage (the voltage of the terminal Rosc) and the output of the operational amplifier OP1 and to input to the I-f converter A the current flowing to the third resistor R4. Moreover, in the discharge lamp lighting device of this embodiment, the output of the operational amplifier OP1 is set substantially to the reference potential in the light-off period and the operating frequency in the light-off period is set by using the third resistor R4. Therefore, the discharge lamp lighting device of this embodiment can form a simple frequency control circuit at low costs by using the operational amplifier and the oscillation control IC that has a reference voltage source inside a resistor connection terminal for setting the oscillation frequency.

Furthermore, in the discharge lamp lighting device of this embodiment, the inverter circuit includes at least one of the switching elements Q1 and Q2 and the current detection circuit (the resistor R1) detects the current on the switching element Q2 of the inverter circuit. Hence it is possible to detect lamp power substantially.

Third Embodiment

Figure 9:
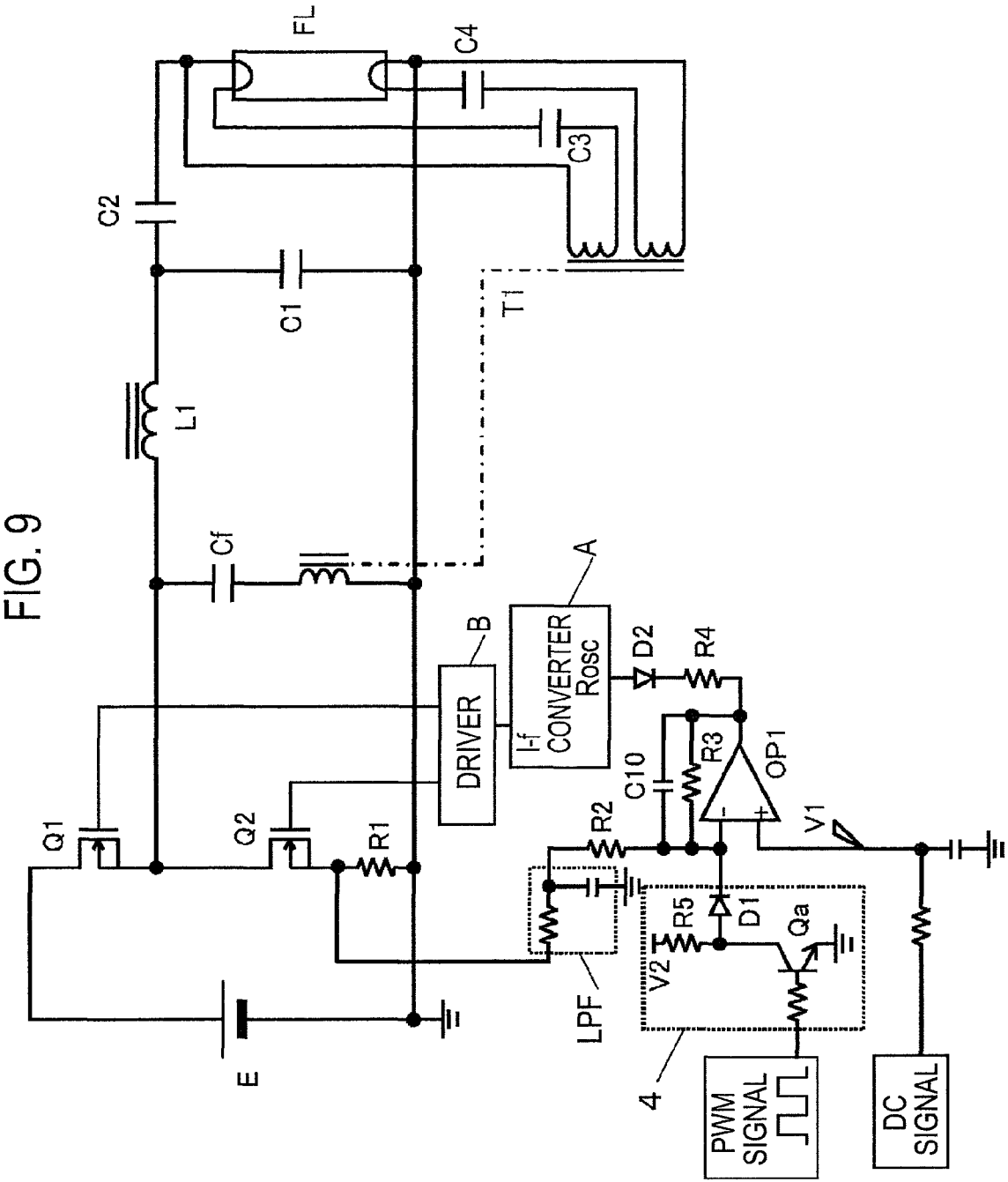
FIG. 9 is a circuit diagram showing a configuration of a discharge lamp lighting device according to a third embodiment of the present invention.

FIG. 9 is a circuit diagram of a discharge lamp lighting device according to a third embodiment of the present invention. The discharge lamp lighting device of this embodiment provides a circuit obtained by modifying the circuit of the second embodiment shown in FIG. 6, in a way that the first reference voltage V1 to be applied to the non-inverting input terminal (the positive side input terminal) of the operational amplifier OP1 is changed by a DC signal supplied from outside to make the output in the light-on period variable.

Figure 10:
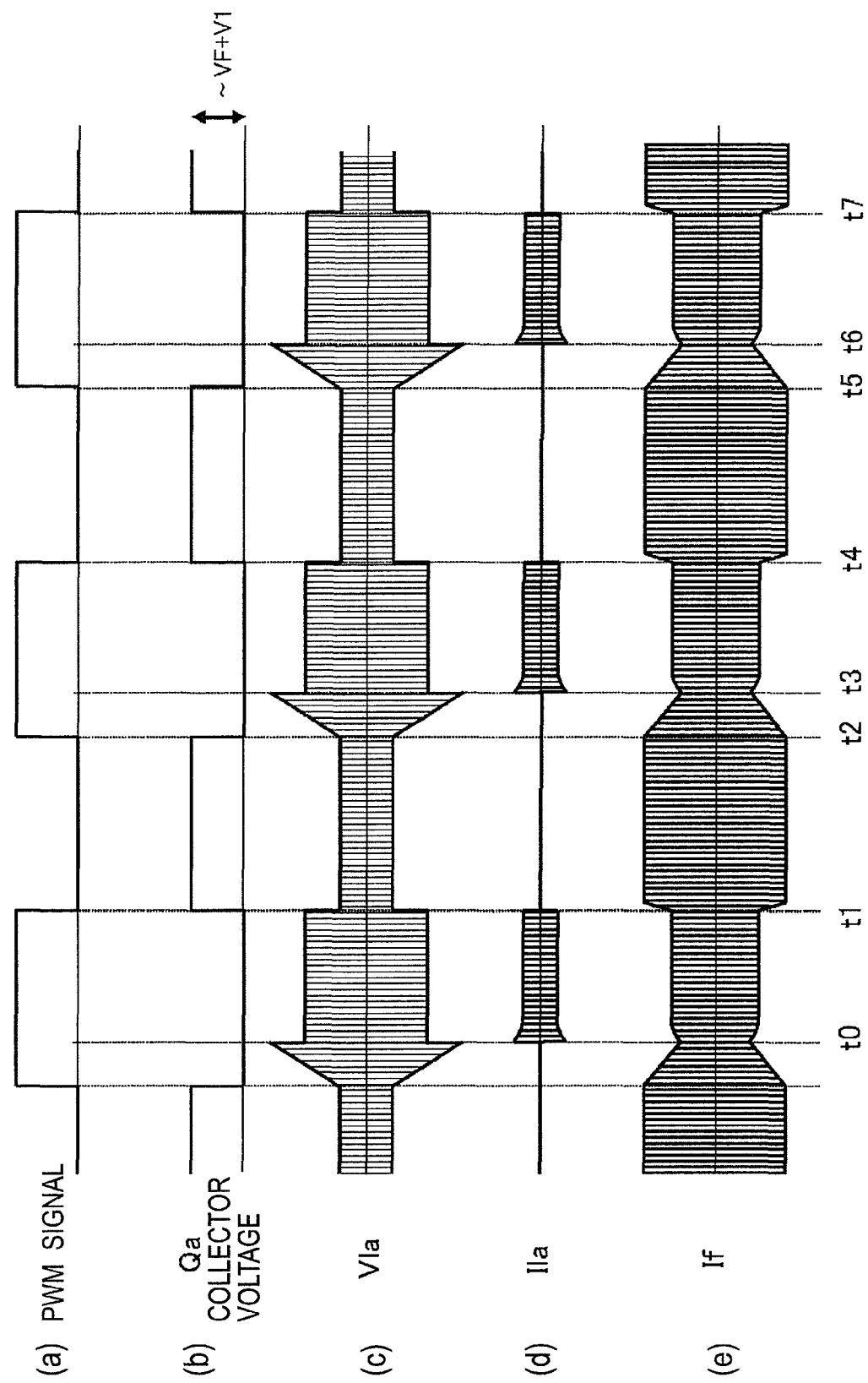
FIG. 10 is a waveform chart showing an operation of the discharge lamp lighting device shown in FIG. 9.

FIGS. 10($a$) to 10($e$) are operation waveform charts of the discharge lamp lighting device of this embodiment, which show operations in the case of setting the first reference voltage V1 smaller than that of the discharge lamp lighting device of the second embodiment. The amplitude of the lamp current Ila is smaller than that in FIG. 7. In addition, the filament current If in the light-on period is greater than that in FIG. 7.

Figure 11:
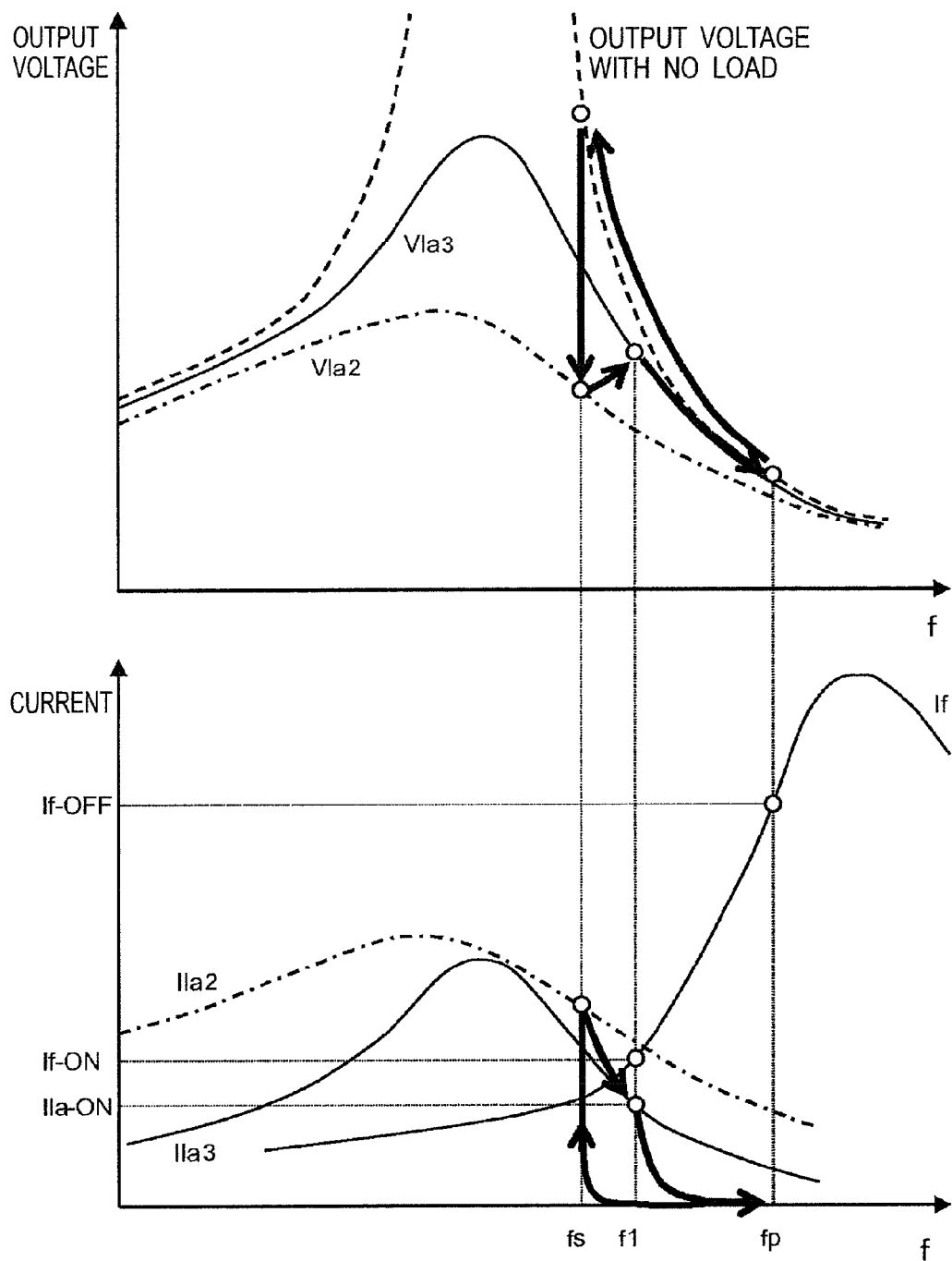
FIG. 11 is a frequency characteristic chart for explaining an operation of the discharge lamp lighting device shown in FIG. 9.

FIG. 11 is an operation explanatory diagram of the discharge lamp lighting device of this embodiment which shows variations in the voltage, the current, and the frequency when fs<f1. Curves Vla2 and Ila2 indicated with dashed lines in FIG. 11 represent frequency characteristics of the resonance circuit when a lamp impedance immediately after lighting at the frequency fs is applied as a load, and curves Vla3 and Ila3 indicated with solid lines represent frequency characteristics of the resonance circuit when a lamp impedance during lighting with an output equivalent to the first reference voltage V1 set to a lower level is applied as the load.

As shown in FIG. 11, when the frequency f1 in the light-on period is higher than the starting frequency fs, the oscillation frequency of the inverter changes so as to decline from the preheating frequency fp in the light-off period down to the starting frequency fs temporarily, and then to raise to the frequency f1 in the light-on period again. This is because the inverter has the current feedback function. The decline in the oscillation frequency continues until the lamp current starts flowing at the starting frequency fs. When the lamp current Ila2 located on the curve indicated with the dashed line is detected, the oscillation frequency is operated so as to rise up to the frequency f1 eventually reaching the output Ila-ON that corresponds to the first reference voltage V1. Although it is not expressly stated in the second embodiment, a resonance characteristic of the output voltage is shifted to a high-frequency side and a peak value becomes higher as the frequency f1 during lighting rises because Q factor of the resonance circuit becomes higher due to an increase in load impedance of the fluorescent lamp FL.

Figure 12:
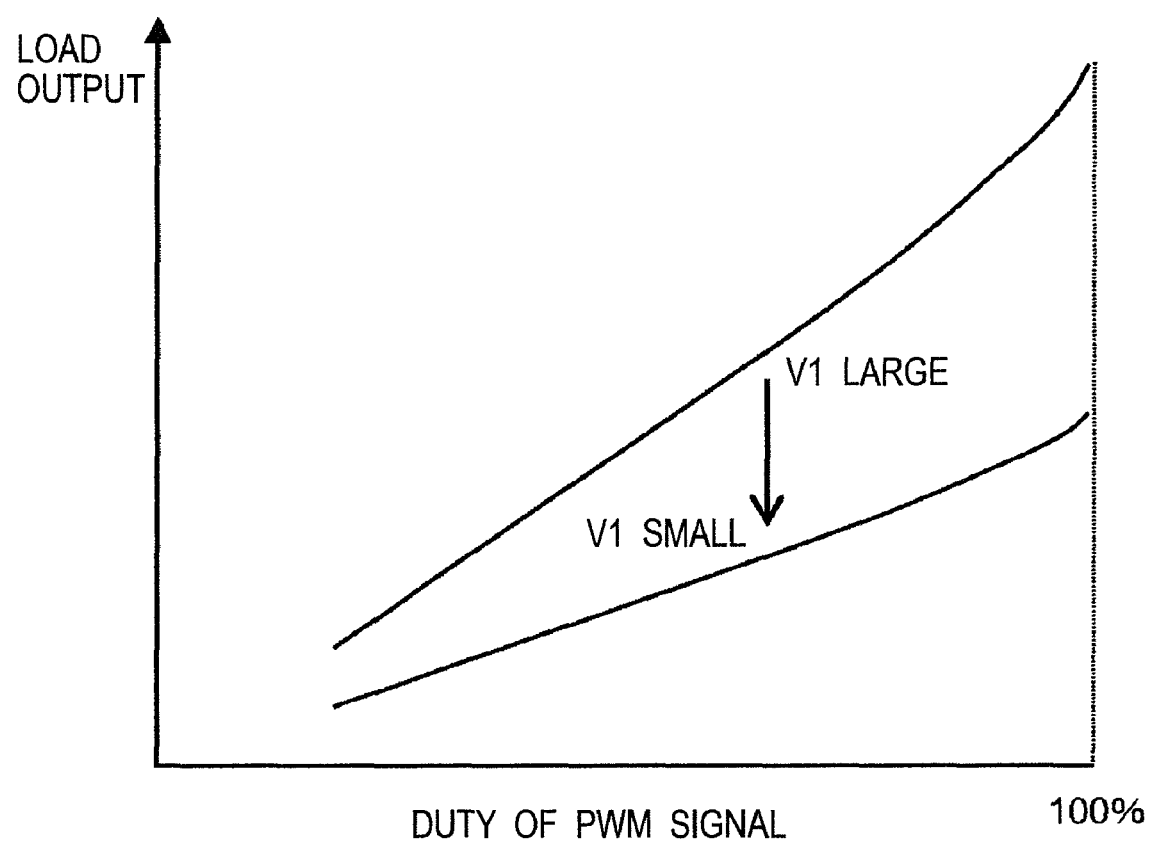
FIG. 12 is an operation explanatory diagram of the discharge lamp lighting device shown in FIG. 9.

FIG. 12 shows an output characteristic of the discharge lamp lighting device of this embodiment. The lateral axis indicates an on-duty ratio of the PWM signal (ratio of an H level period in one cycle) and the longitudinal axis indicates a load output (an optical output). The output characteristic is configured to increase or decrease the load output in accordance with an increase or decrease in the first reference voltage V1 to be applied to the non-inverting input terminal (the positive side input terminal) of the operational amplifier OP1 while maintaining a characteristic to increase the load output as the on-duty ratio of the PWM signal rises. That is, the time ratio between the light-on period and the light-off period remains the same as long as the on-duty ratio of the PWM signal is the same. However, when the first reference voltage V1 is increased or decreased, the magnitude of the lamp current is increased or decreased in the light-on period (see Ila each in FIG. 7(d) and FIG. 10(d)). Accordingly, it is possible to increase or decrease the optical output as a whole.

As described above, the discharge lamp lighting device of this embodiment changes the load output in the light-on period by making the first reference voltage V1 variable, and thus can control the load output in the light-on period easily. Moreover, the device can realize a combination of burst dimming and current dimming by using a low-cost structure and thus can achieve dimming to a lower level. That is, when lower-level dimming is required, only operations that should be made are to reduce the on-duty ratio of the PWM signal so as to shorten the light-on period of burst dimming, and to reduce the first reference voltage V1 so as to reduce the lamp current in the light-on period. In this way, the device can adjust the optical output in a broader range than that does which use burst dimming only or current dimming only.

Fourth Embodiment

Figure 13:
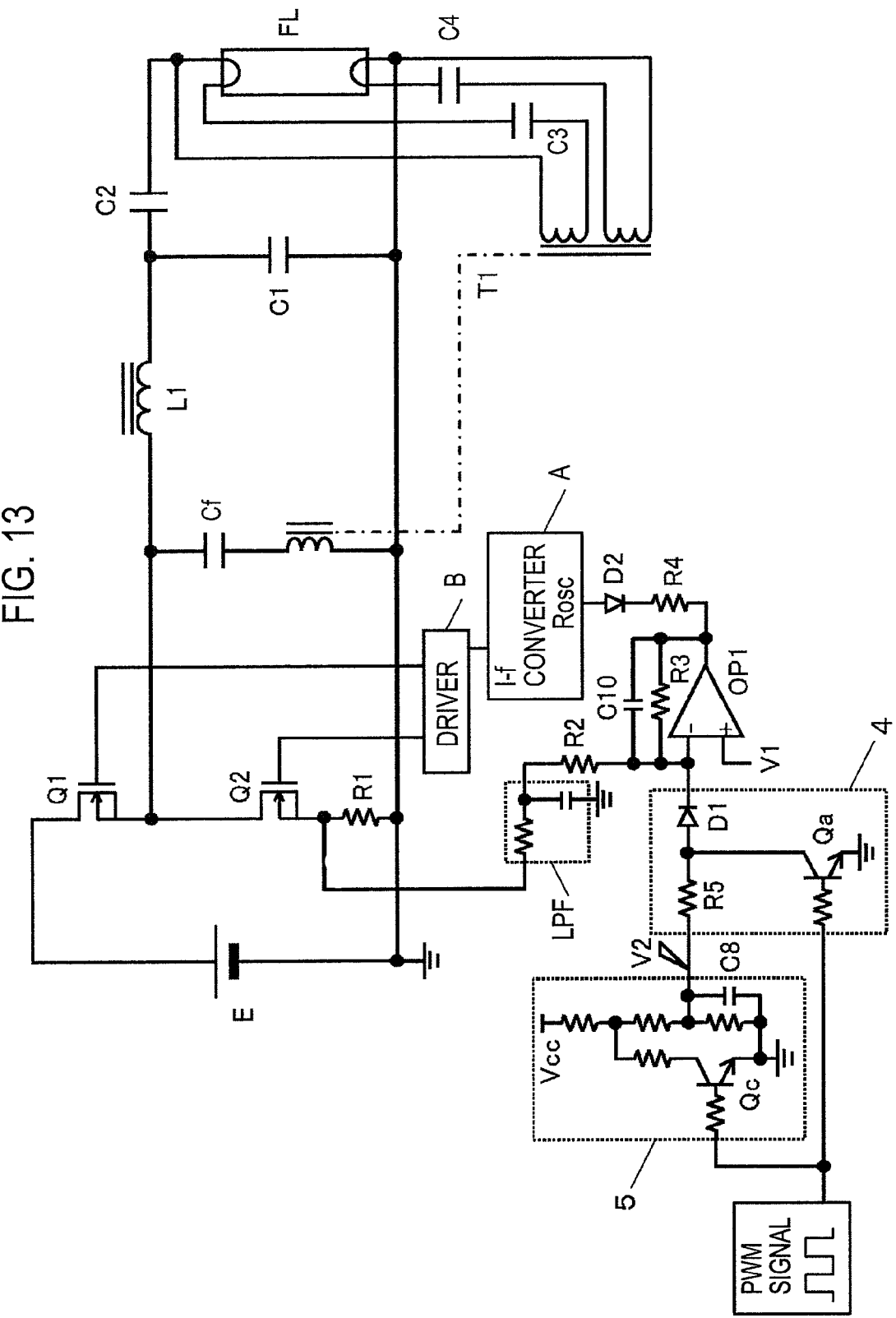
FIG. 13 is a circuit diagram showing a configuration of a discharge lamp lighting device according to a fourth embodiment of the present invention.

FIG. 13 is a circuit diagram of a discharge lamp lighting device according to a fourth embodiment of the present invention. The discharge lamp lighting device of this embodiment is characterized by including a circuit obtained by modifying the circuit of the second embodiment shown in FIG. 6, in a way that the second reference voltage V2 is changed in accordance with an on-duty ratio of the PWM signal. A duty-DC converter 5 includes a switching element Qc which performs on and off operations synchronously with H and L levels of the PWM signal and a capacitor C8 for generating the second reference voltage V2. This capacitor C8 is charged by a resistive divided voltage from a control power source voltage Vcc. A voltage division ratio of the resistive divided voltage is small when the switching element Qc is turned on and is large when the switching element Qc is turned off. Accordingly, when the on-duty ratio (the ratio of the H level period in one cycle) of the PWM signal is large, an average voltage division ratio is reduced whereby the second reference voltage V2 becomes smaller. Here, a time constant for charging and discharging the duty-DC converter 5 is set large enough to prevent the second reference voltage V2 from fluctuating within the cycle of the PWM signal.

Figure 14:
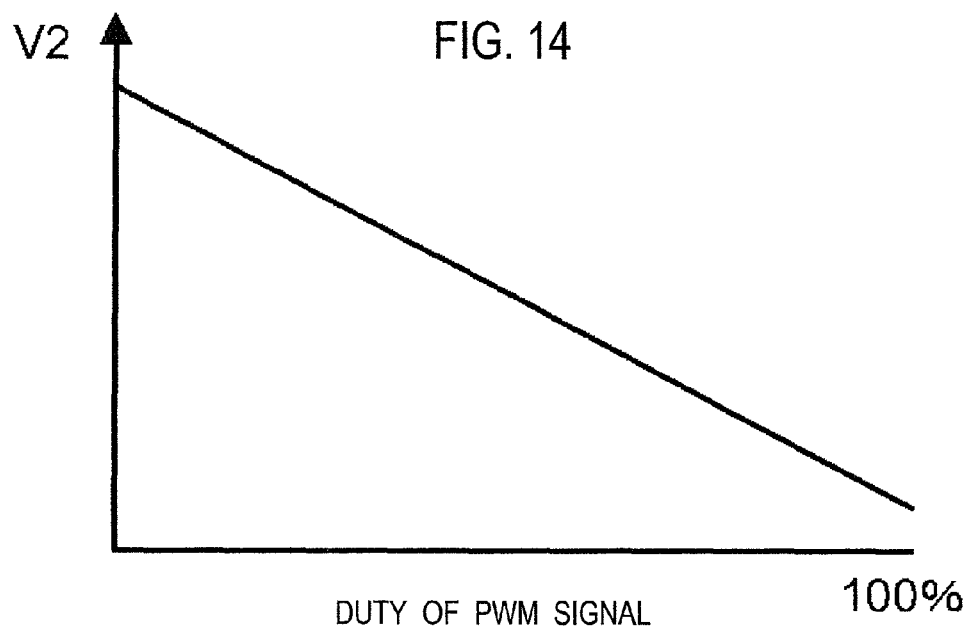
FIG. 14 is an input-output characteristic chart of a converter used in the discharge lamp lighting device shown in FIG. 13.

FIG. 14 shows an input-output characteristic of the duty-DC converter 5. The lateral axis indicates the on-duty ratio of the PWM signal and the longitudinal axis indicates the second reference voltage V2. As shown in FIG. 14, the second reference voltage V2 becomes higher as the on-duty ratio of the PWM signal decreases.

Figure 15:
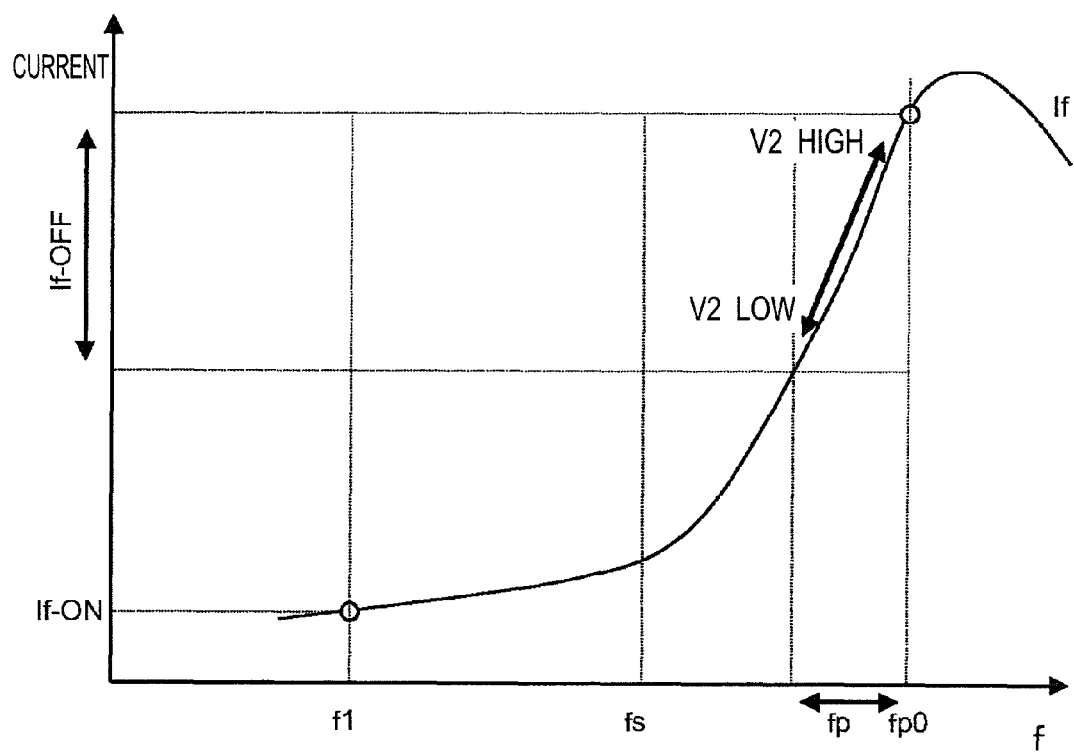
FIG. 15 is an operation explanatory diagram showing variation of a preheating current in the discharge lamp lighting device shown in FIG. 13.

FIG. 15 is an operation explanatory diagram of the discharge lamp lighting device of this embodiment, which shows how the preheating current If-OFF in the light-off period changes as the second reference voltage V2 increases or decreases. Here, a frequency when the output voltage of the operational amplifier OP1 reaches a lower limit is defined as fp0. It is possible to increase the output voltage of the operational amplifier OP1 in the light-off period by reducing the second reference voltage V2. In this way, it is possible to set the preheating frequency fp lower than the upper limit frequency fp0.

As described above, in the discharge lamp lighting device of this embodiment, the second reference voltage V2 is the DC voltage which is obtained by inputting either the burst dimming signal or an inverted signal thereof to the duty-DC converter 5. Therefore, the magnitude of the preheating current in the light-off period can be appropriately set in accordance with the level of dimming. Moreover, according to the discharge lamp lighting device of this embodiment, when the on-duty ratio of the PWM signal becomes greater and the light-off period becomes shorter, the preheating frequency fp becomes lower as the second reference voltage V2 is reduced. Accordingly, extra power consumption can be suppressed by reducing the preheating current If-OFF in the light-off period. Further, as the on-duty ratio of the PWM signal decreases, the preheating current If-OFF is increased. Accordingly, the filament temperature is prevented from dropping even in a long light-off period. Accordingly, life of the lamp can be longer.

Fifth Embodiment

Figure 16:
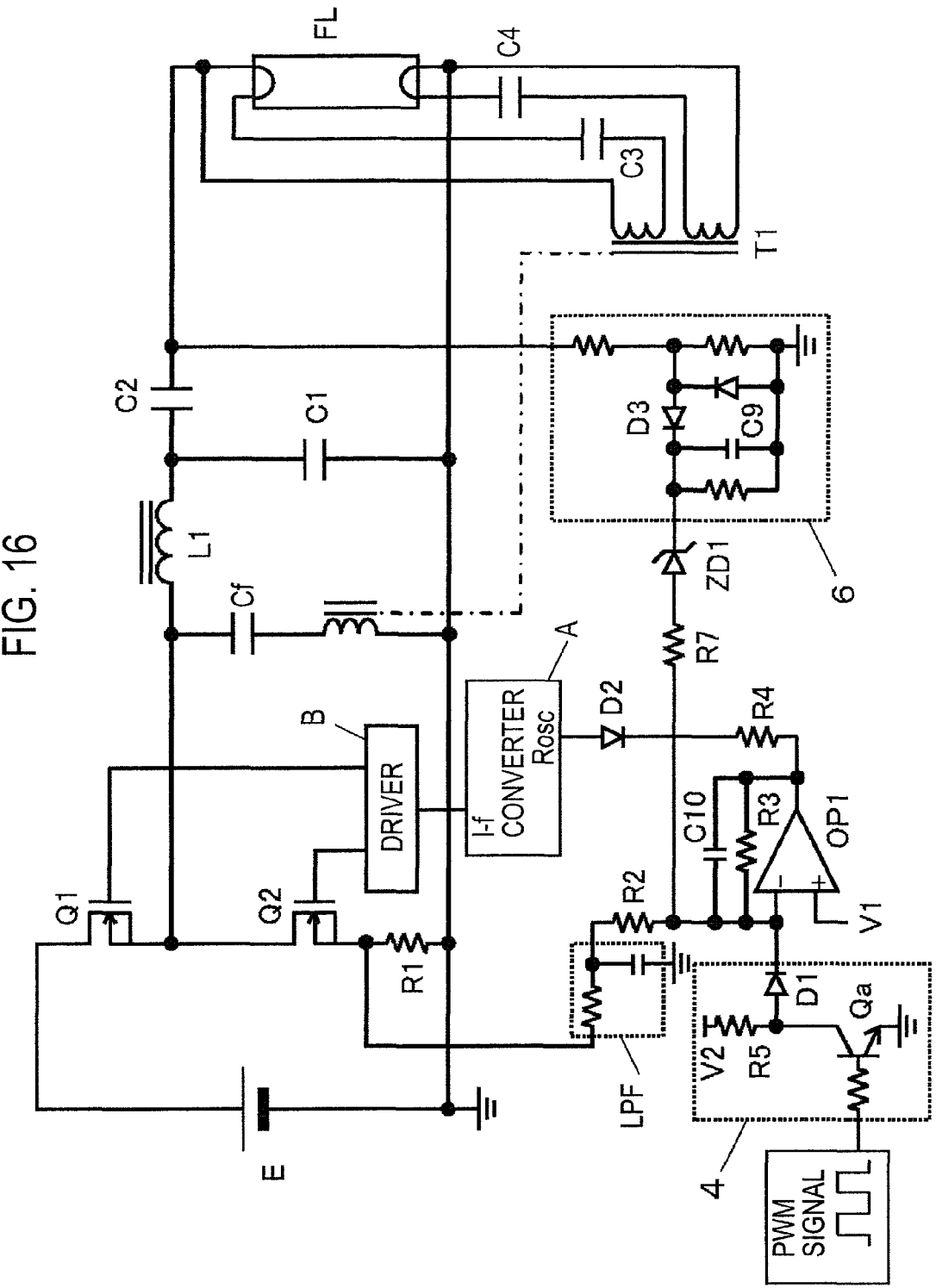
FIG. 16 is a circuit diagram showing a configuration of a discharge lamp lighting device according to a fifth embodiment of the present invention.
Figure 17:
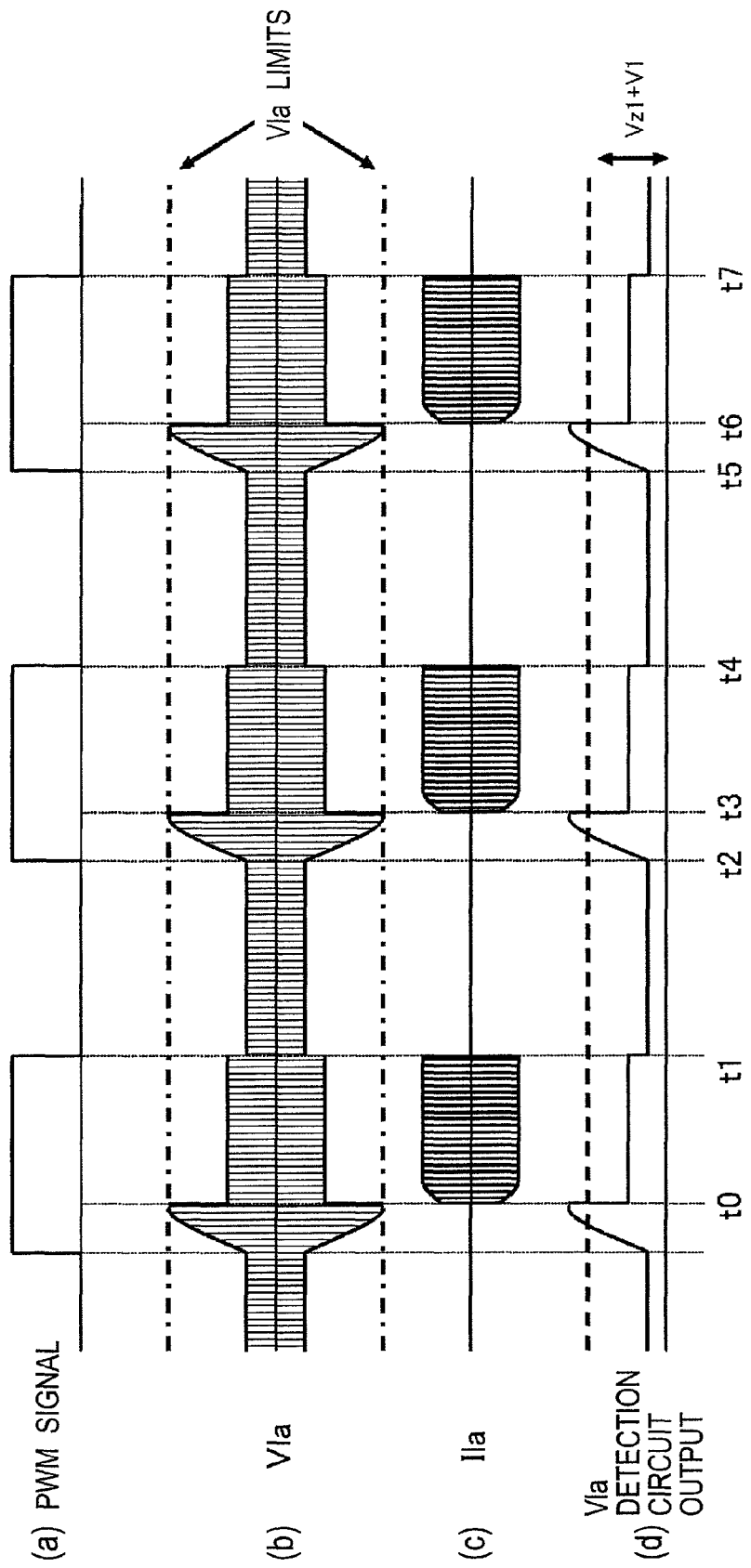
FIG. 17 is a waveform chart showing an operation of the discharge lamp lighting device shown in FIG. 16.
Figure 18:
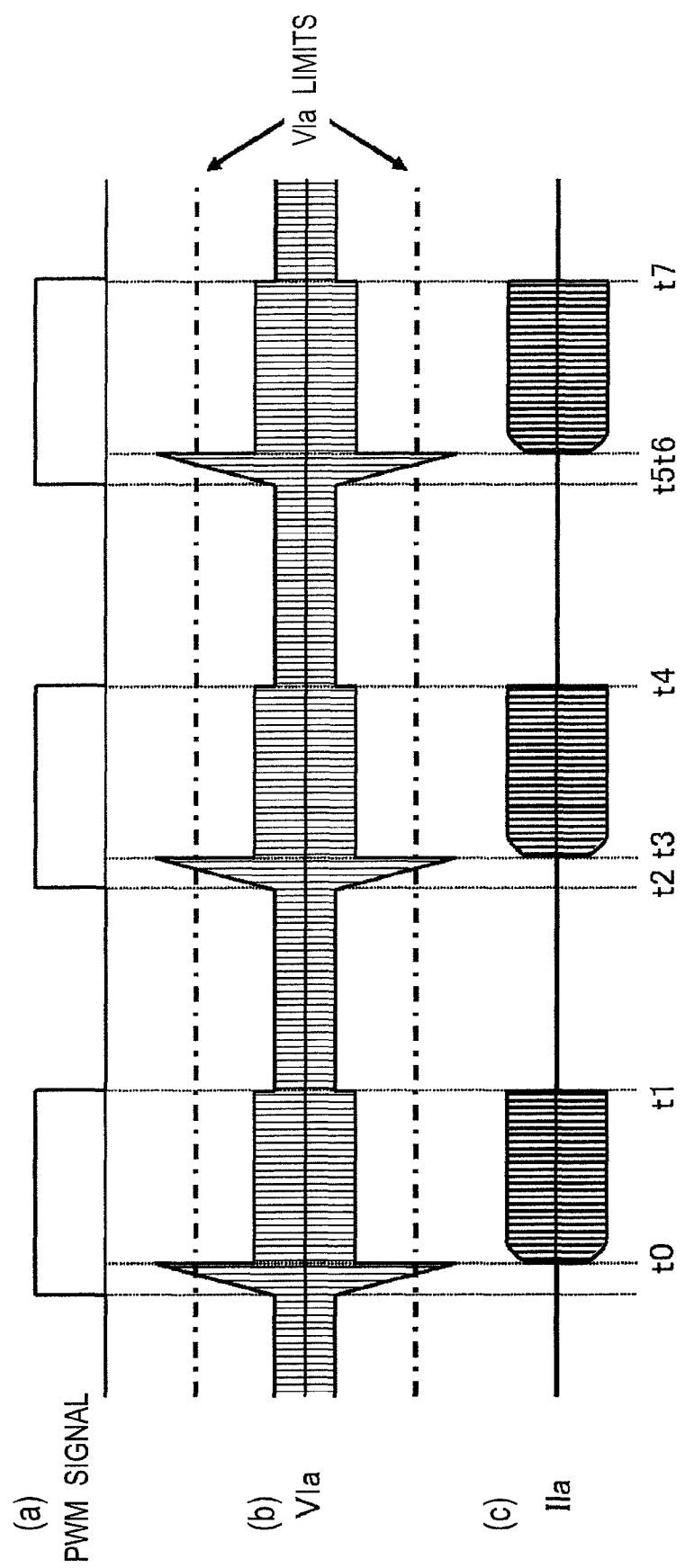
FIG. 18 is a waveform chart showing an operation of a comparative example to the discharge lamp lighting device shown in FIG. 16.

FIG. 16 is a circuit diagram of a discharge lamp lighting device according to a fifth embodiment of the present invention. The discharge lamp lighting device of this embodiment includes a Vla detection circuit 6 that detects the lamp voltage Vla, in which an output thereof is connected to the inverting input terminal (the negative side input terminal) of the operational amplifier OP1 via a Zener diode ZD1 and a resistor R7. FIGS. 17(a) to 17(d) are operation waveform charts of the discharge lamp lighting device of this embodiment (when there is a feedback from the Vla detection circuit 6), and FIGS. 18(a) to 18(c) are operation waveform charts of a discharge lamp lighting device of a comparative example (when there is not a feedback from the Vla detection circuit 6).

When the PWM signal is in the H level at a time point t2, the frequency starts declining while a voltage applied to the lamp rises. While the lamp is not turned on, the voltage applied to the lamp continues to rise up to the no-load resonance frequency of the resonance circuit. In the no-load state, a failure may occur due to generation of an extremely high voltage or the voltage applied to the lamp may grow large due to a time lag until the discharge initiates even when the voltage exceeds a level necessary for starting, whereby stresses on components may be increased. Nevertheless, improvements in specifications of the components so as to endure the excessive stresses will involve high costs.

To avoid this, the applied lamp voltage is detected with the Vla detection circuit 6. The Zener diode ZD1 is turned on if the detected output becomes equal to or above a predetermined value so that the current flowing on the serial resistor R7 is added to a feedback circuit input. In this way, the decline in the frequency is stopped and the rise in the lamp voltage Vla is restricted.

As described previously, the inverting input terminal (the negative side input terminal) and the non-inverting input terminal (the positive side input terminal) of the operational amplifier OP1 have substantially the same potential (the first reference voltage V1). Therefore, assuming that a Zener voltage of the Zener diode ZD1 is Vz1, the Zener diode ZD1 is turned on when the output voltage of the Vla detection circuit 6 becomes equal to or above (Vz1+V1).

In a period t3 to t4, the output voltage of the Vla detection circuit 6 falls below Vz1+V1 so that the Zener diode ZD1 is not turned on. Accordingly, the lamp voltage Vla is not restricted. That is, there is no influence of the Vla detection circuit 6 when the lamp is turned on (t3 to t4), and the Vla detection circuit 6 can be operated only at the time of starting.

The Vla detection circuit 6 is not limited to the illustrated configuration. However, in the configuration employed herein, the resistor divides a voltage between a ground and a high potential side of the hot cathode fluorescent lamp FL, a diode D3 rectifies the voltage in half-wave rectification, and a capacitor C9 smoothes the voltage to generate a DC detection voltage. Note that the Zener diode ZD1 may be any as far as it is a voltage responsive switching element, and may be a diode or a series circuit including the diode, for example.

Figure 19:
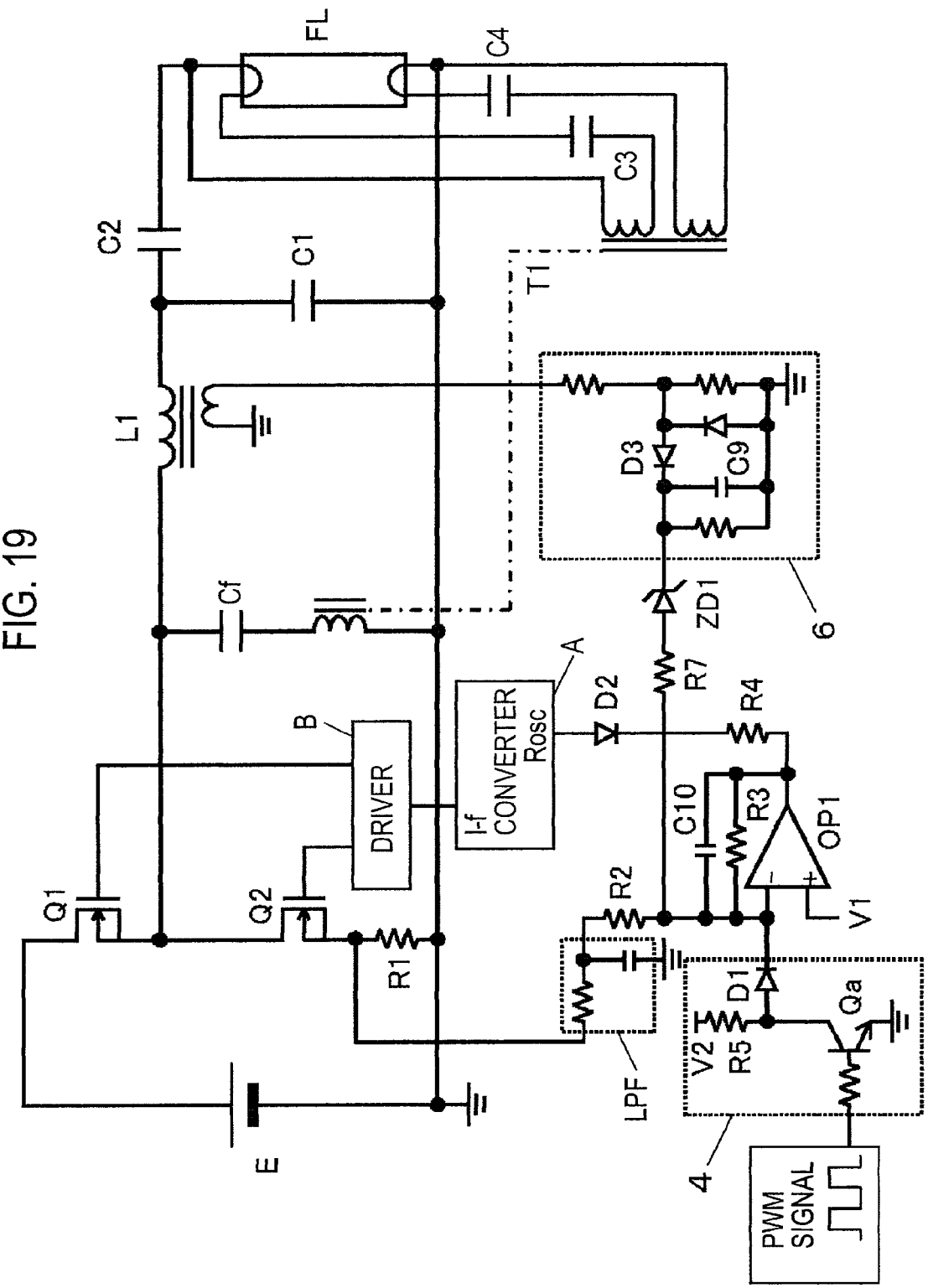
FIG. 19 is a circuit diagram showing a configuration of a modified example of the discharge lamp lighting device shown in FIG. 16.

FIG. 19 shows another circuit example of the discharge lamp lighting device of this embodiment. In this circuit example, the resonance inductor L1 is provided with a secondary coil for detecting the voltage of the inductor L1. This circuit can be used for Vla detection because the voltage of the inductor L1 and the lamp voltage Vla establish a substantially proportional relationship.

Figure 20:
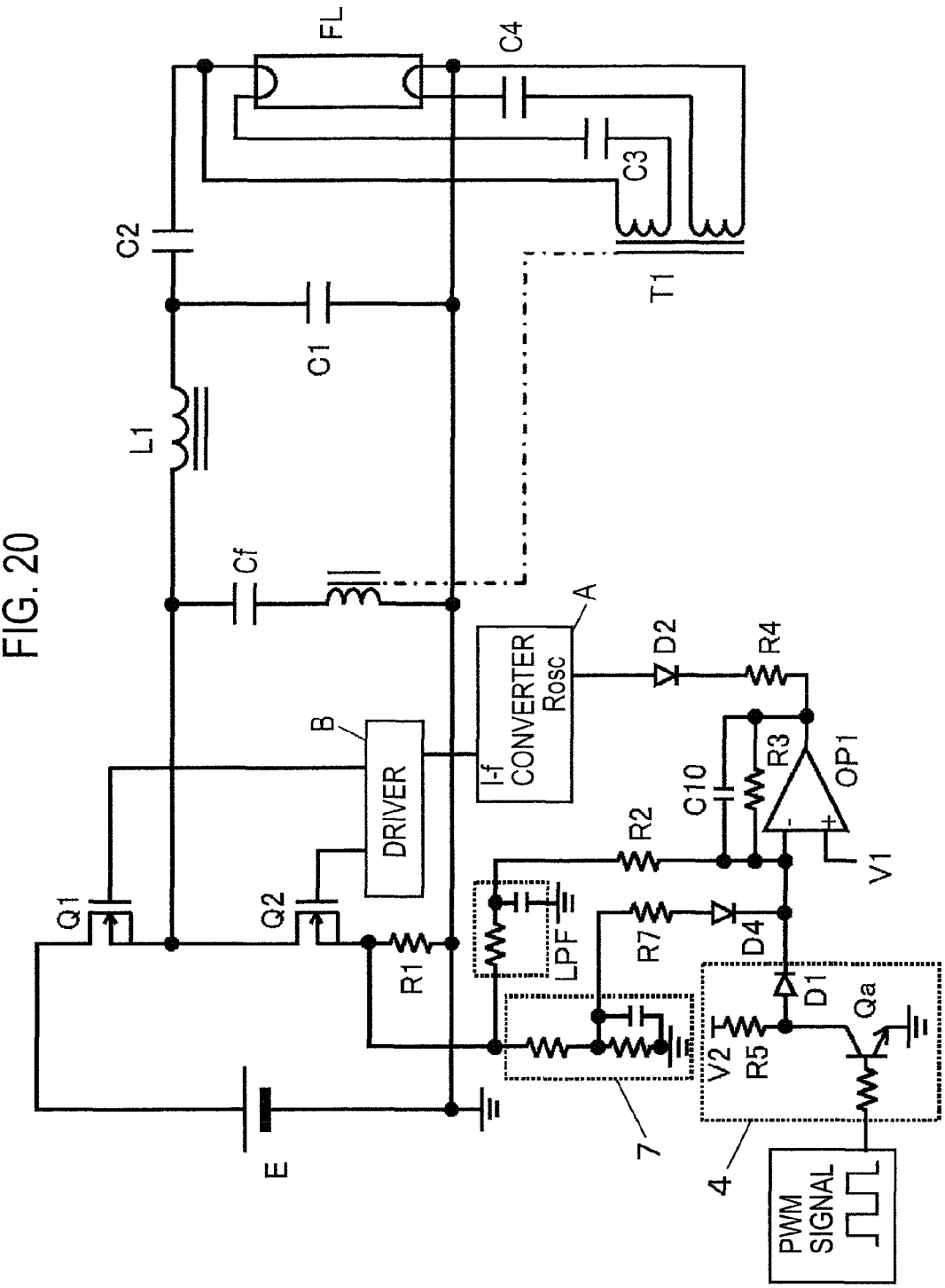
FIG. 20 is a circuit diagram showing a configuration of another modified example of the discharge lamp lighting device shown in FIG. 16.

FIG. 20 shows still another circuit example of the discharge lamp lighting device of this embodiment. In this circuit example, a resonance current peak detection circuit 7 is provided to detect a peak of the resonance current, and when the peak exceeds a certain value a diode D4 is turned, and the current flowing to the serial resistor R7 thereof is added to the feedback circuit input. Since the resonance current at the time of light-off is substantially proportional to the lamp voltage Vla, the lamp voltage Vla can be detected by detecting the current on the switching element Q2. An upper limit of the lamp voltage Vla is restricted by using the detection output.

As described above, the discharge lamp lighting device of this embodiment includes the lamp voltage detection circuit 6, and the series circuit, having the second switching element (the Zener diode ZD1) and the fourth resistor R7, which is connected between the output of the lamp voltage detection circuit 6 and the inverting input terminal of the operational amplifier OP1. In the device, the second switching element is turned on when the output of the lamp voltage detection circuit 6 exceeds the predetermined voltage (Vz1+V1). Meanwhile, the application example of the discharge lamp lighting device of this embodiment includes the current detection circuit 7 of the switching element Q2 in the inverter circuit, and the series circuit, having the second switching element (the diode D4) and the fourth resistor R7, which is connected between the output of the current detection circuit 7 and the inverting input terminal of the operational amplifier OP1. In the device of the application example, the second switching element is turned on when the output of the current detection circuit 7 of the switching element Q2 in the inverter circuit exceeds a predetermined voltage. In this way, these devices can restrict the respective outputs when either the lamp voltage or the circuit current becomes excessive and thereby preventing excessive stresses from being applied onto the circuit elements.

Sixth Embodiment

Figure 21:
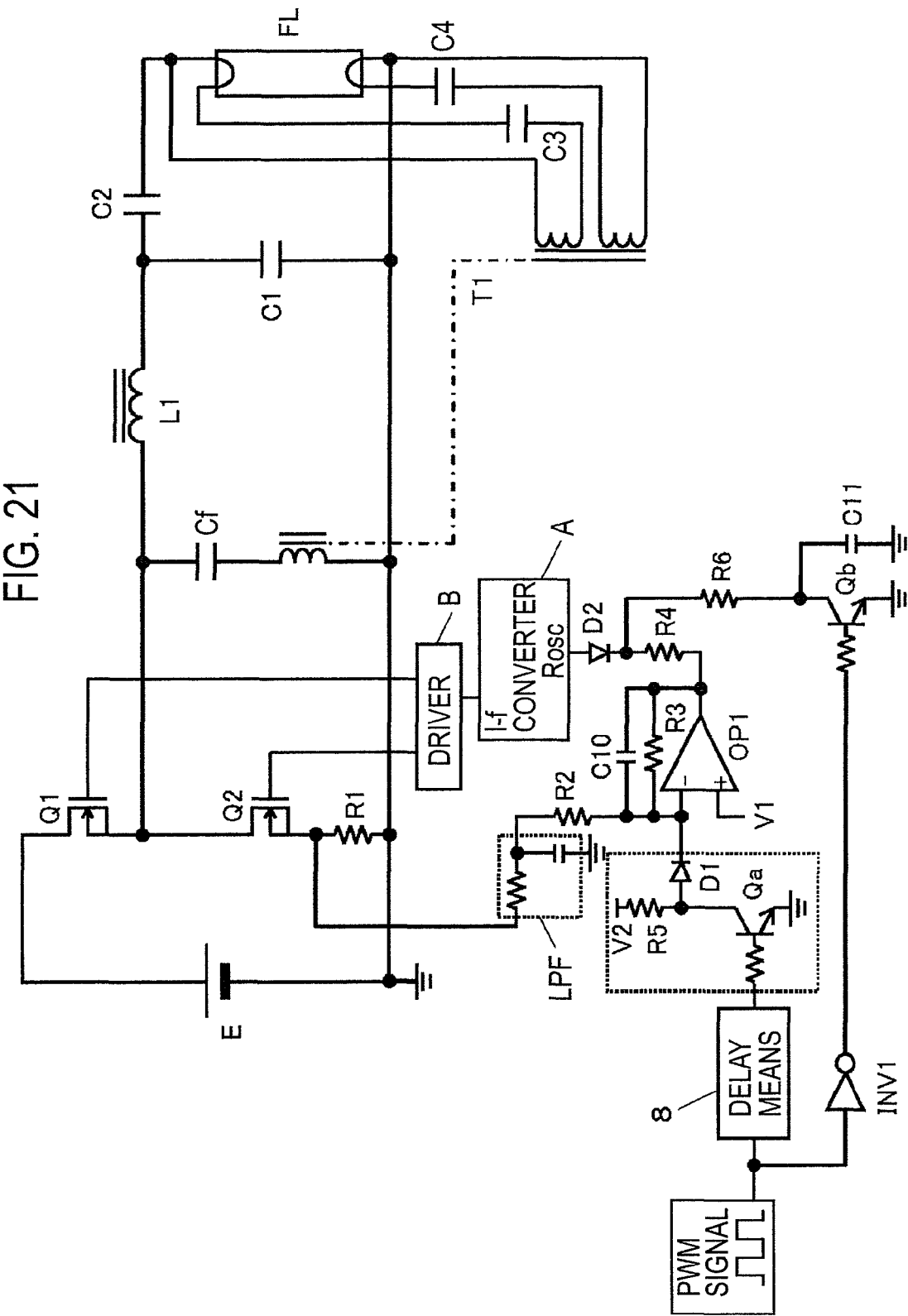
FIG. 21 is a circuit diagram showing a configuration of a discharge lamp lighting device according to a sixth embodiment of the present invention.
Figure 22:
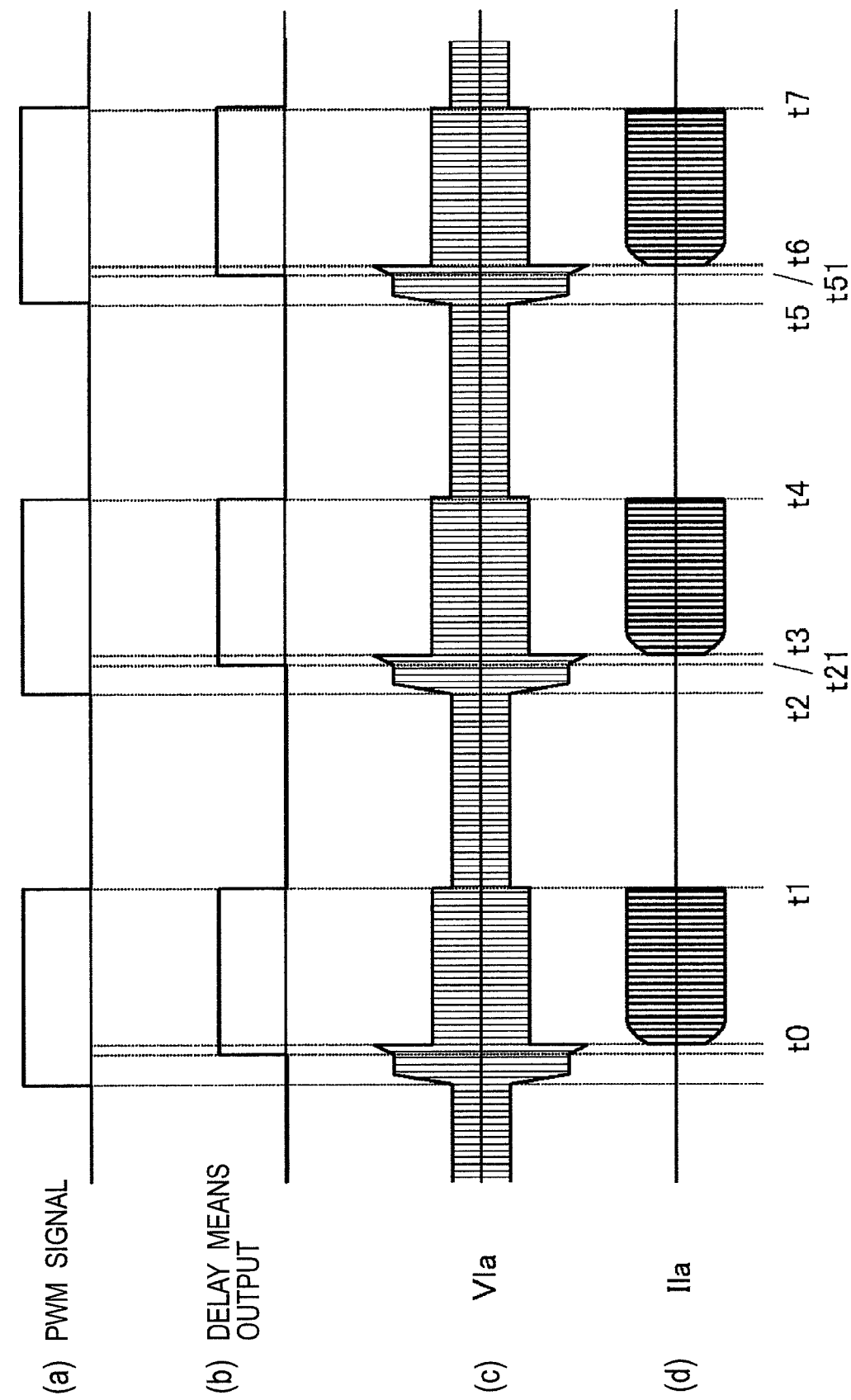
FIG. 22 is a waveform chart showing an operation of the discharge lamp lighting device shown in FIG. 21.

FIG. 21 is a circuit diagram of a discharge lamp lighting device according to a sixth embodiment of the present invention. The discharge lamp lighting device of this embodiment can set, independently of the responsiveness of the feedback circuit, a rate at which the frequency is changed at a start of burst dimming. As described in the second embodiment, the rate at which the frequency is changed at the switching of the PWM signal is determined by the responsiveness of the feedback circuit, i.e., the integration time constant. A time period for lighting the lamp at the transition from the light-off period to the light-on period (such as the period t2 to t3 in FIG. 7, which is called a starting time period) also depends the responsiveness. The starting time period becomes shorter by improving the responsiveness of the feedback circuit. This, however, may cause a risk of causing an unstable behavior (such as abnormal oscillation) upon a feedback operation during lighting. Therefore, the improvement is limited.

Figure 23:
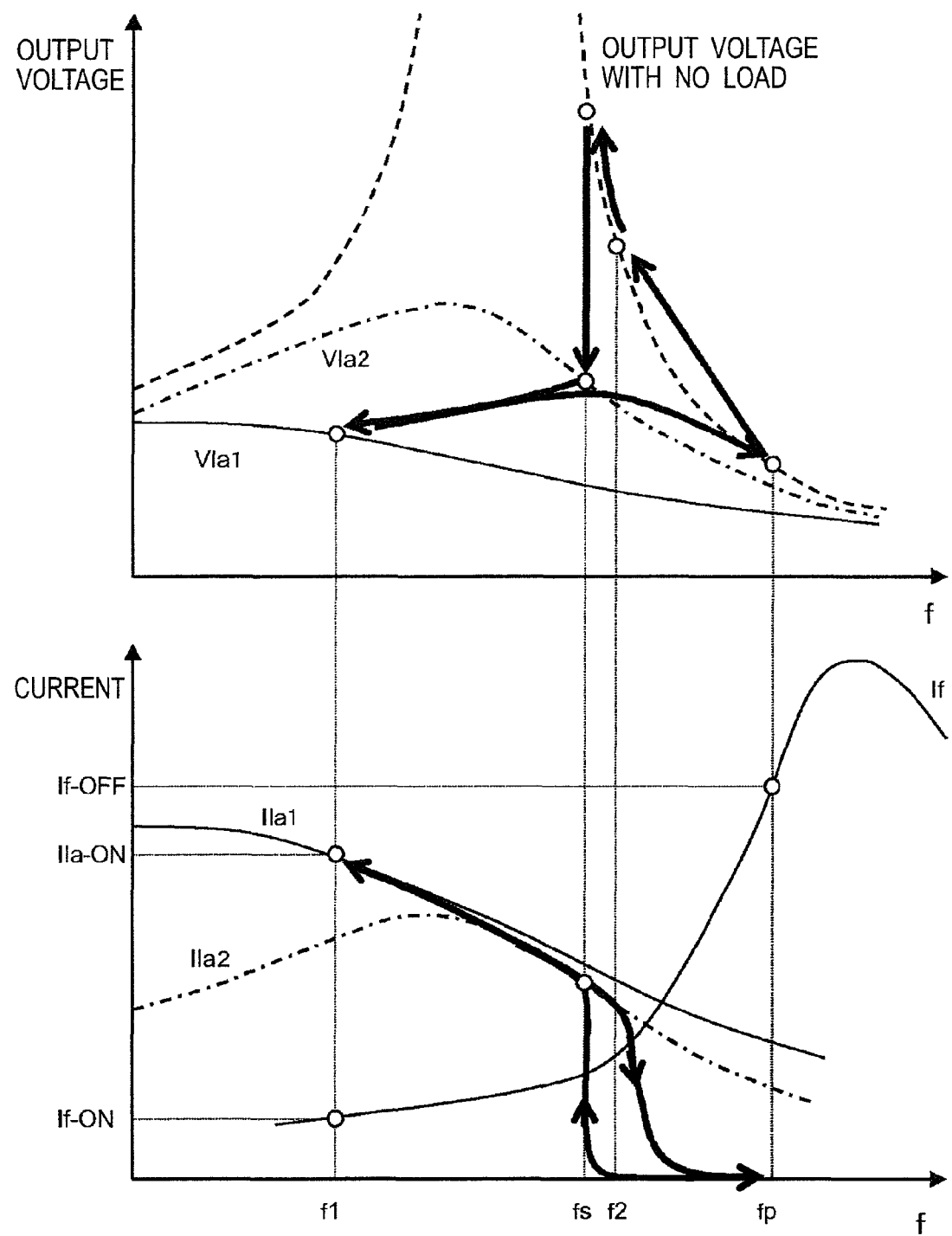
FIG. 23 is a frequency characteristic chart for explaining an operation of the discharge lamp lighting device shown in FIG. 21.

Accordingly, in this embodiment, a time constant circuit including a resistor R6 and a capacitor C11 is newly provided to define the rate at which the frequency at the start is changed based on a charging rate of the capacitor C11. FIGS. 22(a) to 22(d) are operation waveform charts of the discharge lamp lighting device of this embodiment and FIG. 23 is an operation explanatory diagram of the discharge lamp lighting device of this embodiment. As shown in a time period t1 to t2 in FIG. 22, in the light-off period where the PWM signal is in the L level, an output of an inverting circuit INV1 is in the H level and a switching element Qb is turned on, whereby the current flows to the resistor R6. Hence the frequency fp in the light-off period is set by the resistors R4 and R6.

When the PWM signal is in the H level at the time point t2, the output of the inverting circuit INV1 is in the L level and the switching element Qb is turned off, thereby transitioning to a frequency f2 which is determined by the resistor R4. At this time, the output voltage is increased along a no-load output voltage curve that is indicated with a broken line in FIG. 23. Here, the capacitor C11 defines the rate at which the frequency changes from the preheating frequency fp to the frequency f2. In this regards, the value of the capacitor C11 is set in a way that the rate at which the frequency changes does not cause large fluctuation under a transitional condition in a resonant action. Thereafter, an output of delay means 8 is in the H level at a time point t21 and the switching element Qa is turned on, thereby causing the lamp to start lighting. Operations after the lamp is turned on at a time point t3 are similar to those in the second embodiment.

Figure 24:
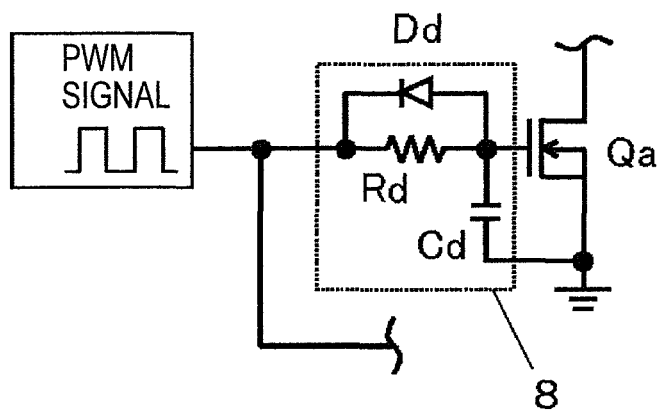
FIG. 24 is a circuit diagram showing an example of delay means used in the discharge lamp lighting device shown in FIG. 21.
Figure 25:
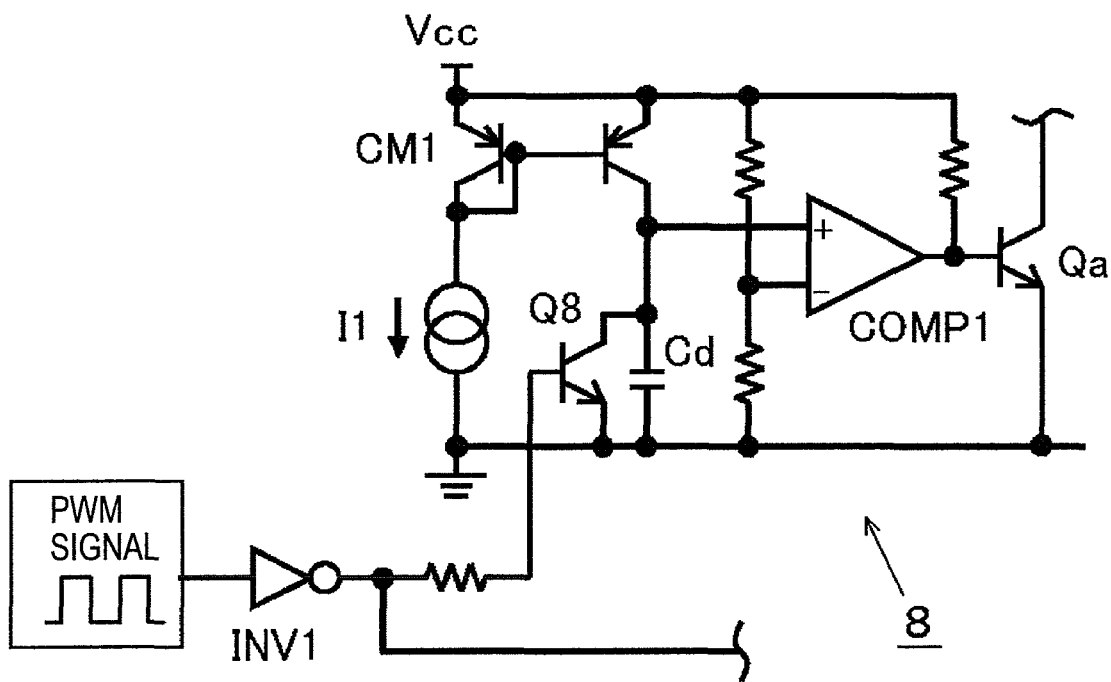
FIG. 25 is a circuit diagram showing another example of the delay means used in the discharge lamp lighting device shown in FIG. 21.

FIG. 24 and FIG. 25 show circuit examples of the delay means 8 used in the discharge lamp lighting device of this embodiment. First of all, FIG. 24 shows a simple structure which can be realized at low costs, in which a timer circuit is formed by using a CR integration circuit. Although a FET is used for the switching element Qa herein, a bipolar transistor may be used instead. When the PWM signal is in the H level at the time point t2 in FIG. 22, a capacitor Cd is charged via a resistor Rd. The switching element Qa is turned on when the charged voltage exceeds a threshold voltage between a gate and a source of the FET at a time point t21. Meanwhile, when the PWM signal is in the L level at a time point t4, the capacitor Cd is immediately discharged via a diode Dd and the switching element Qa is thereby turned off.

Next, FIG. 25 shows the example of the delay means 8 in which accuracy is improved in a temporal point of view. The delay means 8 charges the capacitor Cd with a constant current source I1 via a current mirror circuit CM1 and compares the charged voltage with a reference voltage with a comparator COMP 1 to set delay time accurately. When the PWM signal is in the H level at the time point t2 in FIG. 22, the output of the inverting circuit INV1 is in the L level and a transistor Q8 that has been short-circuiting the capacitor Cd is then turned off. Accordingly, the voltage of the capacitor Cd starts to increase substantially linearly. When the charged voltage of the capacitor Cd reaches the reference voltage that is obtained by dividing the control power source voltage Vcc, an output of the comparator COMP1 is in the H level and the switching element Qa is turned on. Thereafter, when the PWM signal is in the L level at the time point t4, the output of the inverting circuit INV1 is in the H level and the capacitor Cd is short-circuited by the transistor Q8. Hence, the output of the comparator COMP1 is in the L level and the switching element Qa is turned off.

As described above, the discharge lamp lighting device of this embodiment includes: a first delay means 8 for outputting a signal that delays a start of the ON period of the burst dimming signal (a first time period shorter than the starting time period); a third switching element Qb that is turned on in the OFF period of the burst dimming signal; and a fifth resistor R6 that shunts the current flowing to a third resistor R4 from a third reference voltage (the voltage of the terminal Rosc) when turning on the third switching element Qb. The device sets the operating frequency of the light-off period at the third resistor R4 and the fifth resistor R6, turns on the first switching element Qa after the start of the light-on period using the signal in which a start of the ON period of the burst dimming signal is delayed by the first delay means 8, and sets at the third resistor R4 the operating frequency of the delayed time set using the first delay means 8. This configuration allows the frequency to transition from the light-off period to the light-on period smoothly.

Moreover, according to this embodiment, it is possible to shorten the starting time period not depending on the responsiveness of the feedback circuit. In other words, from the preheating frequency fp to the frequency f2 in FIG. 23, the frequency may be changed promptly by using the time constant of the resistor R6 and the capacitor C11. Meanwhile, by changing the frequency gently based on the responsiveness of the feedback circuit, i.e. by using the integration time constant from the frequency f2 to the starting frequency fs, it is possible to shorten the starting time period as a whole.

Seventh Embodiment

Figure 26:
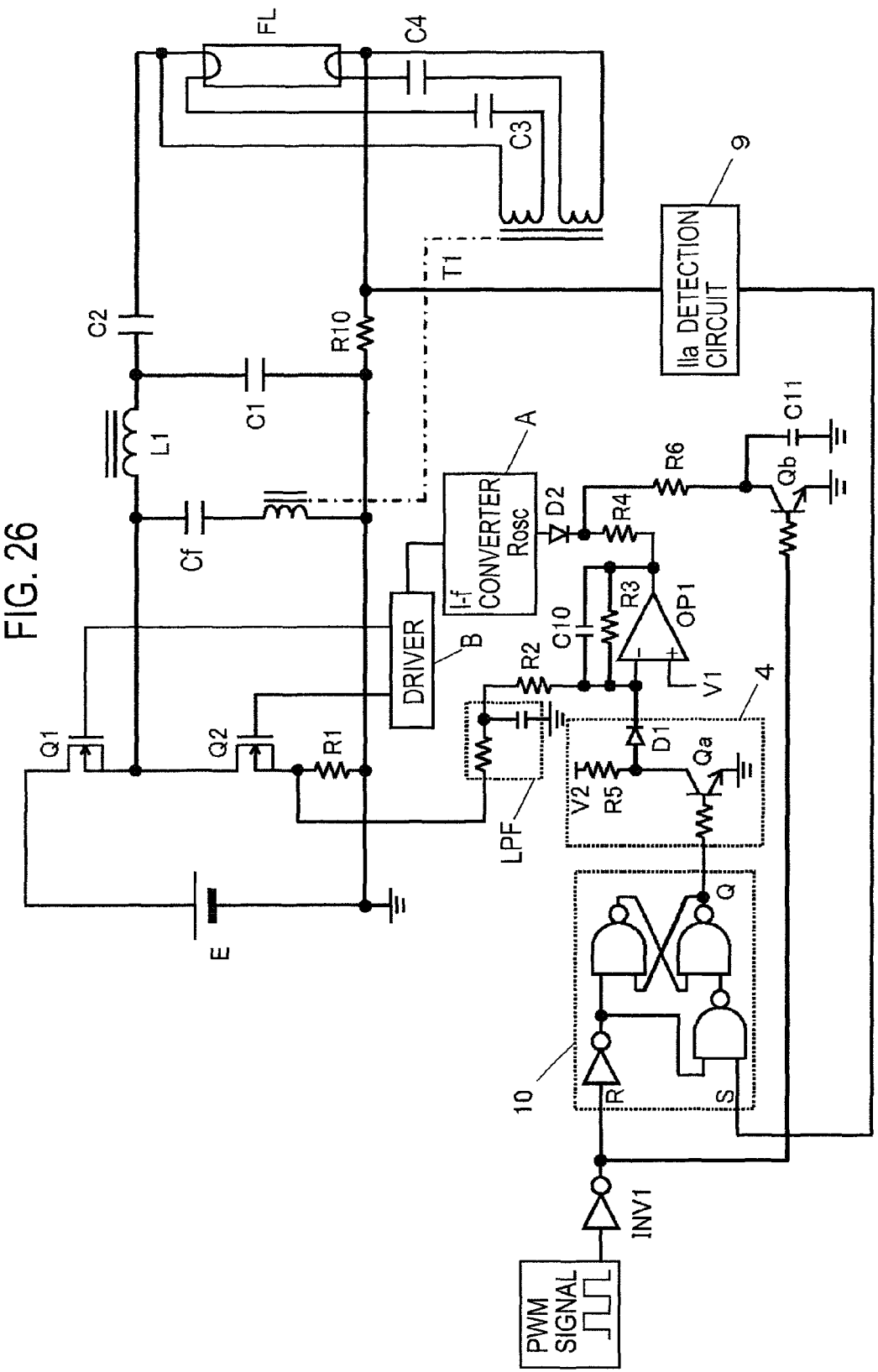
FIG. 26 is a circuit diagram showing a configuration of a discharge lamp lighting device according to a seventh embodiment of the present invention.
Figure 27:
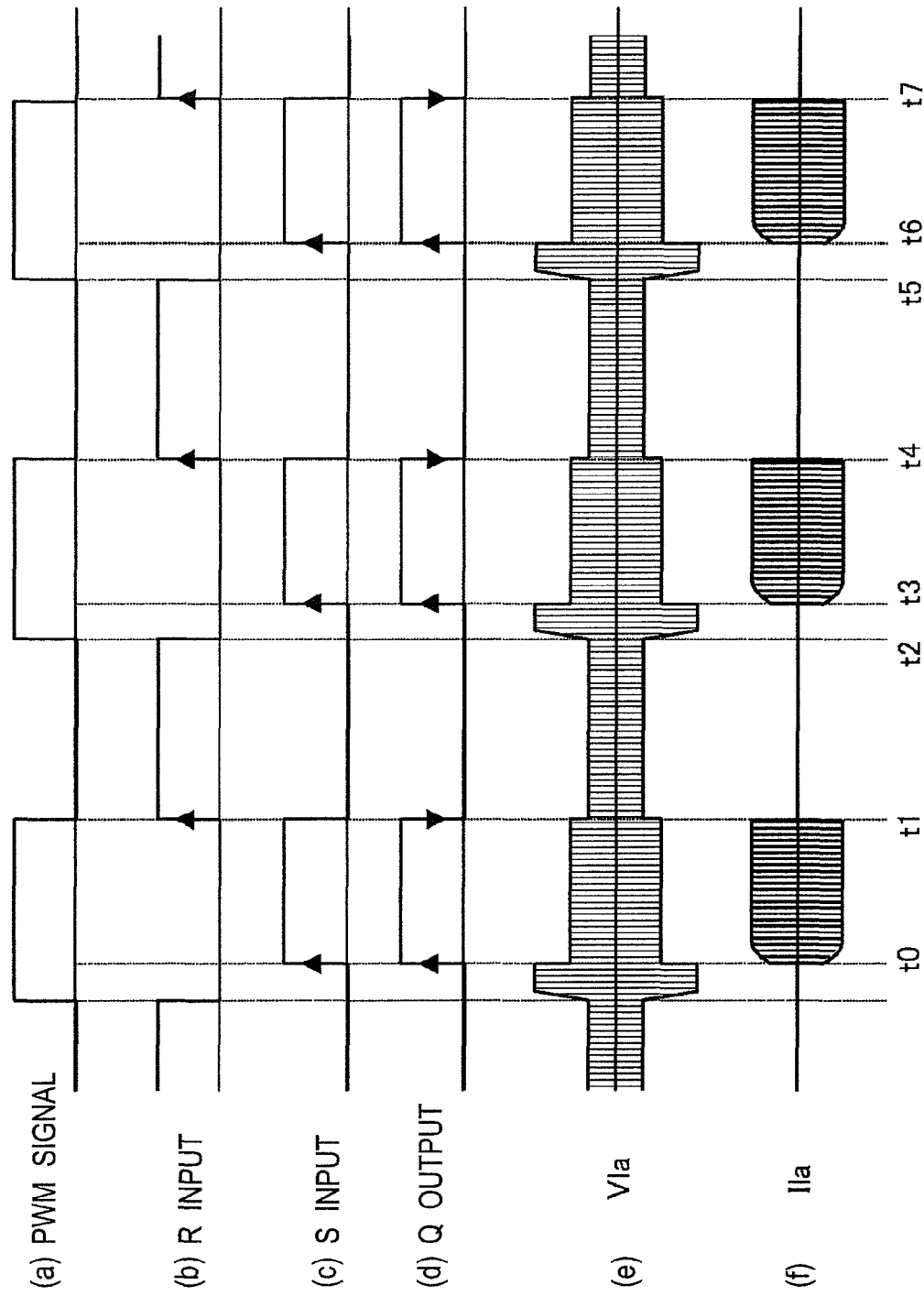
FIG. 27 is a waveform chart showing an operation of the discharge lamp lighting device shown in FIG. 26.

FIG. 26 is a circuit diagram of a discharge lamp lighting device according to a seventh embodiment of the present invention. The discharge lamp lighting device of this embodiment is provided with an Ila detection circuit 9 to detect the lamp current Ila and configured to fix the frequency before the lamp current Ila starts flowing and to start a feedback operation when the lamp current starts flowing. The Ila detection circuit 9 judges whether the lamp current exists or not by detecting voltages on both ends of a detection resistor R10 inserted on a path on which the lamp currents Ila flows, and outputs a detection signal to a set input Sofa latch circuit 10 upon a judgment that the lamp current is flowing. The latch circuit 10 employs a RS flip-flop and controls to turn the switching element Qa on and off by using a Q output of the latch circuit 10. To a reset input R of the latch circuit 10, a signal obtained by inverting the PWM signal with the inverting circuit INV1 is inputted. The functions of the switching element Qb, the resistor R6, and the capacitor C11 are similar to the sixth embodiment, the switching element Qb controlled to be turned on and off by the output of the inverting circuit INV1, the resistor R6 and the capacitor C11 both connected to the switching element Qb.

FIGS. 27(a) to 27(f) are operation waveform charts of the discharge lamp lighting device of this embodiment. When the PWM signal is in the L level at a time point t1, the output of the inverting circuit INV1 is in the H level and the reset input R rises. Accordingly, the Q output of the latch circuit 10 is in the L level and the switching element Qa is turned off while the switching element Qb is turned on. Hence the lamp is in a light-off state. The preheating frequency fp is determined by the resistors R4 and R6. When the PWM signal is in the H level at a time point t2, the output of the inverting circuit INV1 is in the L level and the switching element Qb is turned off. Accordingly, as the capacitor C11 is getting charged, the charged voltage transitions to the fixed frequency f2 to be determined by the R4. The operations so far are similar to the sixth embodiment. Next, when the detection circuit 9 detects that the lamp is turned on at a time point t3, a set input S of the latch circuit 10 rises by the detection signal. Accordingly, the Q output of the latch circuit 10 is in the H level, the switching element Qa is turned on, and the diode D1 is turned off. Hence, the feedback operation of the lamp current is started.

As described above, the discharge lamp lighting device of this embodiment includes: the Ila detection circuit 9 that determines whether the discharge lamp FL is lighted or not by detecting the lamp current; the third switching element Qb to be turned on in the OFF period of the burst dimming signal; and the fifth resistor R6 which shunts the current flowing to the third resistor R4 from the third reference voltage (the voltage of the terminal Rosc) while the third switching element Qb is turned on. The device sets the operating frequency in the light-off period at the third resistor R4 and the fifth resistor R6, turns on the first switching elements Qa when the Ila detection circuit 9 detects the flow of the lamp current, and sets at the third resistor R4 the operating frequency before the Ila detection circuit 9 determines that the discharge lamp FL is lighted. According to this configuration, the frequency can transition smoothly from the light-off state to the light-on state. Moreover, this embodiment can suppress excessive stresses and turn on the lamp reliably by fixing the frequency until the lamp is turned on.

Eighth Embodiment

Figure 28:
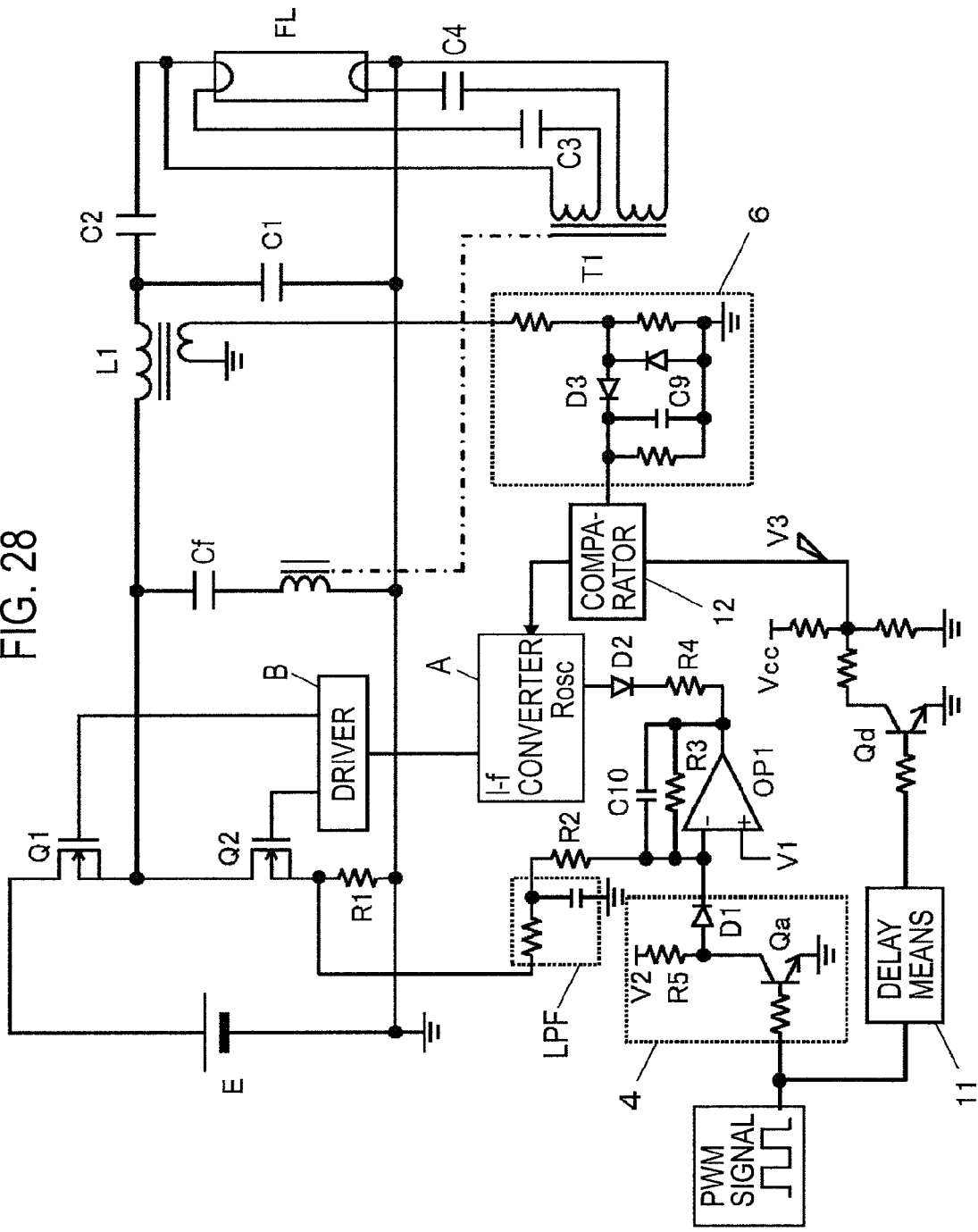
FIG. 28 is a circuit diagram showing a configuration of a discharge lamp lighting device according to an eighth embodiment of the present invention.

FIG. 28 is a circuit diagram of a discharge lamp lighting device according to an eighth embodiment of the present invention. The discharge lamp lighting device of this embodiment has a function to stop oscillation by using the output of the Vla detection circuit 6 to prevent an increase in component stresses and circuit failures caused by continuation of the starting voltage, an abnormal oscillation voltage and the like. The output of the Vla detection circuit 6 is compared with a reference voltage V3 by a comparator 12. The comparator 12 has a function to stop oscillation of the I-f converter A when the output of the Vla detection circuit 6 exceeds the reference voltage V3. The reference voltage V3 to be inputted to the comparator 12 is switched between high and low levels by a switching element Qd. The switching element Qd is turned on and off by using a signal which is obtained by delaying the PWM signal by delay means 11.

Figure 29:
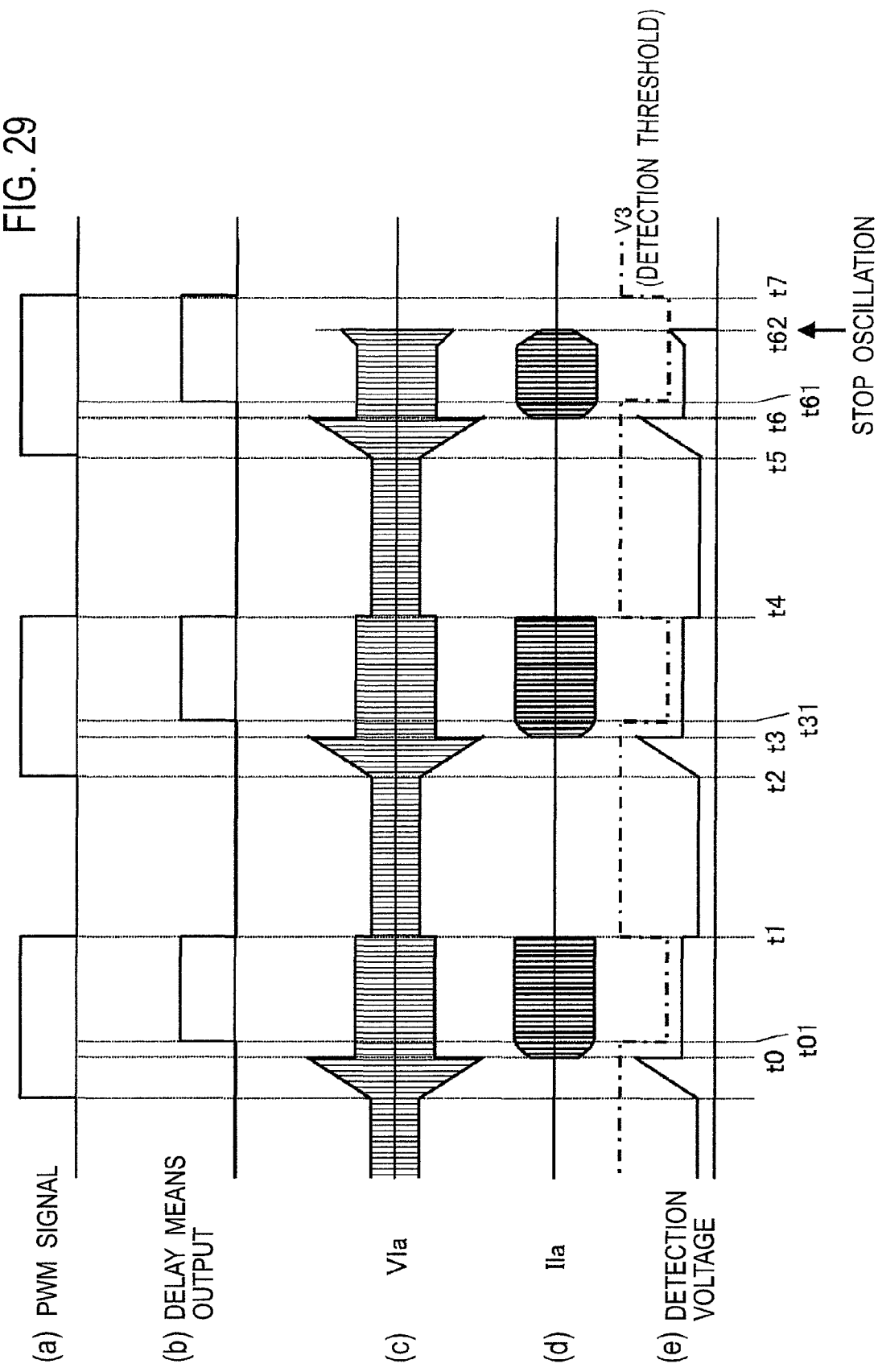
FIG. 29 is a waveform chart showing an operation of the discharge lamp lighting device shown in FIG. 28.

FIG. 29 is an operation waveform chart of the discharge lamp lighting device of this embodiment. A dashed line in FIG. 29 indicates the reference voltage V3 (a detection threshold). Here, a large difference is generated between the starting voltage at the time of burst dimming indicated in a time period t2 to t3 and the lamp voltage Vla in the light-on period indicated in a time period t3 to t4. Accordingly, when the threshold for Vla detection is set in conformity to the starting voltage at the time of burst dimming, it takes time to detects there is an anomaly during the light-on period. For this reason, large stresses are applied longer time. In addition, the lamp voltage might not be increased to an adequate level depending on an operating condition. Usually, a frequency for lighting at a maximum output is set lower than the no-load resonance frequency in order to suppress the resonance current and to reduce losses. For this reason, the frequency during lighting may be lower than the starting voltage, even though the lamp is out of the frequency at the lighting.

Accordingly, upon Vla detection during burst dimming, the threshold for Vla detection during lighting is changed synchronously with the PWM signal. Here, as shown in the dashed line in FIG. 29, the detection threshold V3 is switched by using a signal obtained by delaying the PWM signal. Regarding a concrete circuit configuration, as shown in FIG. 28, the delay means 11 is caused to delay the PWM signal, and the switching element Qd is switched on and off by using an output from the delay means (FIG. 29 shows an example of delaying rising edges only) and thus the reference voltage V3 obtained by dividing the control power source voltage Vcc is switched. This reference voltage V3 is inputted to the comparator 12 and is compared with the output of the Vla detection circuit 6, thereby stopping the oscillating operation of the I-f converter A when an abnormal voltage is detected.

A higher part of detection threshold V3 is set to a value higher than the starting voltage at the time of burst dimming. Meanwhile, a lower part of detection threshold V3 is set to a value higher than the lamp voltage Vla when lighting normally. In FIG. 29, the starting operation of burst dimming is initiated at a time point t5 when the PWM signal is in the H level. The detection threshold V3 is set to a high value until a time point t61, and oscillation is naturally stopped in case of exceeding the detection threshold V3 before that time point. In addition, if the lamp is not turned on while the starting voltage is continuously outputted until the time point t6, the oscillation will be stopped at the moment of switching the detection threshold V3 to the lower part.

The detection threshold V3 is set to a low value in a time period t61 to t7. The oscillation will be stopped (at a time point t62) if an abnormality occurs during that period and the detected voltage of the lamp voltage Vla exceeds the detection threshold V3. In this embodiment, the detection threshold V3 is set to the high value in the time period t4 to t61 and the detection threshold V3 is set to the low value in the time period t61 to t7. However, it is also possible to set the detection threshold V3 to the high value only in a time period t5 to t61 in which the starting voltage at the time of burst dimming is generated.

As described above, the discharge lamp lighting device of this embodiment includes: the lamp voltage detection circuit 6; the comparator 12 that compares the output of the lamp voltage detection circuit 6 with a fourth reference voltage V3; the function to stop oscillation of the V-f converter based on the output of the comparator 12; second delay means 11 for outputting the signal obtained by delaying the start of the ON period of the burst dimming signal (for a second time period longer than the starting time period); and a fourth switching element Qd operated by the output of the second delay means 11. The device makes the fourth reference voltage V3 variable. This configuration can prevent erroneous judgment such that a rise in the lamp voltage at the transition from the light-off state to the light-on state is misjudged as an abnormal voltage rise, while maintaining high detection sensitivity for detecting an abnormal rise in the lamp voltage at the time of lighting and for stopping oscillation.

Ninth Embodiment

Figure 30:
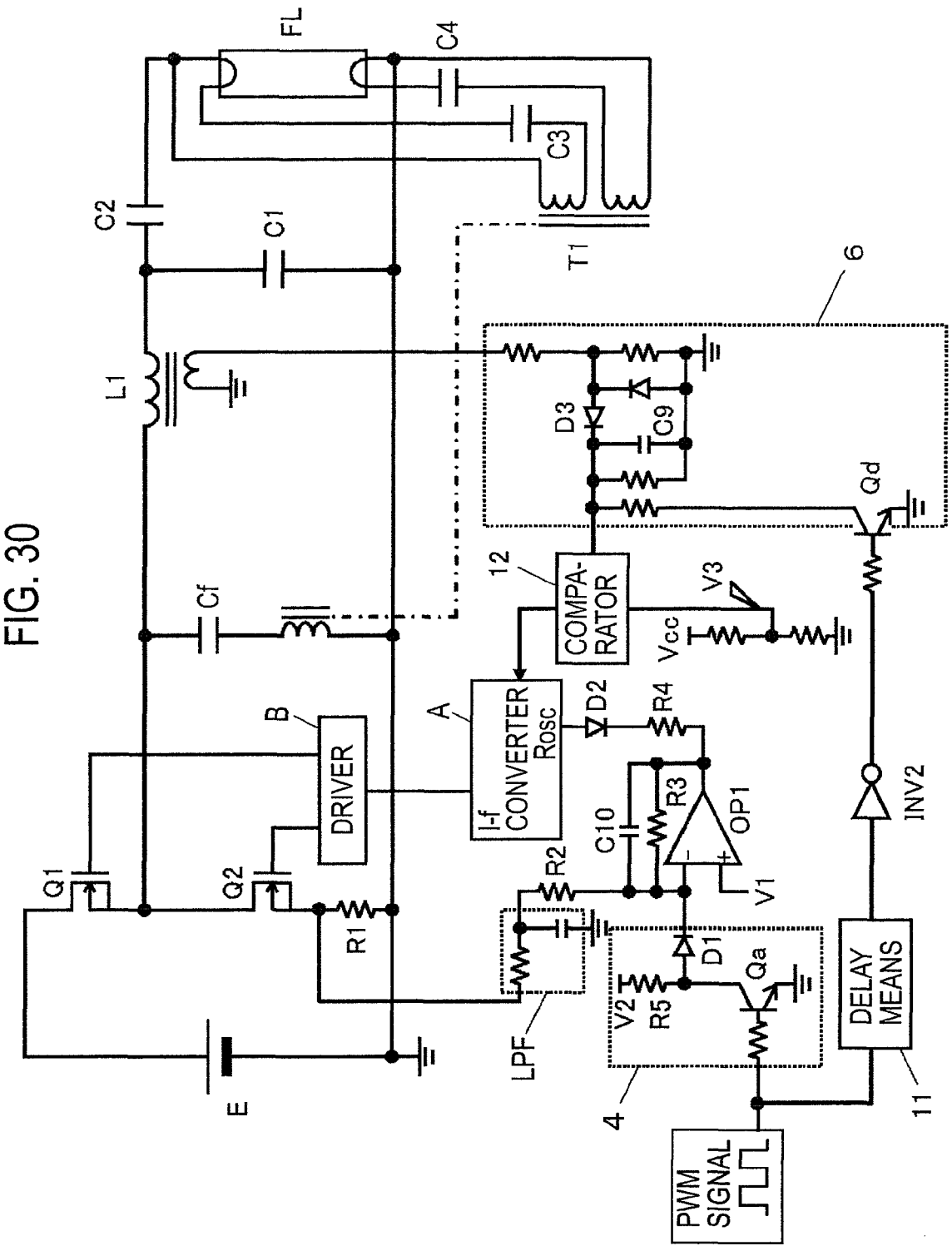
FIG. 30 is a circuit diagram showing a configuration of a discharge lamp lighting device of a ninth embodiment of the present invention.
Figure 31:
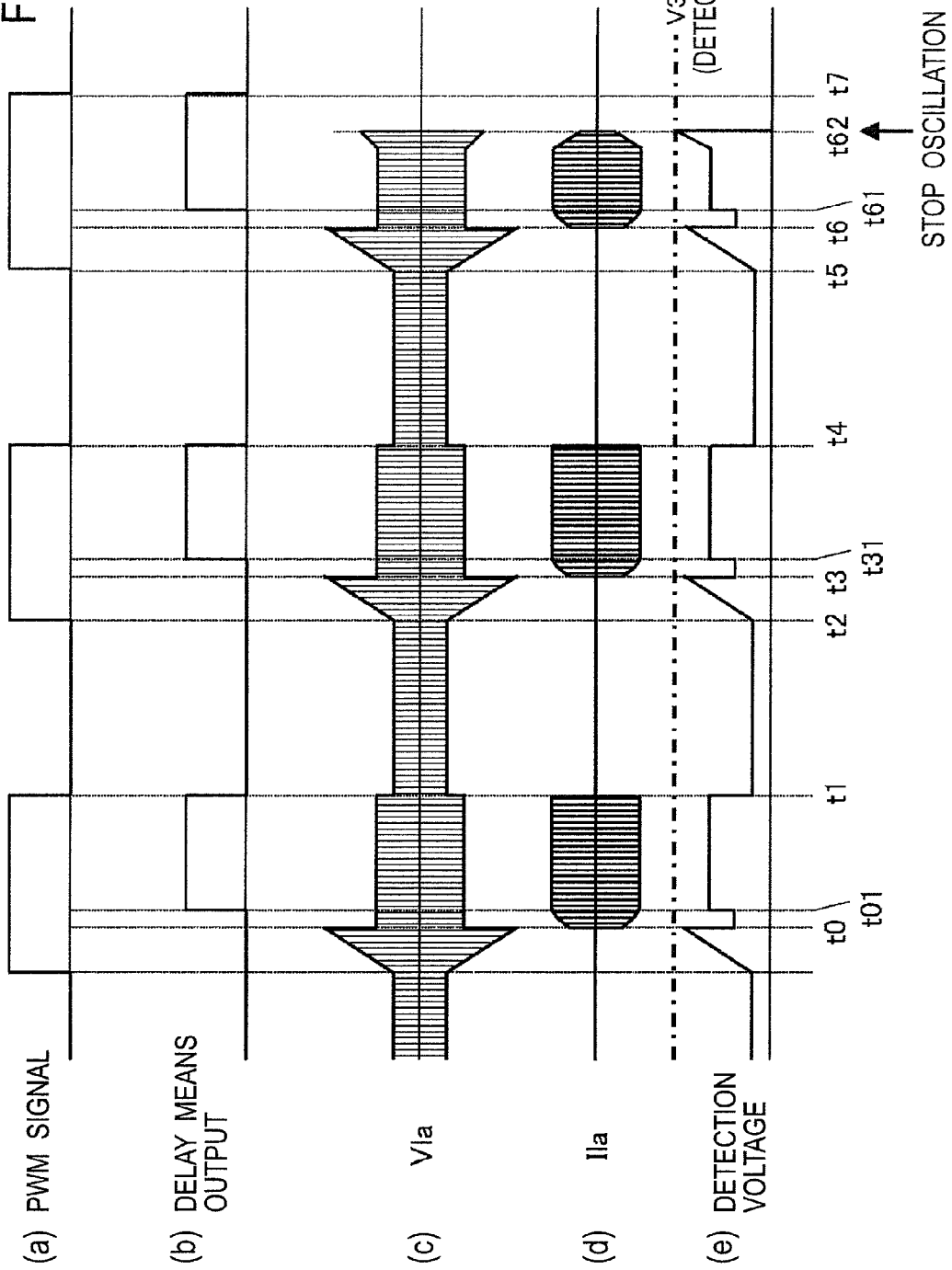
FIG. 31 is a waveform chart showing an operation of the discharge lamp lighting device shown in FIG. 30.

FIG. 30 is a circuit diagram of a discharge lamp lighting device according to a ninth embodiment of the present invention. The discharge lamp lighting device of this embodiment is different from the discharge lamp lighting device of the eighth embodiment in that the voltage division ratio of Vla detection during lighting is switched synchronously with the PWM signal. FIGS. 31(a) to 31(e) are operation waveform charts of the discharge lamp lighting device of this embodiment. As indicated with a dash line in the drawing, the detection threshold V3 is constant while the voltage division ratio of the detection voltage of the Vla detection circuit 6 is switched according to the output of the delay means 11. The delay means 11 outputs the signal formed by delaying only the rising edges of the PWM signal as similar to the eighth embodiment. In the period where the output of the delay means 11 is in the H level, an output of an inverting circuit INV2 is in the L level and the switching element Qd is turned off. Accordingly, the voltage division ratio of the detection voltage of the Vla detection circuit 6 is increased. In the example of FIG. 31, the voltage division ratio of the detection voltage of the Vla detection circuit 6 is set to a large value in time periods of t01 to t1, t31 to t4, and t61 to t7. If the lamp voltage Vla during lighting is abnormally boosted as shown at a time point t62, and exceeds the detection threshold V3, the exceed can stop the oscillating operations of the I-f converter A by using the output of the comparator 12. In other periods, the voltage division ratio of the detection voltage of the Vla detection circuit 6 is set to a small value so as to prevent the starting voltage of burst dimming from exceeding the detection threshold V3. However, if the lamp is not turned on while continuously outputting the starting voltage, the oscillation will be stopped at the moment of switching the voltage division ratio of the detection voltage of the Vla detection circuit 6 to the high value.

As described above, the discharge lamp lighting device of this embodiment includes: the lamp voltage detection circuit 6; the comparator 12 which compares the output of the lamp voltage detection circuit 6 with the fourth reference voltage V3; a function to stop oscillation of the V-f converter by using the output of the comparator 12; the second delay means 11 for outputting the signal obtained by delaying the start of the ON period of the burst dimming signal (the second time period longer than the starting time period); and the fourth switching element Qd operated by the output of the second delay means 11. The device makes the voltage division ratio (see FIG. 30) of the lamp voltage detection circuit 6 variable by using the fourth switching element Qd. This configuration can prevent erroneous judgment such that a rise in the lamp voltage at the transition from the light-off state to the light-on state is misjudged as an abnormal voltage rise, while maintaining high detection sensitivity for detecting an abnormal rise in the lamp voltage at the time of lighting and for stopping oscillation. Moreover, also this embodiment can stop the circuit safely even when the lamp voltage Vla is boosted by an abnormality of the lamp or the circuit in the burst dimming state.

Tenth Embodiment

Figure 32:
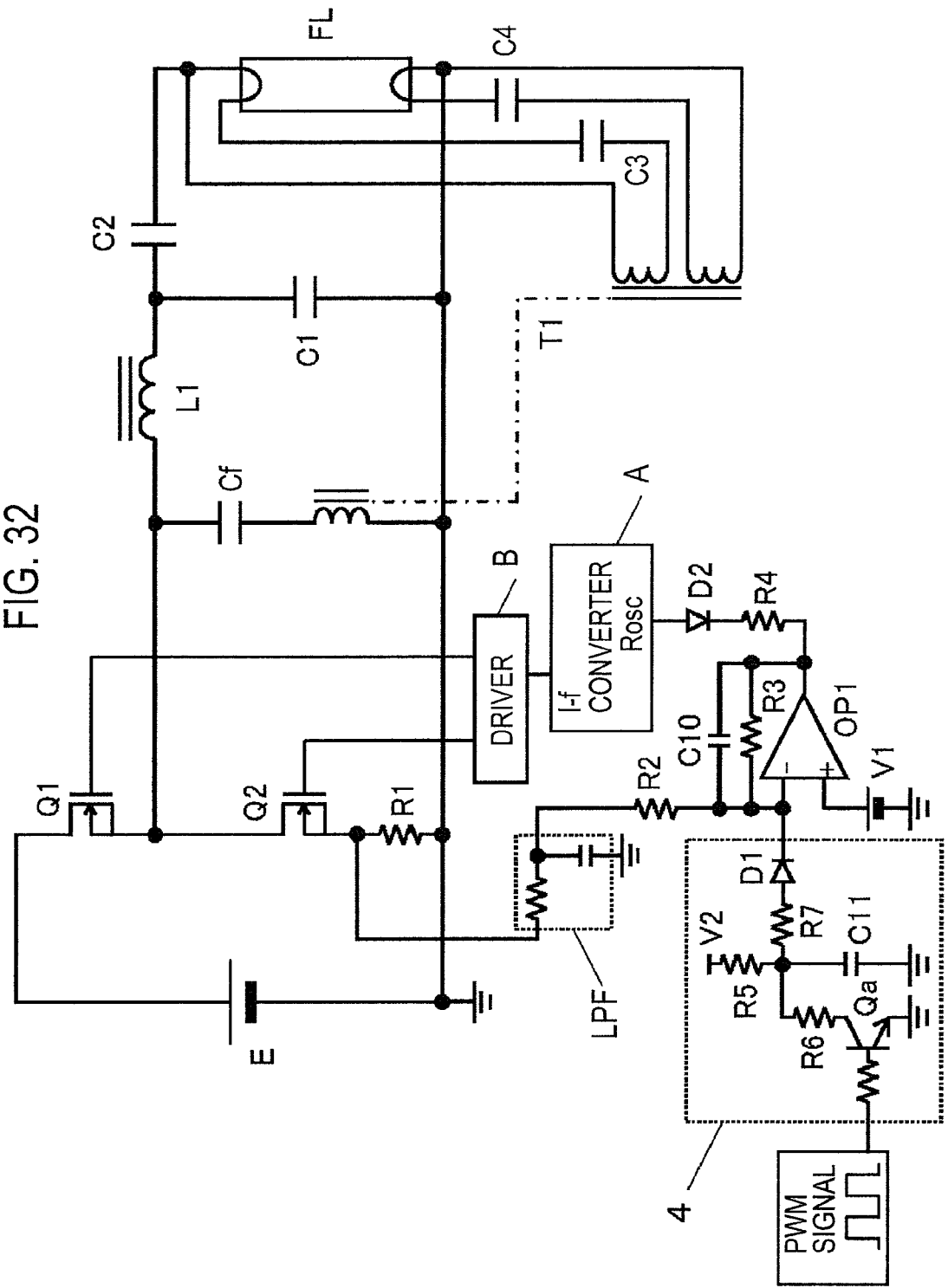
FIG. 32 is a circuit diagram showing a configuration of a discharge lamp lighting device according to a tenth embodiment of the present invention.

FIG. 32 is a circuit diagram of a discharge lamp lighting device according to a tenth embodiment of the present invention. The discharge lamp lighting device of this embodiment is configured to improve, in an almost 100% of burst dimming operation, linearity of a change rate of the optical output relative to a change in the on-duty ratio of the PWM signal to determine the light-on periods and the light-off periods. In the conventional technique according to Patent Document 2, a time lag is generated between an application of the starting voltage to the lamp and a start of lighting. For this reason, the output is significantly reduced below 99% due to the time lag (see a broken line in FIG. 35), when the on-duty ratio of the PWM signal for determining the light-on periods and the light-off periods is changed from 100% to 98%. Accordingly, this causes a problem that linearity of the change rate in the optical output relative to the change in the dimming signal is distorted. In view of this point, in this embodiment, the circuit according to the second embodiment shown in FIG. 6 includes the burst dimming control unit 4 for feeding the second input of the operational amplifier OP1, the burst dimming control unit 4 provided with: the resistor R5 having its one end connected to the second reference voltage V2; the capacitor C11 being connected between the other end of the resistor R5 and a reference potential (grounded) and constituting an integration circuit together with the resistor R5; the series circuit of the resistor R7 and the diode D1, the circuit being connected between a junction of the resistor R5 and the capacitor C11 and the inverting input terminal of the operational amplifier OP1; and the switching element Qa being connected between the junction of the resistor R5 and the capacitor C11 and the reference potential (grounded) via the resistor R6. As similar to the second embodiment, the switching element Qa is turned on and off according to the PWM signal.

Figure 33:
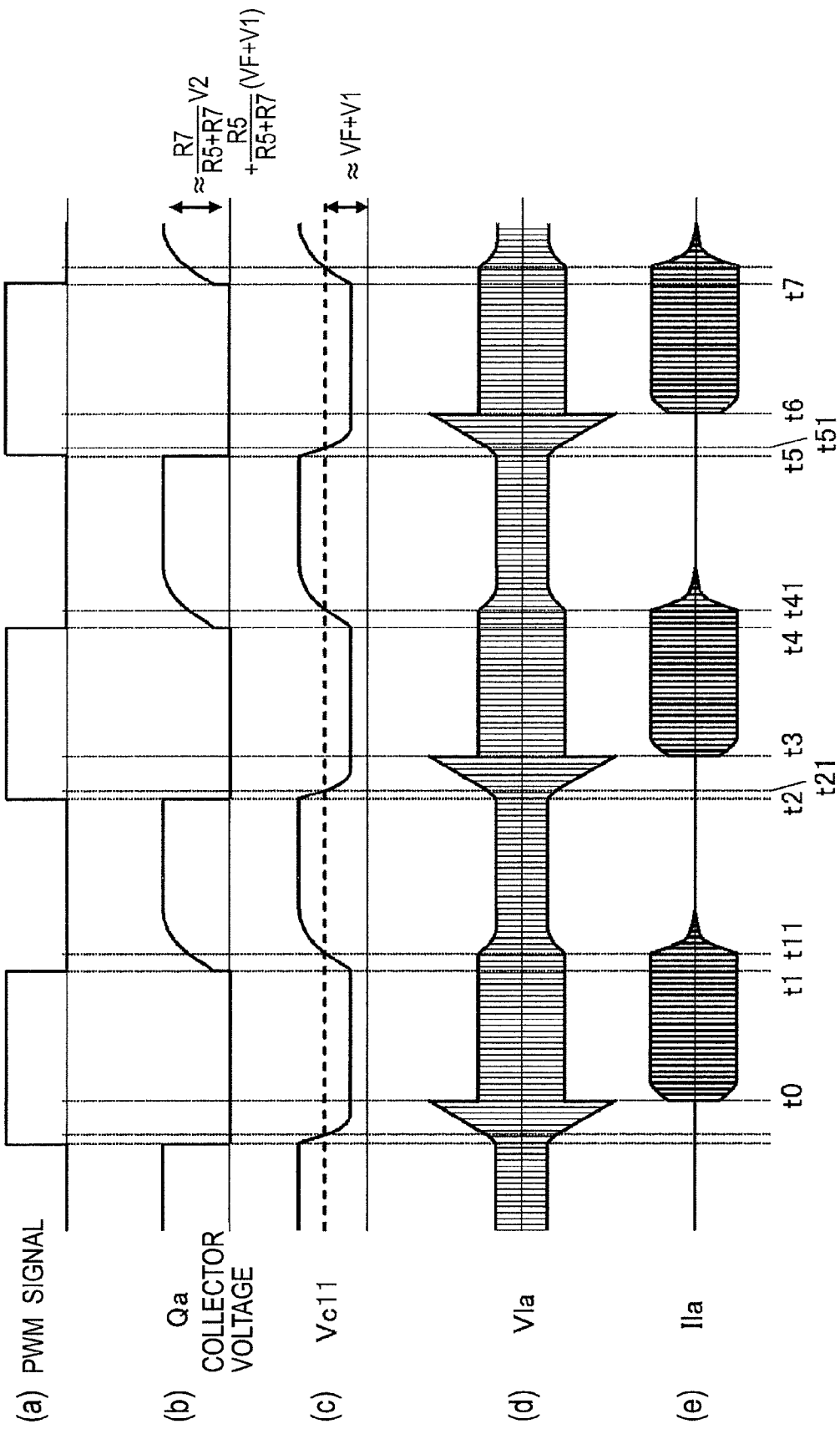
FIG. 33 is a waveform chart showing an operation in a normal burst dimming state of the discharge lamp lighting device shown in FIG. 32.
Figure 34:
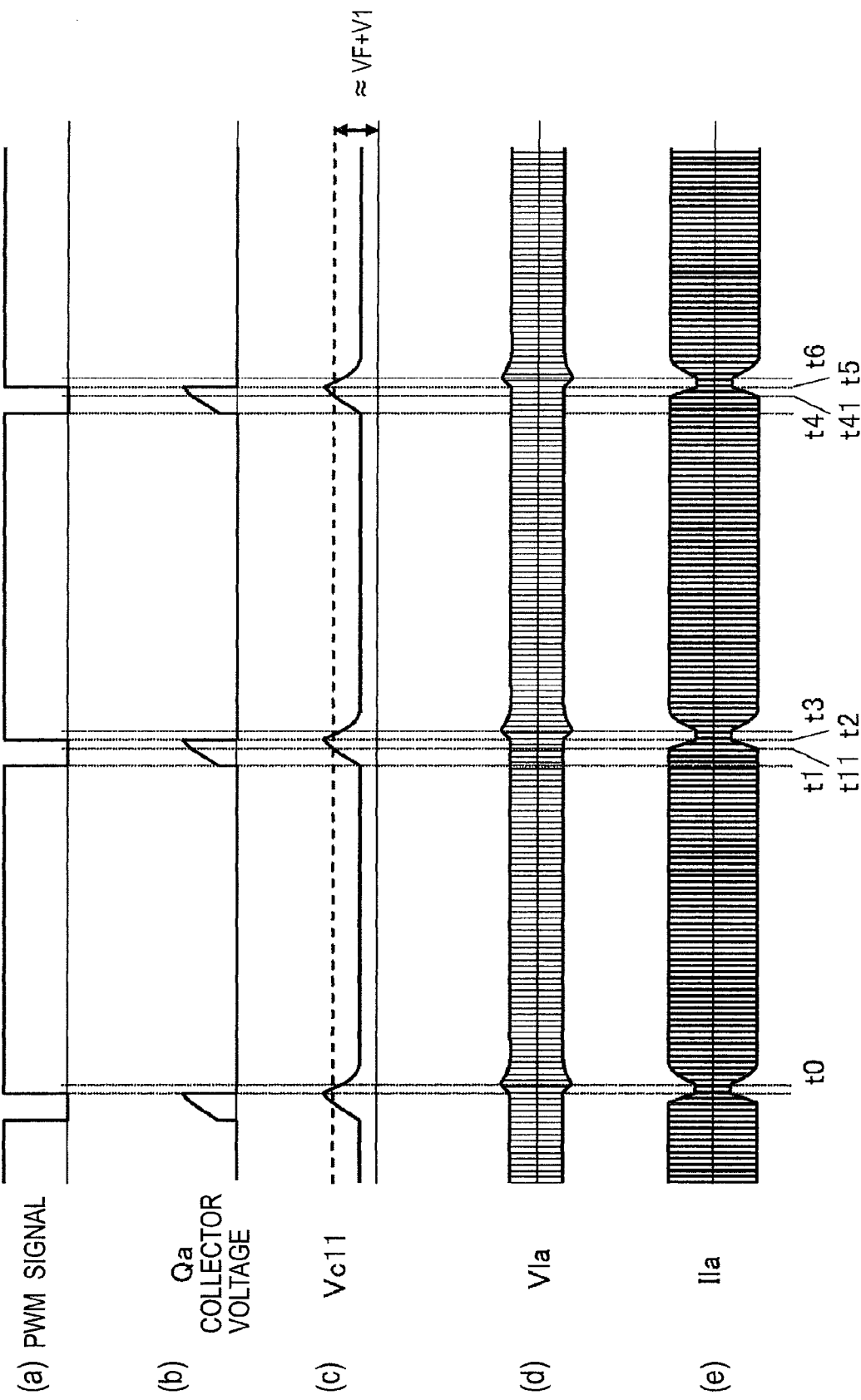
FIG. 34 is a waveform chart showing an operation in a burst dimming state close to continuous lighting of the discharge lamp lighting device shown in FIG. 32.

FIGS. 33($a$) to 33($e$) and FIGS. 34($a$) to 34($e$) are operation waveform charts of the discharge lamp lighting device of this embodiment, in which (d) Vla denotes the lamp voltage, (e) Ila denotes the lamp current, and (c) Vc11 denotes a voltage of the capacitor C11. FIGS. 33($a$) to 33($e$) show operations when the on-duty ratio of the PWM signal is around 50%, while FIGS. 34($a$) to 33($e$) show operations when the on-duty ratio of the PWM signal is slightly less than 100%. The operations of this embodiment will be described for periods of t0 to t1, t1 to t2, and t2 to t3 in FIGS. 33($a$) to 33($e$) and FIGS. 34($a$) to 34($e$).

[Concerning Period t0 to t1]

The PWM signal is set to the H level in this period. Accordingly, the transistor Qa is turned on and a collector voltage thereof is in a grounded level. The diode D1 is inversely biased and turned off as the voltage of the capacitor C11 drops, whereby the output of the burst dimming control unit 4 is in a high impedance state. As in the second embodiment, this is the same as the conventional current feedback dimming method.

[Concerning Period t1 to t2]

When the switching element Qa is turned off at the time point t1, the capacitor C11 is charged from the second reference voltage V2 via the resistor R5. When the voltage Vc11 of the capacitor C11 becomes equal to or above a predetermined value (VF+V1), the diode D1 is turned on (the time point t11). Here, VF denotes the forward voltage drop of the diode D1.

When the diode D1 is turned on at the time point t11, the current flows from the capacitor C11 toward the inverting input terminal of the operational amplifier OP1 via the resistor R7 and the diode D1, whereby the output voltage of the operational amplifier OP1 is reduced and the oscillation frequency becomes higher. When the current flowing to the resistors R5 and R7 becomes sufficiently large, the output voltage drops to the lower limit of the output-enable range of the operational amplifier OP1. In this way, the preheating frequency in the light-off period is set by use of the resistor R4 as in the second embodiment.

Accordingly, after the time point t11, a gradually-increasing voltage obtained by integrating the second reference voltage V2 with the integration circuit formed of the resistor R5 and the capacitor C11 is connected to the inverting input terminal of the operational amplifier OP1 via the resistor R7 and the diode D1. The operational amplifier also serves as the adder for burst dimming control. Accordingly, the gradually-increasing voltage Vc11 of the capacitor C11 is added to the detection voltage detected by the current detection circuit at a proportion between the input resistors R2 and R7. In other words, for the operational amplifier OP1, this is the same as a case where the detection voltage of the circuit current outputted from the low-pass filter LPF gradually increases. Accordingly, the operational amplifier OP1 gradually reduces the output voltage so as to decrease the circuit current gradually. When the period t1 to t2 is relatively long (FIG. 33), a circuit constant is set so that the hot cathode fluorescent lamp FL is eventually turned off. When the period t1 to t2 is extremely short (FIG. 34), the circuit constant is set to a level which reduces the lamp current Ila of the hot cathode fluorescent lamp FL.

When the period t1 to t2 is relatively long (FIG. 33), the collector voltage of the transistor Qa converges to the voltage which is obtained by dividing, by the resistors R5 and R7, the second reference voltage V2 and an anode potential (VF+V1) of the diode D1. However, when the period t1 to t2 is extremely short (FIG. 34), the collector potential of the transistor Qa does not rise to that level.

[Concerning Period t2 to t3]

In the case of FIG. 33, when the switching element Qa is turned on at the time point t2, the capacitor C11 starts discharging via the resistor R6. The frequency declines to increase the output in response to the voltage drop of the capacitor C11. When Vc11<VF+V1 is satisfied, the diode D1 is turned off (at the time point t21). As the diode D1 is turned off, the current having been supplied from the capacitor C11 is interrupted. Accordingly, the input of the feedback circuit is decreased and the frequency further declines in order to increase the output, thereby raising the lamp voltage. When the lamp voltage exceeds the voltage necessary for starting, the lamp is turned on (at the time point t3). The frequency eventually changes to the level equivalent to the output equivalent to the first reference voltage V1, and then the operation becomes the same as that in the time period t0 to t1. The operations on and after the time point 3 are the same as the operations in the time periods t0 to t3. Thereafter, lighting-on and lighting-off are repeated by operations similar to those described above.

When the on-duty ratio of the PWM signal is close to 100% (when the L level period is extremely short) as shown in FIG. 34, a time period that satisfies Vc11≧VF+V1 is extremely short. Thus, the variation in the frequency is so small that, in an operation from the time point t11 to the time point t3, the output only slightly drops without causing the lamp to go off completely. In this way, when the on-duty ratio of the PWM signal is changed from 100% to 99% at the transition from the continuously lighted state to the burst dimming state, it is possible to prevent a conventional trouble that the output is significantly reduced below 99% due to generation of the time lag when starting lighting the discharge lamp FL.

Figure 35:
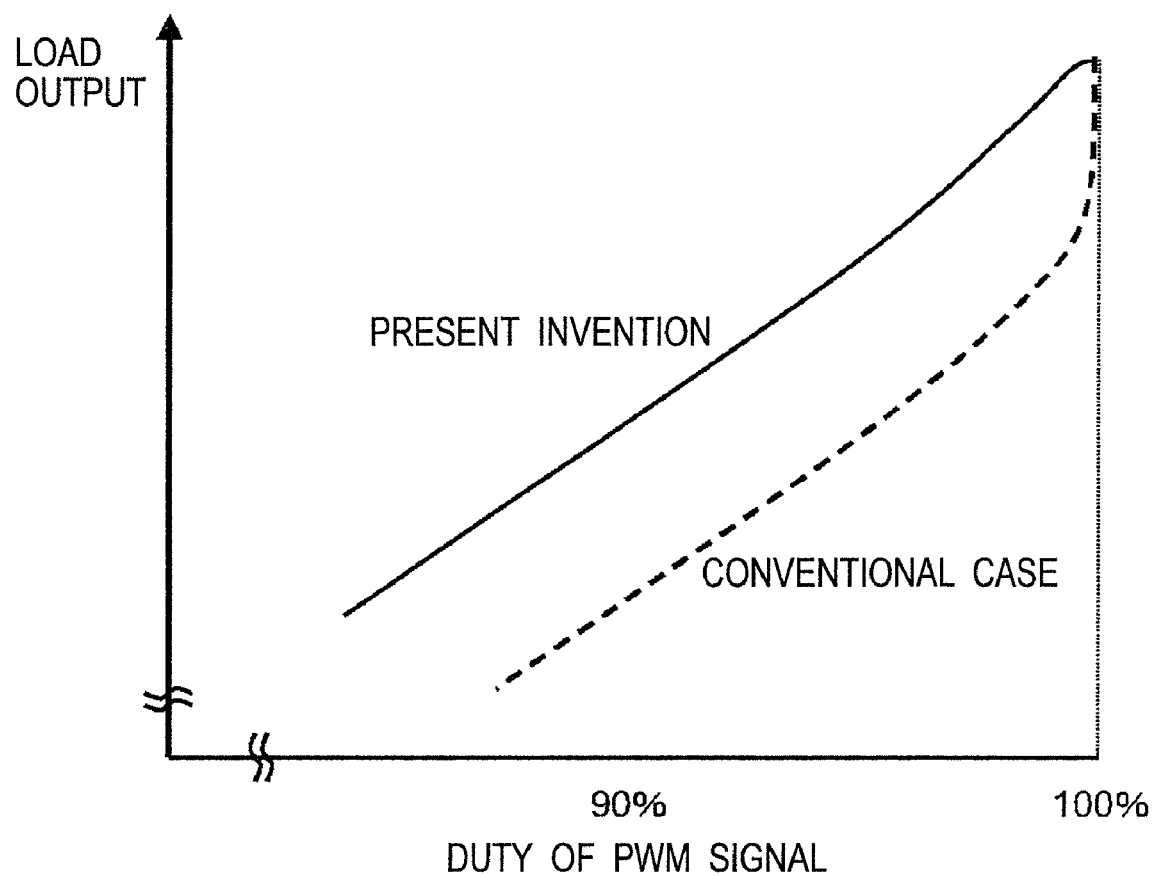
FIG. 35 is an operation explanatory diagram of the discharge lamp lighting device shown in FIG. 32.

FIG. 35 is an operation explanatory diagram of the discharge lamp lighting device of this embodiment, in which a solid line indicates a dimming characteristic with linearity improved by this embodiment, and a broken line indicates a conventional dimming characteristic with poor linearity around 100% of the on-duty ratio of the PWM signal. The lateral axis defines the on-duty ratio (a ratio of the H level period within one cycle) of the PWM signal and the longitudinal axis defines the load output (the optical output). An inclination of an increase of the load output as the on-duty ratio of the PWM signal increases is steep near 100% of the on-duty ratio in the conventional example (the broken line). In contrast, the inclination is substantially linear according to the present invention (the solid line). Hence it is apparent that the linearity is improved.

As shown in FIG. 35, the output has once dropped before changing linearly in the conventional example. However, this embodiment can change the output linearly while suppressing such a drop. Moreover, fall time of the lamp current Ila can be set based on the integration time constant of the resistor R5 and the capacitor C11. If this embodiment lacks the integration circuit, the change rate of the frequency is determined by the responsiveness of the feedback circuit. For stably lighting the lamp in the light-on period, it is preferable to raise the responsiveness of the feedback circuit as high as possible. However, it is not possible to raise the responsiveness of the feedback circuit too high because a rapid frequency change from light-on period to light-off period may invite transitional fluctuation in the resonant action. Nevertheless, this embodiment can set the fall time of the lamp current Ila individually. Therefore, it is possible to prevent transitional fluctuation in the resonant action while raising the responsiveness of the feedback circuit. Moreover, it is also possible to suppress a rapid change in the lamp current Ila, and thus to suppress high-frequency noise components which is radiated from the lamp. Here, it is needless to say that this embodiment can be combined with any of the above-described second to ninth embodiments as appropriate.

Figure 36:
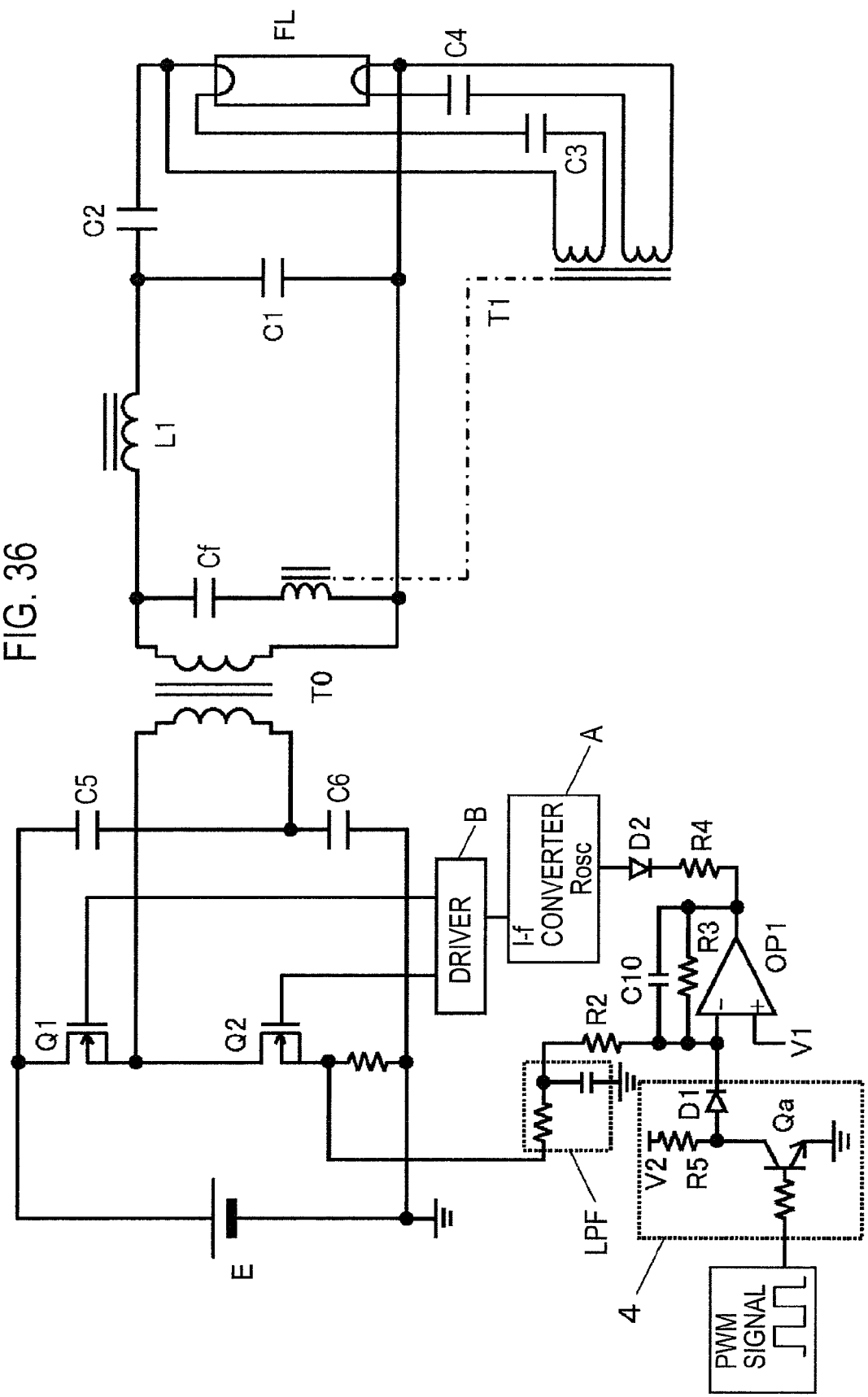
FIG. 36 is a circuit diagram showing a configuration of a modified example of the discharge lamp lighting device according to the second embodiment of the present invention.

Meanwhile, FIG. 36 shows a modified example of the second embodiment, which is another configuration example of the inverter circuit. In this example, a series circuit of capacitors C5 and C6 is connected to the direct-current power source E to form a half-bridge structure. A primary coil of a transformer T0 is connected between a junction of the capacitors C5 and C6 and the junction of the switching elements Q1 and Q2, while the preheating circuit and a resonance load circuit are connected to a secondary coil of the transformer T0. This configuration is advantageous in that it is possible to easily turn on a lamp even having a high tube voltage by setting up a boost ratio of the transformer T0 arbitrarily. Although the circuit applied to the second embodiment is used here as the example, it is needless to say that the example is also applicable to any of the above-described third to tenth embodiments. Moreover, the inverter circuit is not limited to having the half-bridge structure and a full-bridge structure is also acceptable. The same applies to the embodiments to be described later.

Figure 37:
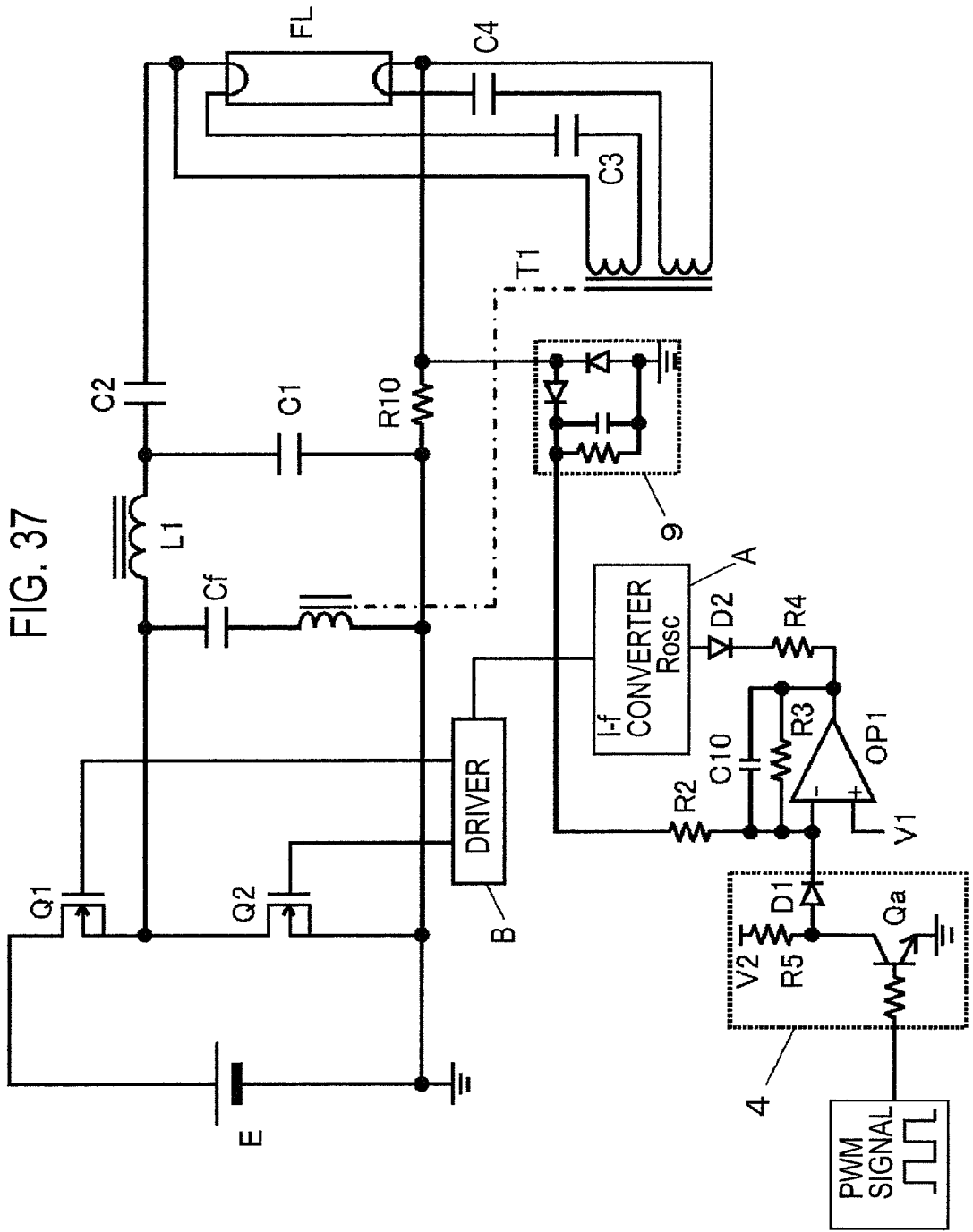
FIG. 37 is a circuit diagram showing a configuration of another modified example of the discharge lamp lighting device according to the second embodiment of the present invention.

Moreover, FIG. 37 shows another modified example of the second embodiment, which is an example in which the Ila detection circuit 9 is used for detecting the lamp current Ila as the current detection circuit. The circuit shown in FIG. 6 substantially performs feedback control of the lamp power by detecting the current flowing to the switching element Q2. In contrast, the circuit shown in FIG. 37 can perform feedback control of the lamp current by inputting the detection output of the Ila detection circuit 9 to the feedback circuit. Although the circuit applied to the second embodiment is used here as the example, it is needless to say that the example is also applicable to any of the above-described third to tenth embodiments. Moreover, it is needless to say that locations which allow detection of the circuit current are not limited to the locations exemplified in FIG. 6 and FIG. 37, and any location is applicable as far as the location allows detection of the circuit current which can be inputted to the feedback circuit.

Eleventh Embodiment

FIGS. 38(a) to 38(e) are operation waveform charts of a discharge lamp lighting device according to an eleventh embodiment of the present invention. The circuit configuration of the discharge lamp lighting device of this embodiment may be the same as FIG. 1. The discharge lamp lighting device of this embodiment is characterized in that preheating in the OFF period of the burst dimming signal includes: a first preheating mode (at the frequency f1) in which the drive frequency fsw of the inverter circuit 1 is selected such that a voltage-current characteristic of the inverter circuit 1 and a voltage-current characteristic of the discharge lamp FL have no intersecting point; and a second preheating mode (at the frequency f2) in which, as the drive frequency fsw of the inverter circuit 1, a frequency is selected which is lower than that in the first preheating mode, the selected frequency being low enough not to allow the discharge lamp FL in the light-off state to be turned on again. Switching the drive frequency fsw between two steps when preheating in this manner is effective in reducing stresses attributable to the high voltage Vp at the start.

The frequency f2 in the second preheating mode is the frequency which is not enough to extinguish the discharge lamp in the light-on state nor to turn on the discharge lamp in the light-off state. Therefore, the discharge lamp is not turned off if a frequency f3 at the time of lighting is suddenly switched to the frequency f2 in the second preheating mode. Accordingly it is not possible to dim to a low level. Accordingly, in this embodiment, firstly the frequency f3 at the time of lighting is switched to the frequency f1 in the first preheating mode to surely extinguish the discharge lamp, the frequency f1 is then reduced to the second frequency f2 which allows the proper preheating current to flow, and the discharge lamp is caused to stand by in the preheated state. When the burst dimming signal transitions from the off period to the on period, the frequency is further reduced to start lighting the discharge lamp. Here, the lamp voltage changes only little at that time. Accordingly, light is turned on with a short period of time, and thus stresses can be reduced relevantly. A configuration for switching from the first preheating mode to the second preheating mode can be one using timer means, for example, in which the first preheating mode is switched to the second preheating mode when the elapsed time exceeds a predetermined time after the burst dimming signal has transitioned to the OFF-period.

When the ON period of the burst dimming signal is longer than the OFF period thereof as described in FIG. 2, the luminescent spots of the filaments each have a high temperature as the lamp current flows thereto for a long time period. Accordingly the second preheating mode may be omitted. On the other hand, when the ON period of the burst dimming signal is shorter than the OFF period thereof as described in FIG. 3, the luminescent spots of the filaments each have a low temperature as the lamp current flows thereto for a short time period. Here, it is appropriate to increase the preheating current by switching from the first preheating mode to the second preheating mode when the elapsed time exceeds a predetermined time after the burst dimming signal has transitioned to the OFF-period. In this way, thermionic emission of the hot cathode is activated compared with the case of suddenly switching the frequency f1 in the first preheating mode to the frequency f3 at the time of lighting. Hence, it is possible to achieve breakdown of the discharge lamp by using the low starting voltage Vp.

As described above, in the discharge lamp lighting device of this embodiment, preheating in the OFF period of the burst dimming signal includes: the first preheating mode (at the frequency f1) in which the drive frequency fsw of the inverter circuit 1 is selected such that the voltage-current characteristic of the inverter circuit 1 and the voltage-current characteristic of the discharge lamp have no intersecting point; and the second preheating mode (at the frequency f2) in which, as the drive frequency fsw of the inverter circuit 1, a frequency is selected which is lower than that in the first preheating mode, the selected frequency being low enough not to allow the discharge lamp in the light-off state to be turned on again. Moreover, the preheating current in the first preheating mode is smaller than the preheating current in the second preheating mode. This configuration can reduce power consumption while suppressing the excessive preheating current in the first preheating mode, and lower the starting voltage when the discharge lamp transitions from the light-off state to the light-on state in a subsequent session in the second preheating mode. Therefore, it is possible to reduce stresses on the circuit and to reduce noise generation.

Twelfth Embodiment

FIGS. 39(a) to 39(e) are operation waveform charts of a discharge lamp lighting-device according to a twelfth embodiment of the present invention. The circuit configuration of the discharge lamp lighting device of this embodiment may also be the same as FIG. 1. The discharge lamp lighting device of this embodiment is characterized in that the drive frequency fsw of the inverter circuit 1 is continuously reduced at the transition from the first preheating mode to the second preheating mode. As similar to the eleventh embodiment, this embodiment is effective in reducing stresses attributable to the high voltage Vp at the start by continuously reducing the drive frequency fsw when lighting at the preheating in this manner.

Figure 38:
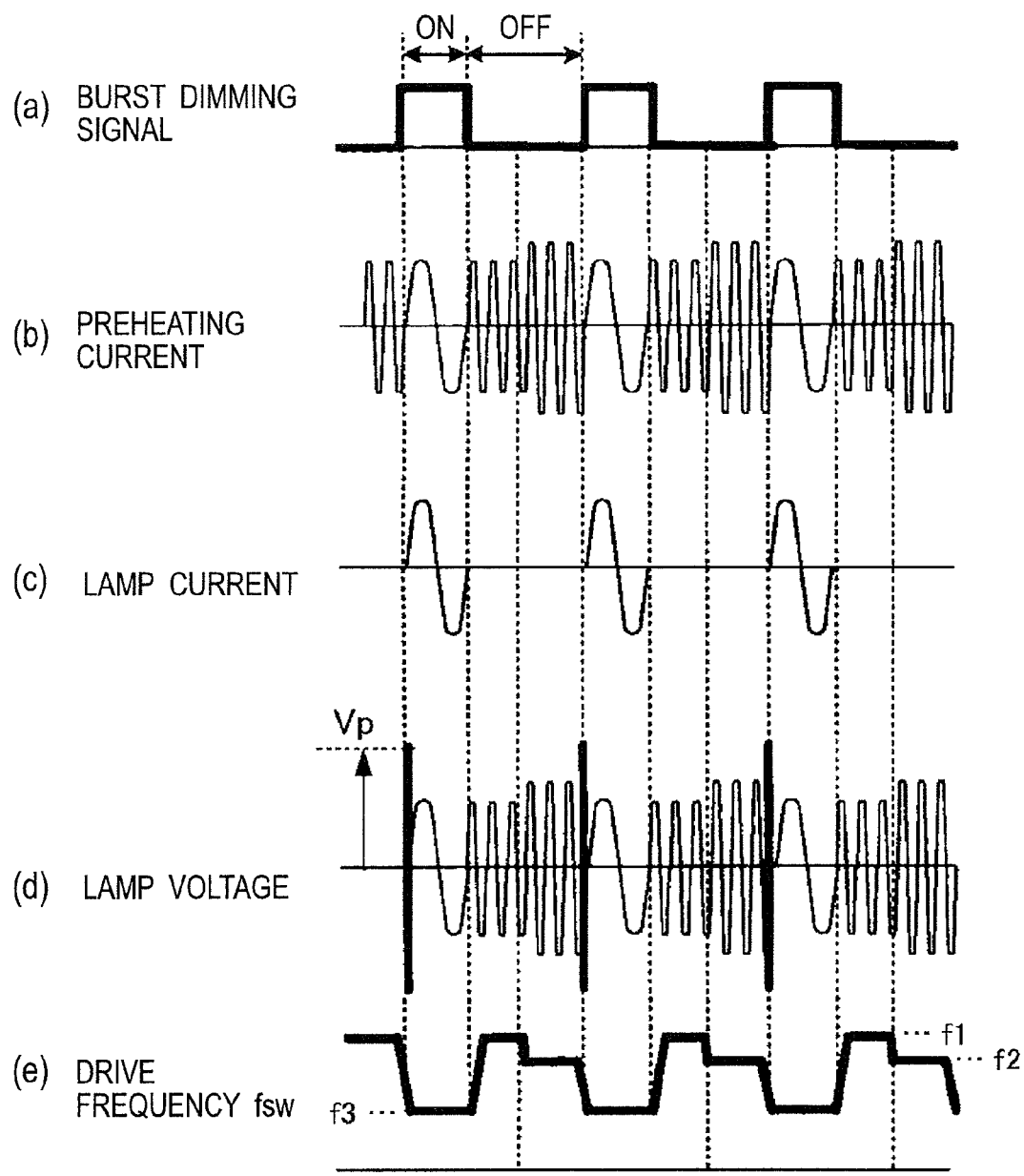
FIG. 38 is a waveform chart showing an operation of a discharge lamp lighting device according to an eleventh embodiment of the present invention.
Figure 39:
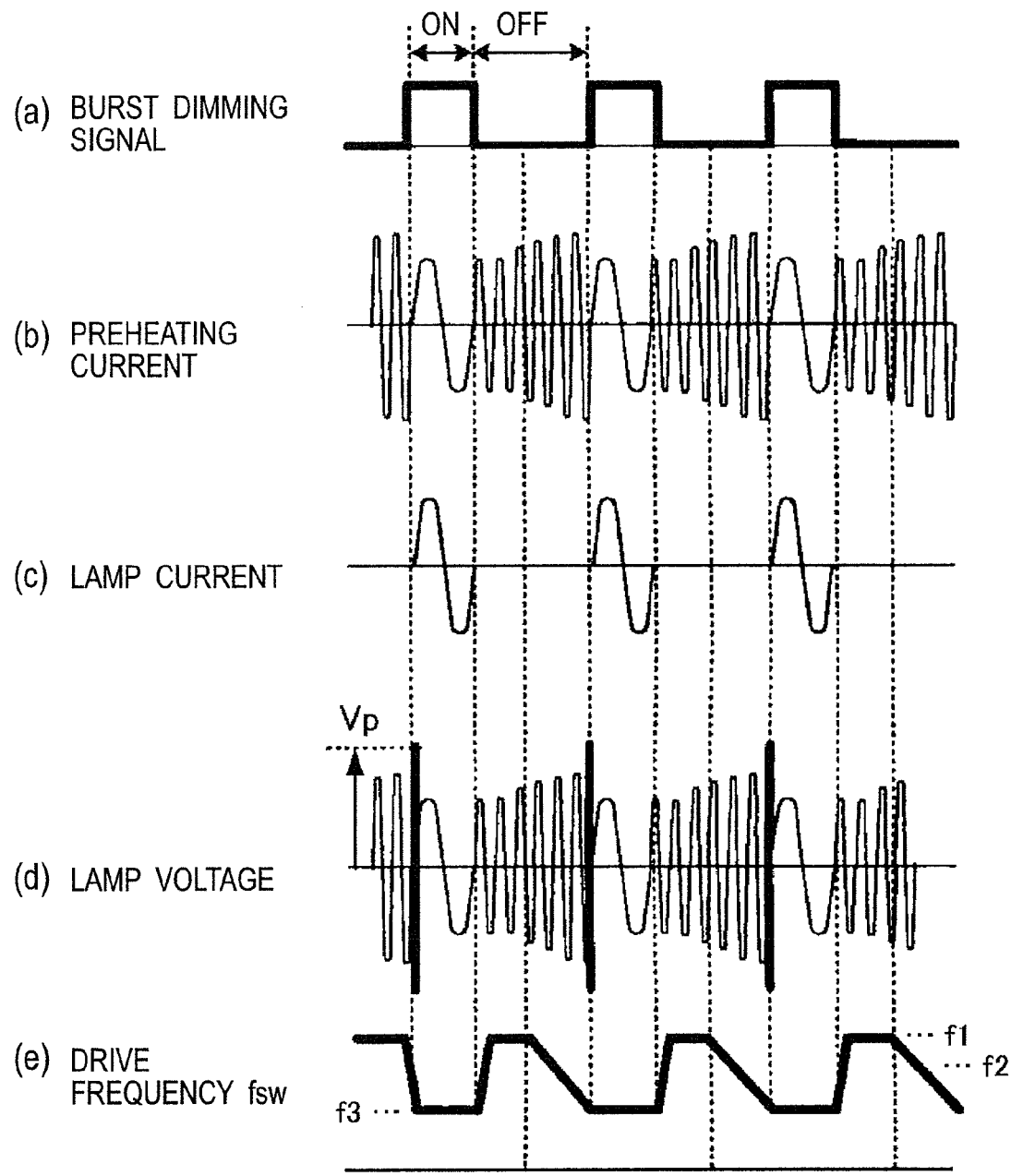
FIG. 39 is a waveform chart showing an operation of a discharge lamp lighting device according to a twelfth embodiment of the present invention.

In FIG. 39 as well as in the case in FIG. 38, in the OFF period of the burst dimming signal, switching is performed to the first preheating mode (at the frequency f1) in which the drive frequency fsw of the inverter circuit 1 is selected such that the voltage-current characteristic of the inverter circuit 1 and the voltage-current characteristic of the discharge lamp FL has no intersecting point, and thus the discharge lamp FL is surely turned off. This allows dimming to a low level. When the time ratio of the OFF period of the burst dimming signal becomes longer as compared to that of the ON period thereof, the luminescent spots of the filaments has a low temperature as the lamp current flows shorter in time. Accordingly, to compensate the temperature reduction, the drive frequency fsw of the inverter circuit 1 is continuously reduced to gradually increase the preheating current.

Switching from the first preheating mode to the second preheating mode may be performed using the timer means, for example. When the OFF period of the burst dimming signal is shorter than the ON period as in FIG. 39, the device may operate as described above in FIG. 2, whereas when the OFF period of the burst dimming signal is longer than the ON period, the device may operate as in FIG. 39. The same applies to the above-described case in FIG. 38. Here, in FIG. 38 and FIG. 39, the preheating current in the first preheating mode is smaller than the preheating current in the second preheating mode. This is because resonance current flowing to the resonance inductor L1 is reduced due to the high drive frequency fsw of the inverter circuit 1 in the first preheating mode in which the discharge lamp FL is surely turned off, and thus reduction in the high-frequency voltage induced on the secondary coil of the inductor L1 exceeds reduction in the impedance of the resonance capacitors C3 and C4.

As described above, in the discharge lamp lighting device of this embodiment, the drive frequency fsw of the inverter circuit 1 is continuously changed at the transition from the first preheating mode to the second preheating mode. Moreover, the preheating current in the first preheating mode is smaller than the preheating current in the second preheating mode. According to this configuration, power consumption can be reduced while suppressing the excessive preheating current in the first preheating mode and the starting voltage can be lowered when the discharge lamp transitions from the light-off state to the light-on state in a subsequent session in the second preheating mode. Hence, the device is effective in reducing stresses on the circuit and reducing noise generation.

Thirteenth Embodiment

Figure 40:
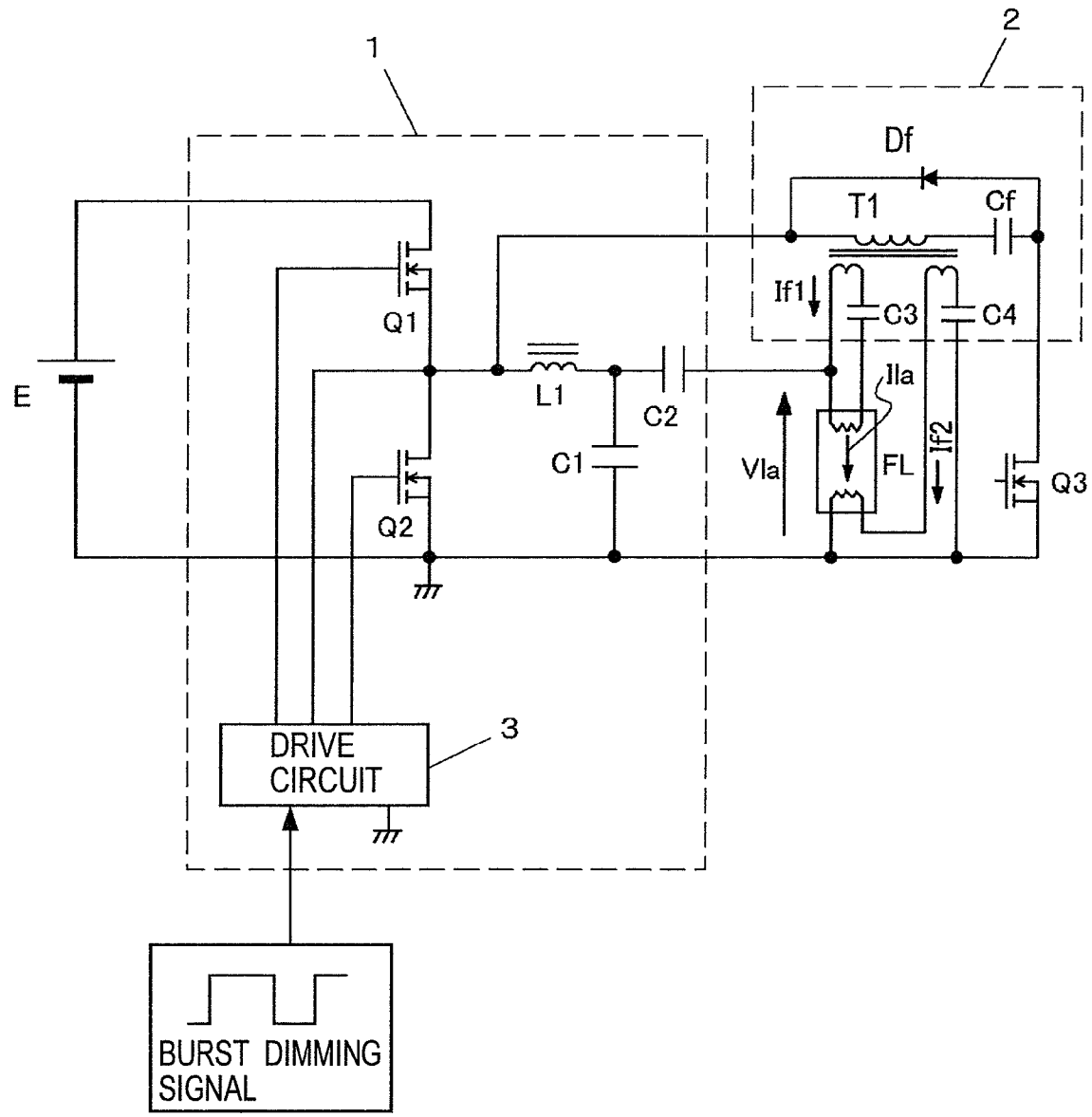
FIG. 40 is a circuit diagram showing a configuration of a discharge lamp lighting device according to a thirteenth embodiment of the present invention.

FIG. 40 is a circuit diagram of a discharge lamp lighting device according to a thirteenth embodiment of the present invention. The discharge lamp lighting device of this embodiment is obtained by modifying the above-described circuit in FIG. 6 in a way that an additional switching element Q3 is serially connected to the series circuit of the capacitor Cf and the transformer T1 for supplying the preheating current, and a diode Df is additionally connected from a junction of the capacitor Cf and the switching element Q3 to the junction of the switching elements Q1 and Q2 in a direction of the current flowing. Use of the circuit of this embodiment allows the preheating current to be cut off just for an arbitrary period by turning the switching element Q3 on and off. This suppresses the excessive preheating current and reduces power consumption. Specifically, performing on-off control (PWM control) of the switching element Q3 within the ON periods or the OFF periods of the burst dimming signal at a sufficiently lower frequency than the drive frequency fsw of the inverter circuit 1 makes it possible to control average values of the preheating currents flowing in the ON periods and the OFF periods of the burst dimming signal. Hence, the device is advantageous in that the device, can efficiently control the preheating current independently of a frequency characteristic of the preheating circuit 2, in which the magnitudes of the preheating currents If1 and If2 change in accordance with variation in the drive frequency fsw.

Fourteenth Embodiment

FIGS. 41(a) to 41(e) are operation waveform charts of a discharge lamp lighting device according to a fourteenth embodiment of the present invention. The circuit configuration of the discharge lamp lighting device of this embodiment may be the same as FIG. 1. The discharge lamp lighting device of this embodiment is configured to control the inverter 1 to stop oscillation just for a predetermined period when switching from the ON period to the OFF period of the burst dimming signal as another measure for reliably turning off the hot cathode discharge lamp FL. The control in the above-described manner can turn off the hot cathode discharge lamp FL without necessarily changing the drive frequency fsw of the inverter circuit 1 until the ballast V-I characteristic and the lamp V-I characteristic (c) have no intersecting point as shown in the characteristic transition from (a) to (b) in FIG. 5. Once the hot cathode discharge lamp FL is turned off, a high voltage is required to turn this on again. Accordingly, the hot cathode discharge lamp FL will not be turned on again even if the drive frequency fsw of the inverter circuit 1 can not be controllably raised up to the frequency f1 that surely extinguishes the lamp FL. Hence it is possible to supply the preheating current while stopping the lamp current flowing to the hot cathode discharge lamp FL. Therefore, the frequency control range does not have to be expanded too much when turning off the lamp FL and a measure against noise can be easily conducted.

Figure 41:
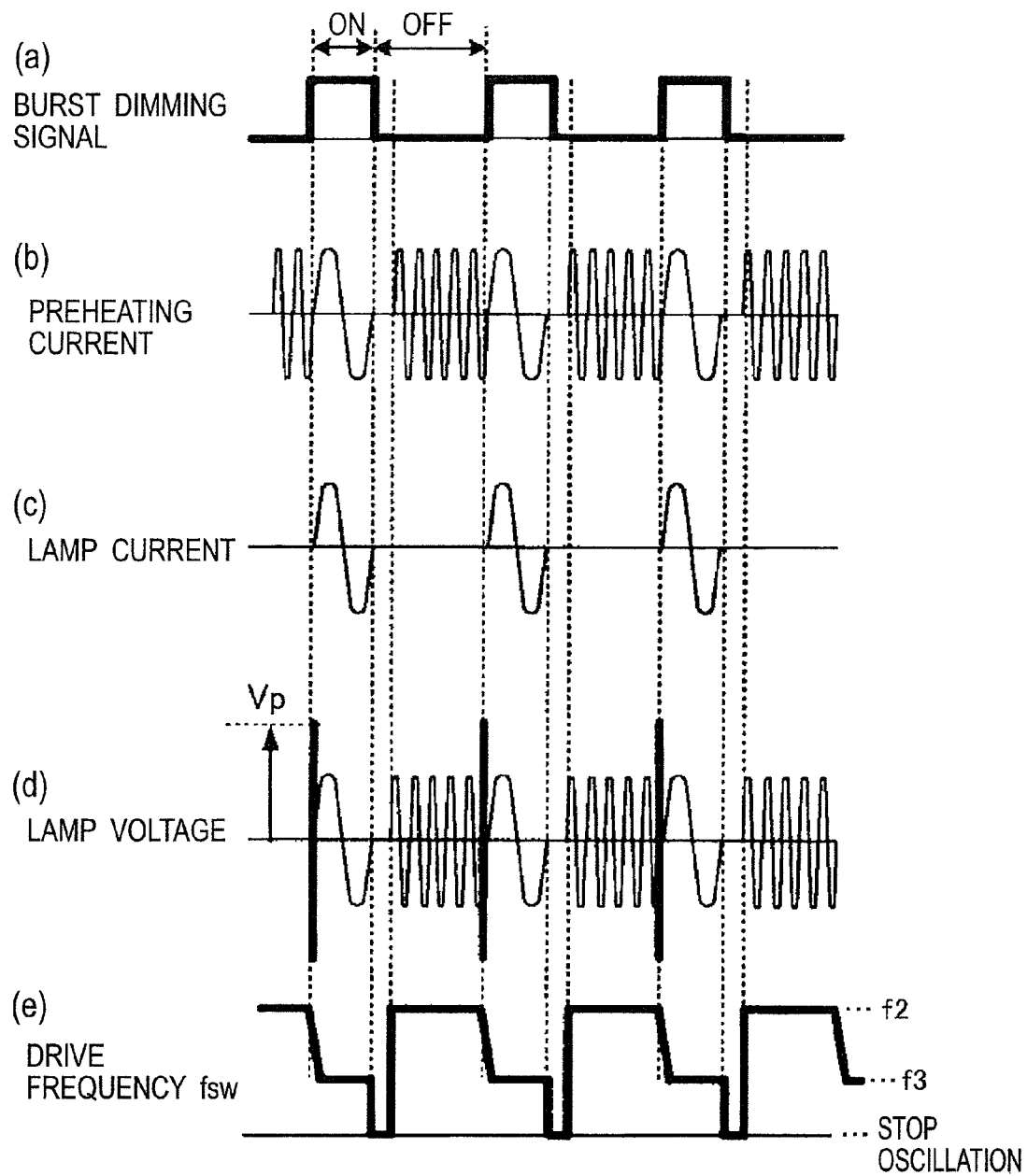
FIG. 41 is a waveform chart showing an operation of a discharge lamp lighting device of a fourteenth embodiment of the present invention.

In the example of FIG. 41, the drive frequency fsw in the OFF period of the burst dimming signal is set to the frequency f2 in the second preheating mode of the eleventh embodiment (FIG. 38). However, the discharge lamp FL can be extinguished by stopping oscillation of the inverter circuit 1 at the start of the OFF period. Accordingly, the lamp current Ila can be kept stopped continuously even when oscillation of the inverter circuit 1 is resumed later by applying the frequency f2 in the second preheating mode. Therefore, as compared to the eleventh embodiment, the control range of the drive frequency fsw of the inverter circuit 1 can be narrowed and thus a measure against noise can be easily conducted. Although the circuit applied to the first embodiment is used here as the example, it is also possible to apply a structure using the preheating circuit 2 of the second embodiment, for example. It is needless to say that the embodiment is applicable regardless of the structure of the preheating circuit.

Figure 42:
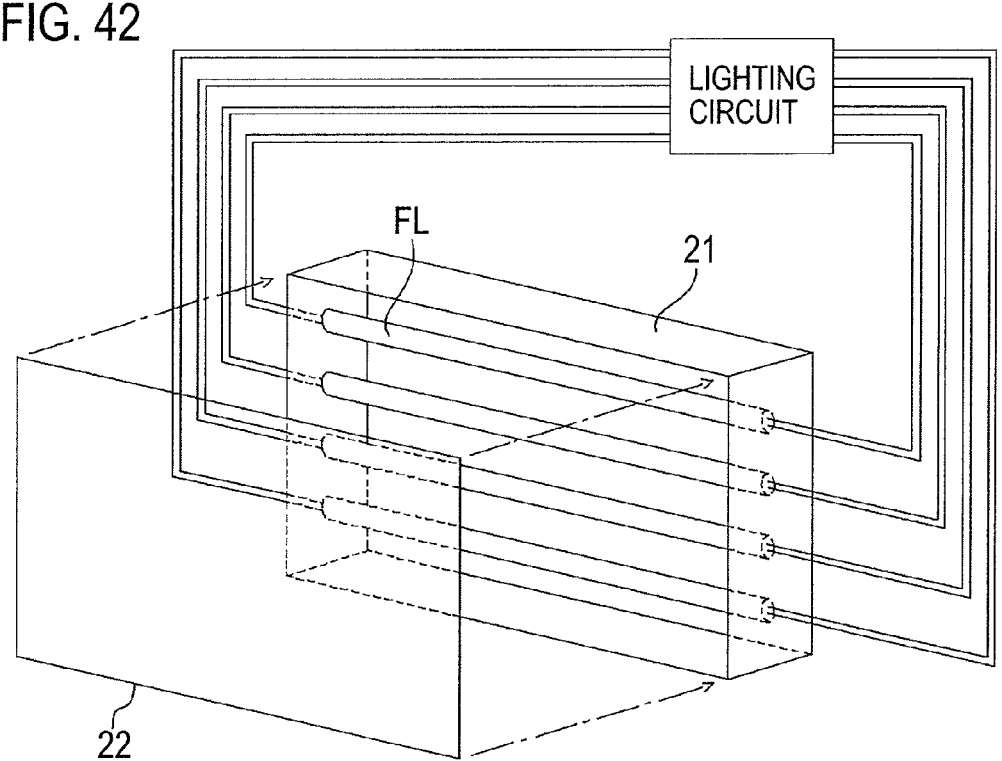
FIG. 42 is a perspective view showing a schematic configuration of a liquid crystal display device according to an embodiment of the present invention.
Figure 43:
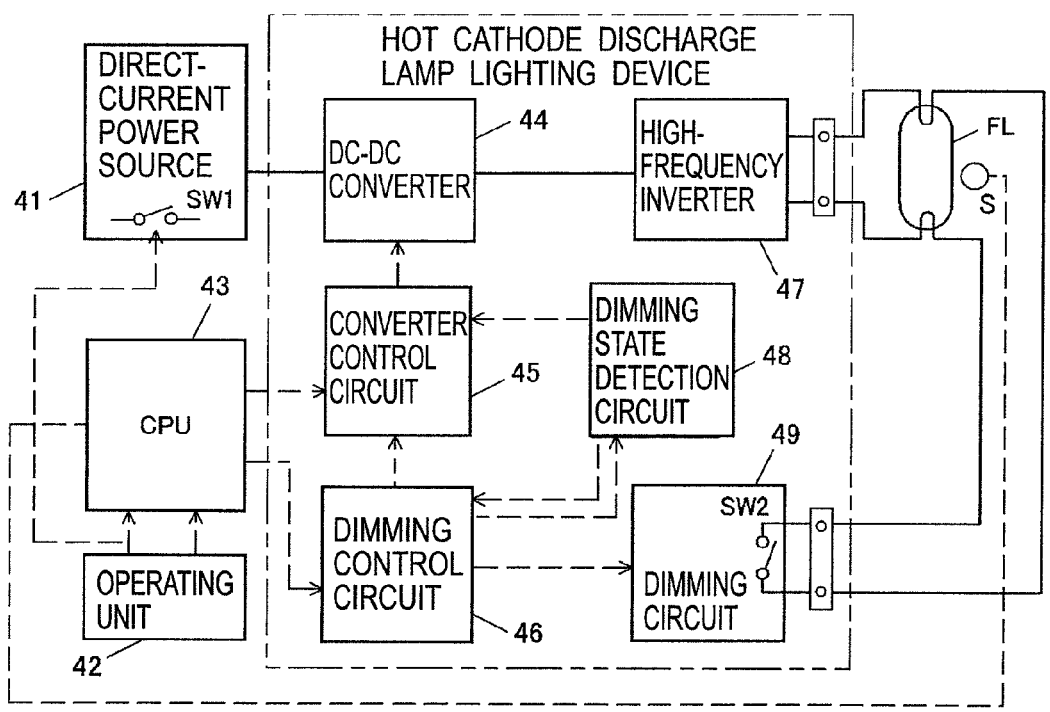
FIG. 43 is a block circuit diagram showing a configuration of a conventional discharge lamp lighting device.
Figure 44:
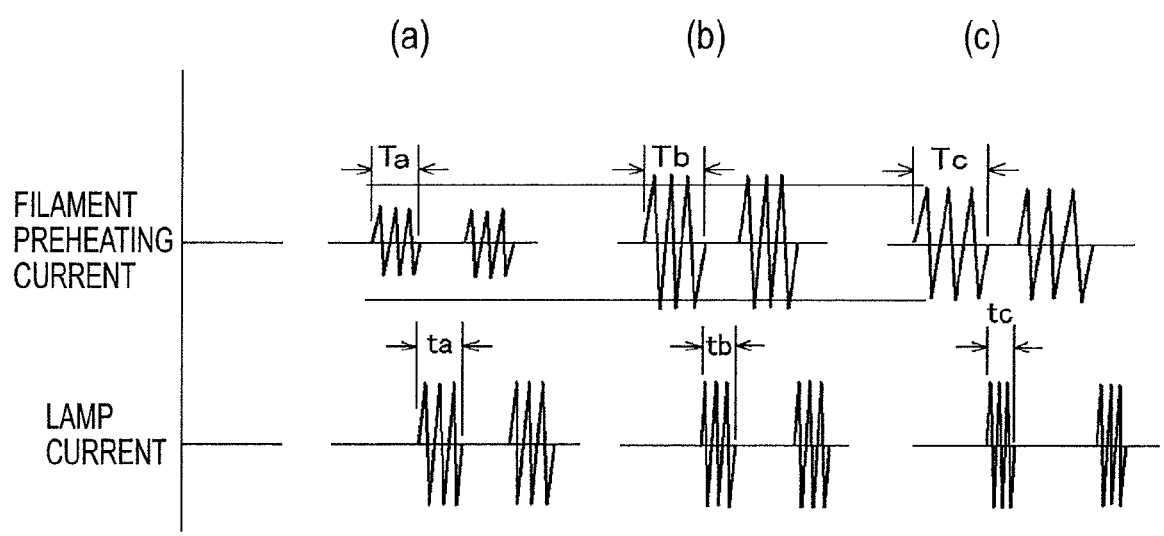
FIG. 44 is an operation waveform chart showing an operation of the conventional discharge lamp lighting device.

The discharge lamp lighting device according to any of the above-described first to fourteenth embodiments can be mounted to a liquid crystal display device equipped with a luminance adjustment function using multiple discharge lamps. FIG. 42 is a perspective view showing a schematic configuration of a liquid crystal display device. For example, multiple discharge lamps FL are arranged adjacent to each other at substantially regular intervals, inside a casing 21 having a mirror-like finished inner surface, and a liquid crystal panel 22 is disposed on surfaces of the discharge lamps FL. Here, if a light diffuse plate such as a prism sheet is provided on a back surface of the liquid crystal panel 22, luminance distribution on every part of a screen can be uniformed. Use of the liquid crystal display device of the present invention, allows an accurate preheating control of the hot cathodes of the discharge lamp FL serving as a light source and thus can increase life of the lamp. Moreover, the reduction of the starting voltage can reduce noise so that influences on the liquid crystal panel 22 or peripheral circuits are also decreased. Note that the usage of the discharge lamp lighting device of the present invention is not limited to a liquid crystal display device. Needless to say, the discharge lamp lighting device may also be mounted on an illumination device that employs a hot cathode discharge lamp.

INDUSTRIAL APPLICABILITY

The present invention is applicable to a discharge lamp lighting device which performs dimming by changing a time ratio between a light-on period and a light-off period of a discharge lamp that serves as a light source.

The invention claimed is:

1. A discharge lamp lighting device comprising:
   an inverter circuit which supplies electric power to a discharge lamp provided with a hot cathode; and
   a preheating circuit which supplies a preheating current to the hot cathode of the discharge lamp by a switching operation of the inverter circuit, wherein
   a burst dimming signal to determine a ratio between an ON period and an OFF period is inputted,
   a lamp current for the discharge lamp is stopped from flowing in the OFF period of the burst dimming signal while a voltage is applied to both ends of the discharge lamp,
   the lamp current is supplied in the ON period of the burst dimming signal by causing a dielectric breakdown of the discharge lamp,
   the preheating current is supplied constantly to the hot cathode of the discharge lamp in the ON period and the OFF period of the burst dimming signal,
   the inverter circuit is an inverter circuit of a frequency variable type in which power supply to the discharge lamp is reduced as a drive frequency increases, and
   the lamp current to the discharge lamp is stopped from flowing while the hot cathode is continuously preheated in the OFF period of the burst dimming signal by increasing the drive frequency of the inverter circuit up to such a level that a voltage-current characteristic of the inverter circuit have no intersecting point with a voltage-current characteristic of the discharge lamp.

2. The discharge lamp lighting device according to claim 1, wherein
   a switching element of the inverter circuit for supplying the lamp current to the discharge lamp also functions as a switching element of the inverter circuit for supplying the preheating current to the hot cathode of the discharge lamp.

3. The discharge lamp lighting device according to claim 1, wherein
   the inverter circuit includes:
   a resonance circuit which converts a direct-current voltage into a high-frequency voltage;
   a current detection circuit which detects a circuit current;
   an error amplifier which compares an output voltage of the current detection circuit with a first reference voltage and outputs an error signal;
   a V-f converter which changes an operating frequency of the inverter circuit according to the output of the error amplifier;
   means for generating a second reference voltage; and
   an adder which adds the second reference voltage to the output voltage of the current detection circuit in the OFF period of the burst dimming signal.

4. The discharge lamp lighting device according to claim 3, wherein the error amplifier and the adder include:
   an operational amplifier;
   a first resistor which connects an output of the current detection circuit to an inverting input terminal of the operational amplifier;
   a feedback circuit including a capacitor which feeds an output of the operational amplifier back to the inverting input terminal;
   a second resistor having one end connected to the second reference voltage;
   a diode which connects the other end of the second resistor to the inverting input terminal; and a first switching element connected between a reference potential and a junction of the second resistor and the diode, the first switching element is turned on in the ON period of the burst dimming signal, and the first switching element is turned off in the OFF period of the burst dimming signal.

5. The discharge lamp lighting device according to claim 4, wherein the V-f converter includes a V-I converter and an I-f converter, the V-I converter has a configuration in which the third resistor is connected between a third reference voltage and the output of the operational amplifier a current flowing to the third resistor is inputted to the I-f converter.

6. The discharge lamp lighting device according to claim 5, wherein the output of the operational amplifier is set substantially equal to the reference potential in the OFF period of the burst dimming signal, and the operating frequency in the OFF period is set by use of the third resistor.

7. The discharge lamp lighting device according to claim 5, comprising:

first delay means for outputting a signal obtained by delaying a start of the ON period of the burst dimming signal;

a third switching element which is turned on in the OFF period of the burst dimming signal; and a fifth resistor which shunts a current flowing to the third resistor from the third reference voltage while the third switching element is turned on, wherein the operating frequency in the OFF period of the burst dimming signal is set by use of the third resistor and the fifth resistor, the first switching element is turned on, lagged behind the start of the ON period of the burst dimming signal, by using the signal which is obtained by delaying the start of the ON period of the burst dimming signal by the first delay means, and the operating frequency of delay time to be set at the first delay means is set by use of the third resistor.

8. The discharge lamp lighting device according to claim 5, comprising:

lighting determining means for determining whether the discharge lamp is lighted or not by detecting the lamp current;

a third switching element which is turned on in the OFF period of the burst dimming signal; and a fifth resistor which shunts a current flowing to the third resistor from the third reference voltage when the third switching element is turned on, wherein the operating frequency in the OFF period of the burst dimming signal is set by use of the third resistor and the fifth resistor, the first switching element is turned on when the lighting determining means detects that the lamp current is flowing, and the operating frequency before the lighting determining means determines whether the discharge lamp is lighted or not is set by use of the third resistor.

9. The discharge lamp lighting device according to claim 4, comprising:

a voltage detection circuit which detects any of a voltage applied to the discharge lamp and a voltage equivalent to the voltage applied to the discharge lamp; and a series circuit of a fourth resistor and a second switching element, the series circuit connected between an output of the voltage detection circuit and the inverting input terminal of the operational amplifier, wherein the second switching element is turned on when the output of the voltage detection circuit exceeds a predetermined voltage.

10. The discharge lamp lighting device according to claim 4, comprising:

a current detection circuit for the switching element of the inverter circuit; and a series circuit of a second switching element and a fourth resistor, the series circuit connected between an output of the current detection circuit and the inverting input terminal of the operational amplifier, wherein the second switching element is turned on when the output of the current detection circuit for the switching element of the inverter circuits exceeds a predetermined voltage.

11. The discharge lamp lighting device according to claim 3, wherein the second reference voltage is inputted to the adder via an integration circuit.

12. The discharge lamp lighting device according to claim 11, wherein the error amplifier and the adder include:

an operational amplifier;

a first resistor which connects an output of the current detection circuit to an inverting input terminal of the operational amplifier;

a feedback circuit including a capacitor which feeds an output of the operational amplifier back to the inverting input terminal;

a second resistor having one end connected to the second reference voltage;

a capacitor which is connected between the other end of the second resistor and a reference potential and constitutes the integration circuit together with the second resistor;

a series circuit of a third resistor and a diode, the circuit being connected between the inverting input terminal and a junction of the second resistor and the capacitor;

a first switching element connected between a reference potential and a junction of the second resistor and the capacitor via a fourth resistor, the first switching element is turned on in the ON period of the burst dimming signal, and the first switching element is turned off in the OFF period of the burst dimming signal.

13. The discharge lamp lighting device according to claim 3, wherein the inverter circuit includes at least one switching element, and the current detection circuit detects a current flowing to the switching element of the inverter circuit.

14. The discharge lamp lighting device according to claim 3, wherein a load output of the burst dimming signal in the ON period is changed by making the first reference voltage variable.

15. The discharge lamp lighting device according to claim 3, wherein the second reference voltage is a direct-current voltage obtained by inputting any of the burst dimming signal and an inverted signal of the burst dimming signal to a duty-DC converter.

16. The discharge lamp lighting device according to claim 3, comprising:
- a voltage detection circuit which detects any of a voltage applied to the discharge lamp and a voltage equivalent to the voltage applied to the discharge lamp;
- a comparator which compares an output of the voltage detection circuit with a fourth reference voltage;
- a function which stops oscillation of the V-f converter according to an output of the comparator;
- second delay means for outputting a signal obtained by delaying a start of the ON period of the burst dimming signal; and
- a fourth switching element which operates according to an output of the second delay means,
- wherein the fourth switching element changes at least one of the fourth reference voltage and a voltage division ratio of the voltage detection circuit.

17. The discharge lamp lighting device according to claim 1, wherein
preheating in the OFF period of the burst dimming signal includes:
- a first preheating mode in which the drive frequency of the inverter circuit is selected such that a voltage-current characteristic of the inverter circuit and a voltage-current characteristic of the discharge lamp have no intersecting point; and
- a second preheating mode in which, as the drive frequency of the inverter circuit, a frequency is selected which is lower than that in the first preheating mode, the selected frequency being low enough not to allow the discharge lamp in the light-off state to be turned on again.

18. The discharge lamp lighting device according to claim 17, wherein
the drive frequency of the inverter circuit is continuously changed at transition from the first preheating mode to the second preheating mode.

19. The discharge lamp lighting device according to claim 17, wherein
the preheating current in the first preheating mode is smaller than the preheating current in the second preheating mode.

20. The discharge lamp lighting device according to claim 1, comprising:
means for stopping supply of the preheating current for a predetermined period.

21. The discharge lamp lighting device according to claim 20, wherein
the means for stopping supply of the preheating current for a predetermined period is means for stopping oscillation of the inverter circuit for a predetermined period.

22. The discharge lamp lighting device according to claim 20, wherein
the means for stopping supply of the preheating current for a predetermined period is means for interrupting supply of an oscillation output from the inverter circuit to the preheating circuit for a predetermined period.

23. An illumination device comprising:
the discharge lamp lighting device according to claim 1.

24. A liquid crystal display device comprising:
the discharge lamp lighting device according to claim 1.

* * * * *